United States Patent
Mori et al.

[15] 3,640,156
[45] Feb. 8, 1972

[54] CONTROL SYSTEM FOR AUTOMOTIVE AUTOMATIC TRANSMISSION

[72] Inventors: Yoichi Mori; Hiroshisa Ichimura, both of Yokohama, Japan

[73] Assignee: Nissan Motor Company, Limited, Yokohama, Japan

[22] Filed: Oct. 29, 1969

[21] Appl. No.: 872,253

[30] Foreign Application Priority Data

Oct. 30, 1968 Japan...................................43/78830

[52] U.S. Cl....................................74/866, 74/731, 74/752, 74/844
[51] Int. Cl..................B60k 21/08, F16h 47/00, F16h 5/42
[58] Field of Search.....................74/866, 336, 365, 731, 752

[56] References Cited
UNITED STATES PATENTS

| | | |
|---|---|---|
| 3,019,666 | 2/1962 | Brennan et al............................74/866 |
| 3,122,940 | 3/1964 | Shimwell et al..........................74/866 |
| 3,267,762 | 8/1966 | Reval....................................74/866 X |
| 3,448,640 | 6/1969 | Nelson....................................74/866 |

*Primary Examiner*—Arthur T. McKeon
*Attorney*—John Lezdey

[57] ABSTRACT

An automatic transmission mechanism for an automotive vehicle in which the transmission governing factors such as the position of the speed selecting lever, position of the accelerator pedal and the throttle valve, engine speed, vehicle speed and road grade are measured by electric means and the signals thus obtained are continuously fed into an electronic control system for evaluation of the requirements from the transmission. The electronic control system sends signals to elements converting them into hydraulic pressure which actuates friction elements to change gear ratios of the transmission.

11 Claims, 36 Drawing Figures

CONTROL SYSTEM FOR AUTOMOTIVE AUTOMATIC TRANSMISSION

This invention relates to automatic transmissions for automotive vehicles.

In motor vehicles using as a driving power source an internal combustion engine or other prime mover operating at a high speed, it is the common practice to employ a transmission to streamline the vehicle operation and to have available an increased output power and torque invariably in a low-speed operation of the vehicle. Two different types of such transmission are presently in use, one a constant-mesh transmission having a countershaft for transmitting a torque from the engine to a driven shaft and the other a planetary-gear-type transmission. This invention is specifically directed to the latter type of transmission.

An automatic transmission mechanism using such planetary gear sets usually includes a plurality of friction elements, such as friction clutches and friction brakes to provide a plurality of gear or speed ratios through selective coupling of the friction elements. To perform a streamlined shifting between the gear ratios, a hydraulic control system may be used and constructed to detect the engine output power, engine torque, and vehicle speed and to control the friction elements by regulating its working hydraulic pressures in relation to the detected information.

The torque of the friction elements, namely, the transmission torque of the friction clutches and braking torque of the friction brakes must be varied in accordance with the engine loads and vehicle speeds. The required torque increases as the engine load increases and it must be relatively large at starting or low vehicle speeds and relatively small at higher vehicle speeds.

In the following description and claims, the term "friction clutch" refers to engageable and disengageable means to connect or disconnect a torque transmitted between rotatable members of the transmission mechanism, and the term "friction brake" to engageable and disengageable means to clamp or release a rotatable member to a stationary member of the term transmission mechanism. The "friction element" shall include such friction clutch and friction brake.

Whereas, this invention proposes to use the planetary-gear-type transmission incorporating specially designed electronic and hydraulic systems. The electronic system as proposed by this invention is intended to function as nerve and brain systems to deliver detailed yet precise information to the transmission, while the hydraulic system is so arranged as to serve as a muscular system to act either on the brakes to lock the reaction members thereof which receive the counterforce of the transmission torque or on the clutches associated with planetary gear sets.

Thus, this invention proposes to utilize as the governing factors for controlling the automatic transmissions the positions of a speed selector lever and a selector value, position of the accelerator pedal which positions the throttle valve, engine speed, engine intake manifold vacuum, vehicle speed, engine temperature and road grade. All these factors as measured are usually converted into hydraulic pressure by which friction elements necessary to obtain various gear ratios are engaged. These individual electric signals are supplied into an electronic control system for conversion into electric signals which are appropriate at a given moment depending on total performance required from the transmission at that given moment. It is an object of this invention to provide a planetary-gear-type transmission capable of accomplishing shifting by converting rather weak electric signals of an electronic control system into hydraulic pressure necessary to engage various friction elements.

It is another object of the invention to provide a planetary-gear-type transmission capable of electronically controlling down-shifting at a lower vehicle speed than up-shifting at each gear ratio.

It is a further object of the invention to provide a planetary-gear-type transmission capable of synchronizing the engaging shaft speeds by signals supplied from an electronic control system.

It is still another object of the invention to provide a planetary-gear-type transmission capable of driving safely even if an electronic control system should fail.

It is still another object of the invention to provide a planetary-gear-type transmission capable of accomplishing the electronically actuated shifting at a momentarily low hydraulic pressure which returns to higher pressure after shifting to ensure nonslip (positive grip) of friction elements in the transmission.

It is still another object of the invention to provide an automatic transmission having a low cost and easy to manufacture low-voltage electronic control system in which failures seldom occur.

It is still another object of the invention to provide an automotive automatic transmission whereby braking by the engine is electronically actuated when the vehicle is descending downhill.

It is still another object of the invention to provide an automotive automatic transmission adapted to maintain the transmission by electronic control at a high speed gear ratio when decelerating to a halt so as to avoid vehicle "creep," (moving) shifting point to a low (starting) speed simply by depressing the accelerator pedal.

One advantage of the present invention is that the hydraulic pressure is maintained during shifting at a level proper to prevent shocks caused by the shifting, while after the shifting the hydraulic pressure is recovered and then kept high enough to prevent any slippage between the frictional surfaces of the clutches and brakes thereby preventing an occurrence of any accident. Thus, the hydraulic pressure is maintained at a proper level for a short time after the shifting has been effected. Where friction clutches are used in lieu of a torque converter, the transmission may use a device for generating a shifting signal in response to changes in the driven shaft speed and engine speed when the ratio of the driven shaft speed to the engine speed is not coincident with the required speed reduction ratio. This is achieved by comparing the driven shaft speed with the engine speed as will hereinafter be described in more detail. The device for generating a shifting signal may also be used for synchronizing the engine speed with the driven shaft speed to have the synchronizing time shortened by controlling the angular position of the throttle valve of the engine during the shifting to prevent the occurrence of mechanical shocks otherwise caused by the shifting as well as seizure of the frictional elements.

Another advantage of the present invention is that the shifting point is changed to a higher vehicle speed side than the speed required for the vehicle to run on a level road in accordance with the gradient of the road and the engine temperature, providing not only a power enough to run on an ascent or to run when the engine is operated at a low temperature, without sacrificing the engine braking action when on the descent.

A further advantage of the present invention is that the gear ratio is kept within the high speed range even when the accelerator pedal is kept released. This is particularly beneficial in preventing the tendency of a conventional torque-converter-type transmission to creep when the vehicle comes to a halt.

Still another advantage of the present invention is that it permits a manual emergency operation of the transmission in case the electronic control device malfunctions.

A still further advantage of the present invention is that the hydraulic and electronic circuits operating the frictional elements are interlocked to prevent the simultaneous engagement of three frictional elements. This prevents malfunction of the transmission in the event a failure occurs in the control circuits.

The features and advantages of the present invention are made apparent in the following detailed description of the preferred embodiments by way of example only, wherein reference is made to the accompanying drawings, in which:

FIG. 1 is a schematic view of an overall arrangement of the automatic transmission mechanism according to the present invention;

FIGS. 2 to 10 are diagrams of a hydraulic pressure circuit and the associated hydraulic control system used in the transmission wherein the selector valve is shown to be in the neutral position (FIG. 2), in the parking position (FIG. 3), in the low-speed position in the drive range (FIG. 4), in the intermediate-speed position in the drive range (FIG. 5), in the high-speed position in the drive range (FIG. 6), in the second-speed position (FIG. 7), in the low-speed position in the first-speed range (FIG. 8), in the intermediate-speed in the first-speed range (FIG. 9), and in the reverse position (FIG. 10).

FIGS. 11 to 19 are diagrams showing an alternative example of the hydraulic pressure circuit shown in FIGS. 2 to 10, in which the selector valve is shown to be in the neutral position (FIG. 11), in the parking position (FIG. 12), in the low-speed position in the drive range (FIG. 13), in the intermediate-speed position in the drive range (FIG. 14), in the high-speed position in the drive range (FIG. 15), in the second-speed position (FIG. 16), in the low-speed position in the first-speed range (FIG. 17), in the intermediate-speed position in the first-speed range (FIG. 18), and in the reverse position (FIG. 19).

FIGS. 20 and 20' are schematic block diagrams of an electronic control circuit used in the transmission mechanism according to this invention;

FIGS. 21 and 21' are similar to FIGS. 20 and 20' but shows a modifications of the electronic control circuit;

Figure 2:
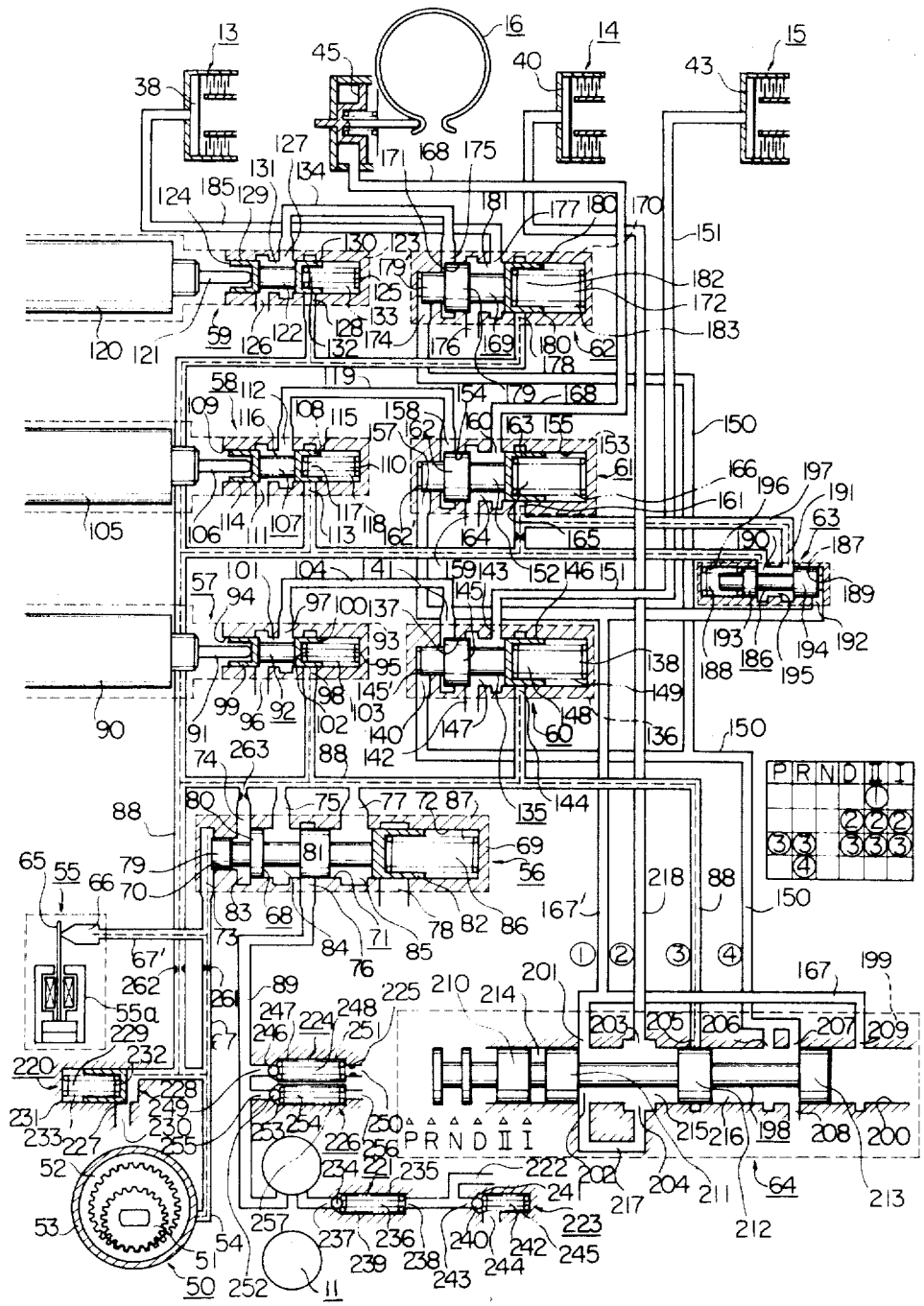
Figure 11:
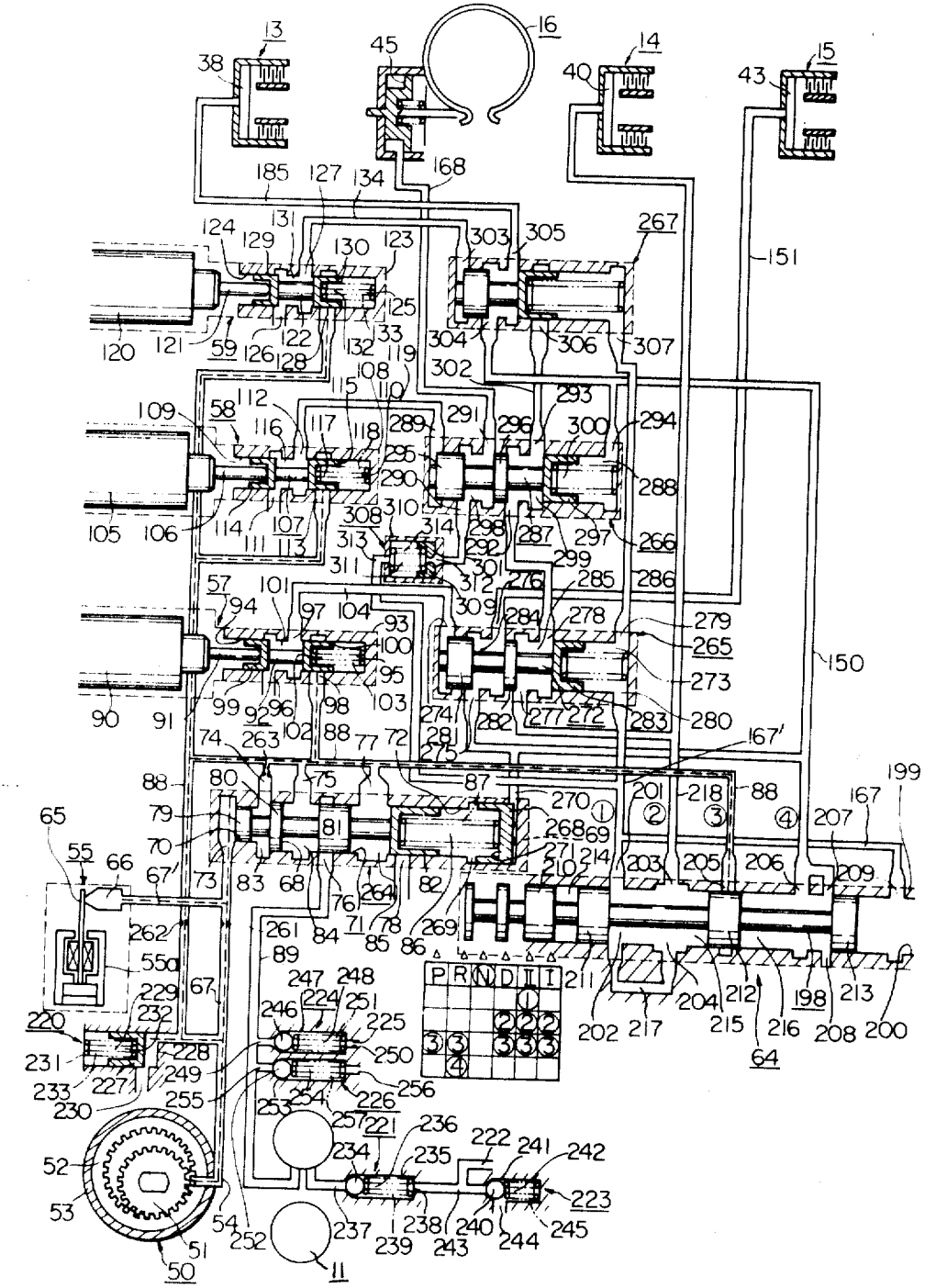
Figure 20:
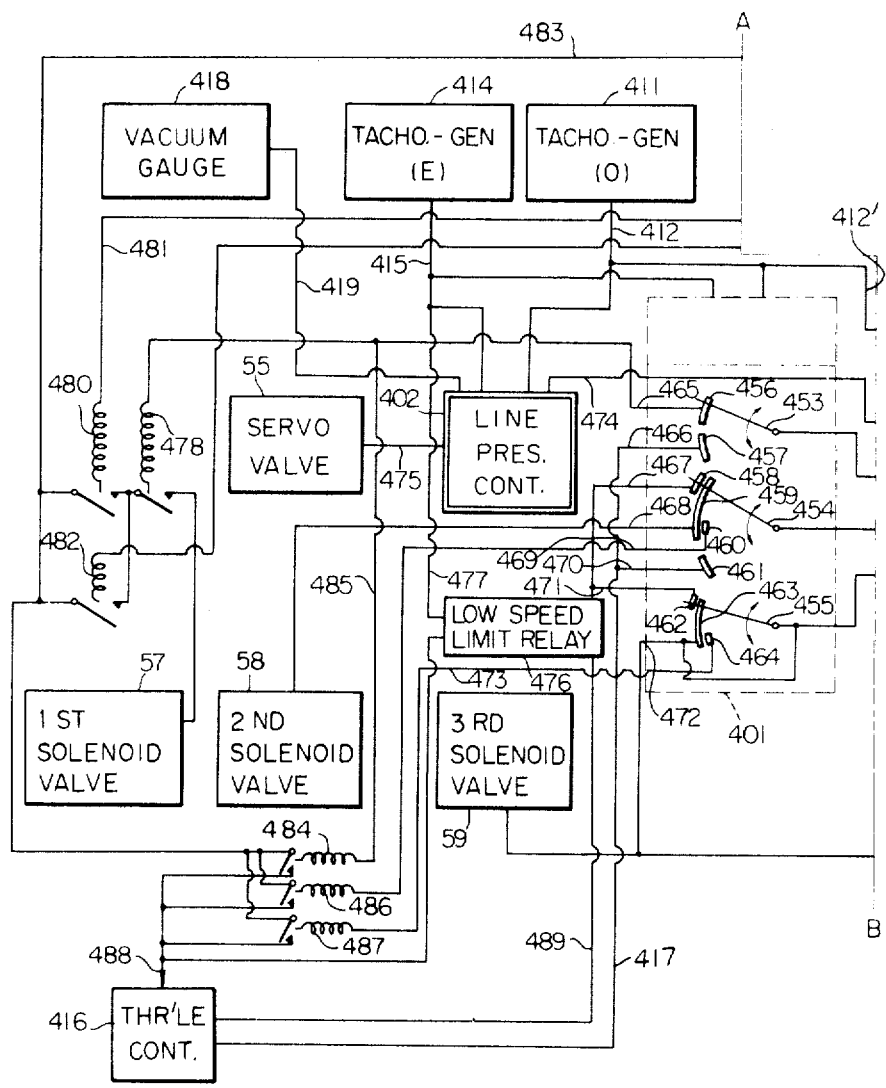
Figure 20:
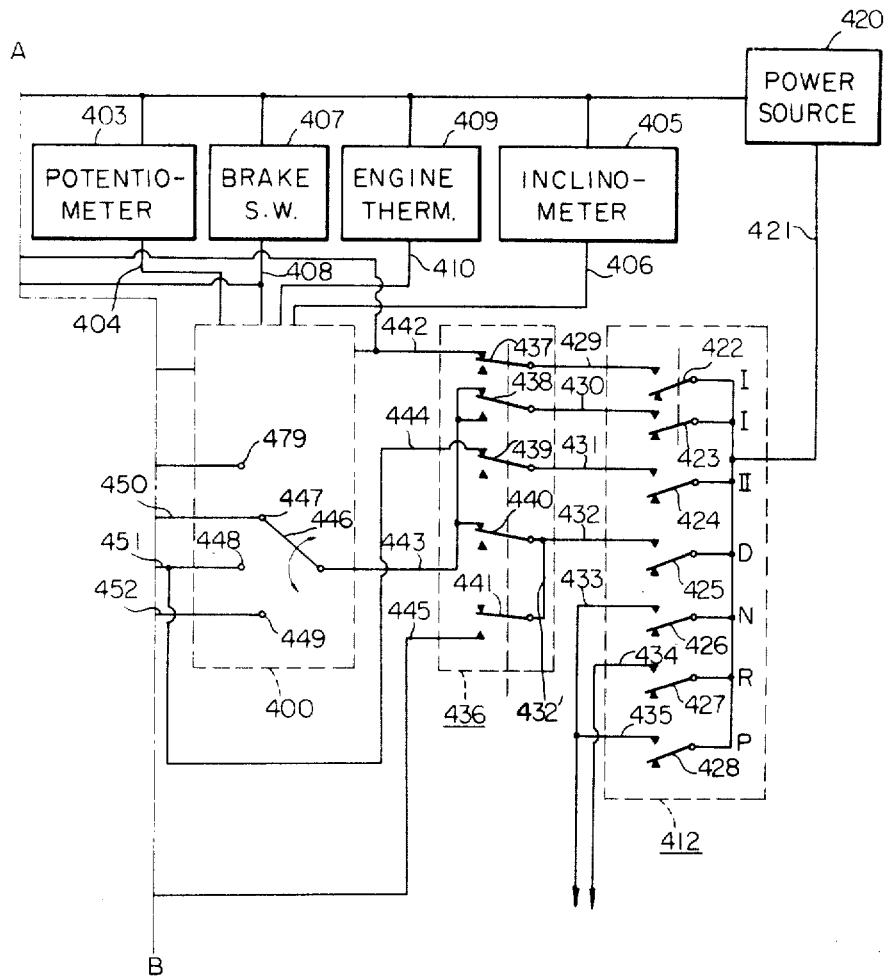
Figure 24A:
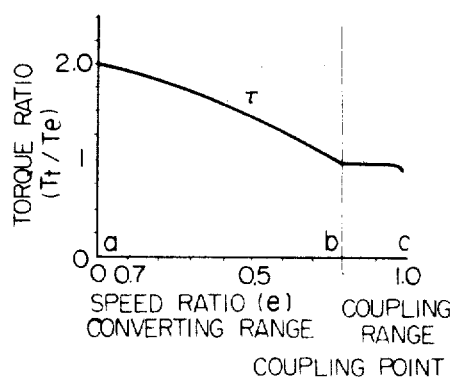
Figure 24B:
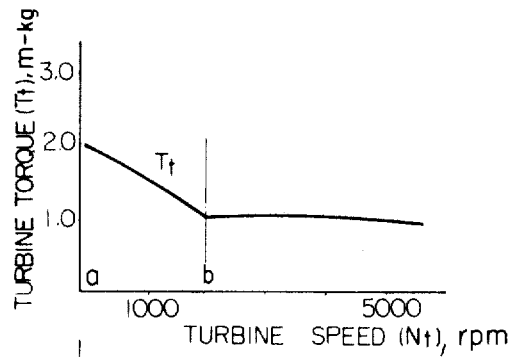
Figure 25A:
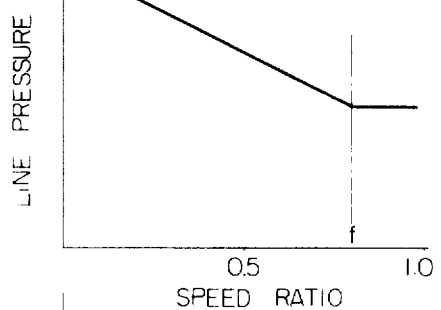
Figure 25B:
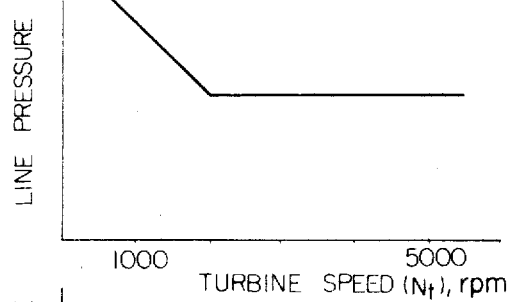
Figure 25C:
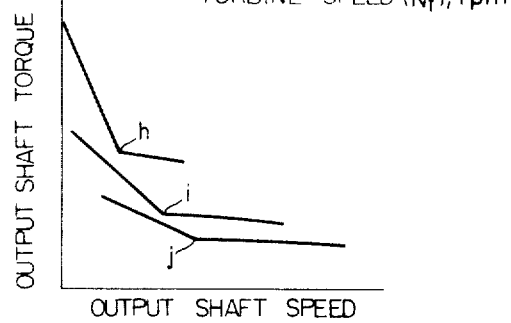
Figure 26:
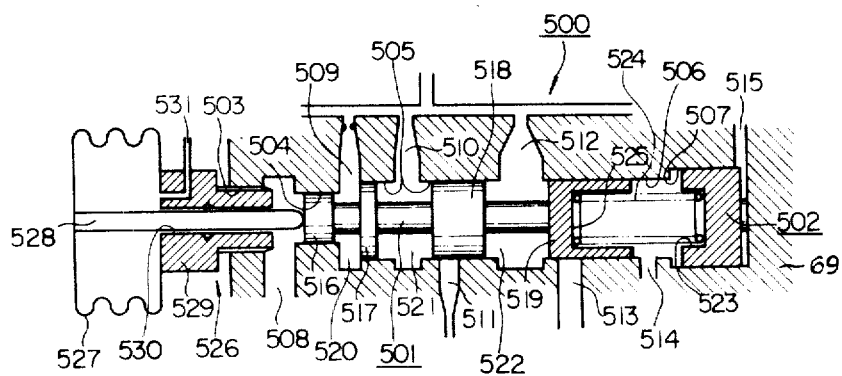
Figure 27:
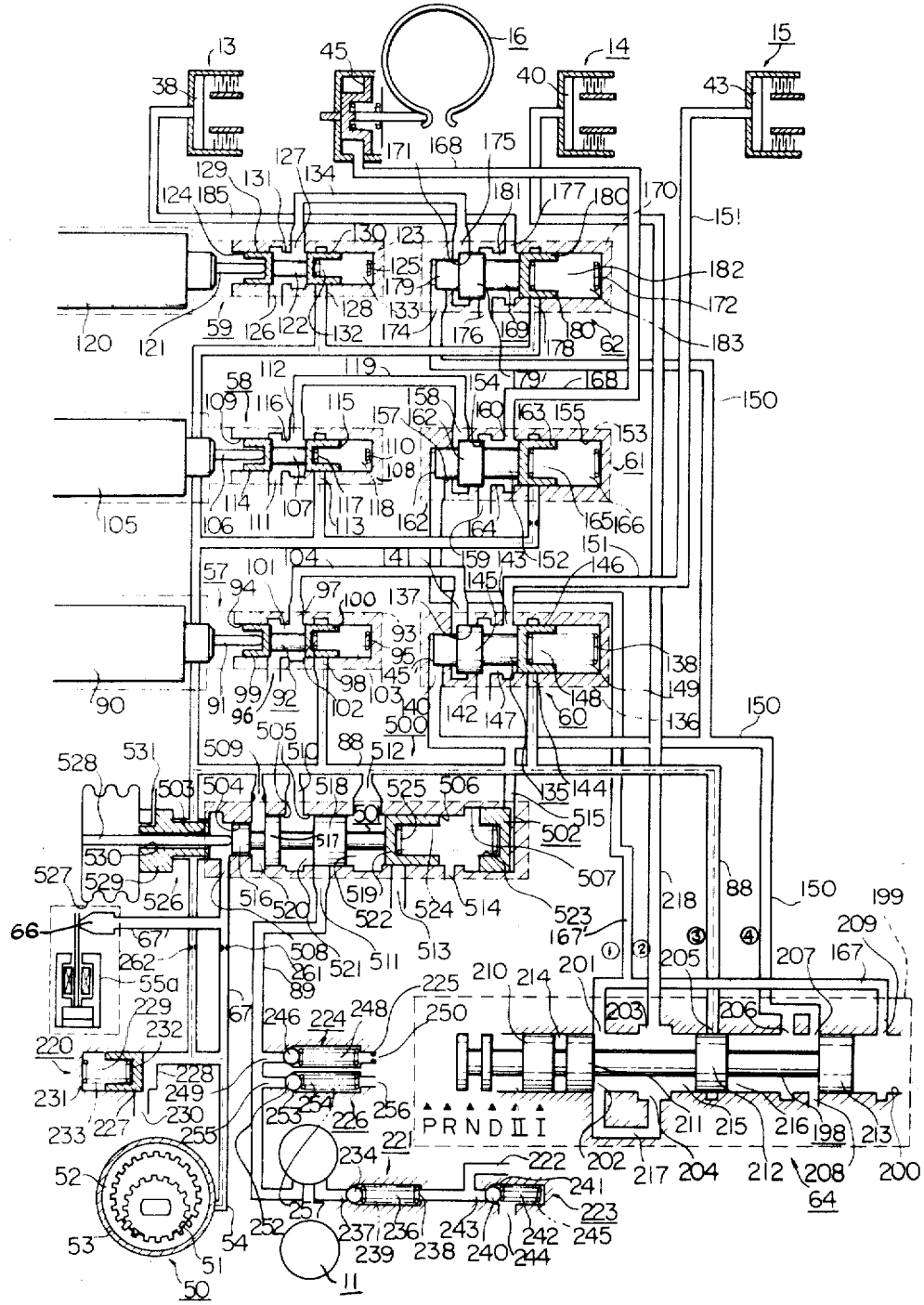
Figure 28:
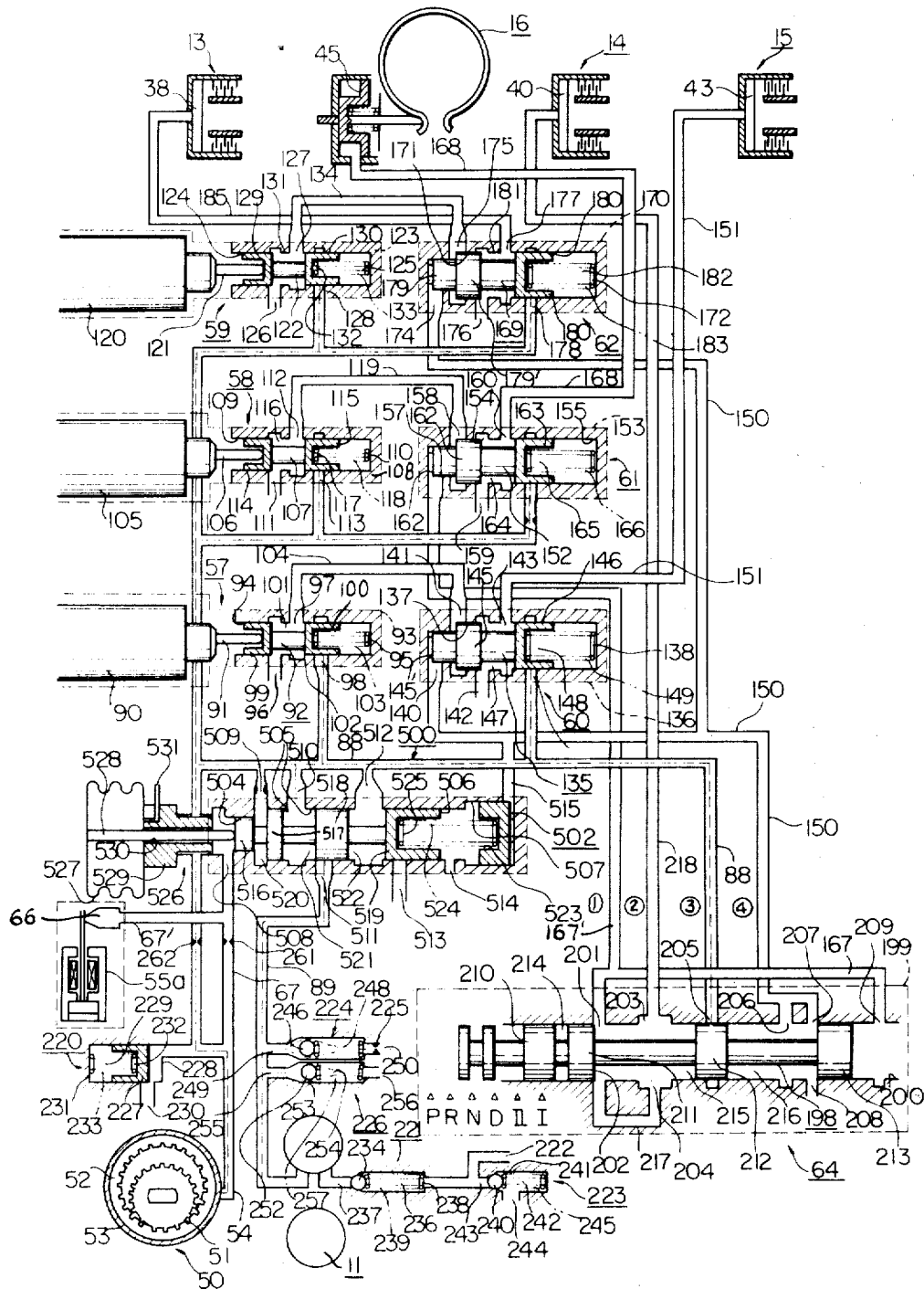
Figure 29:
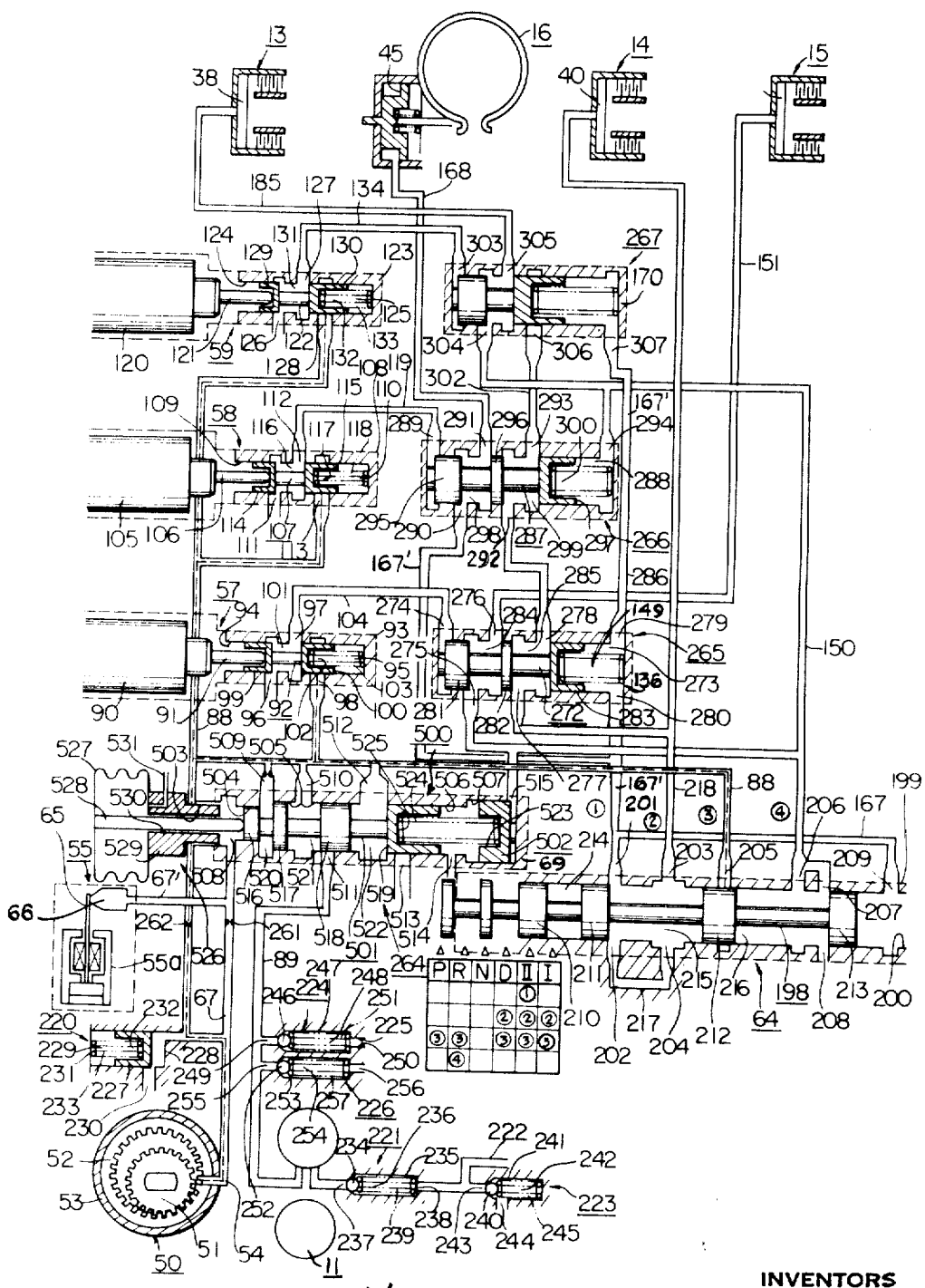
Figure 30:
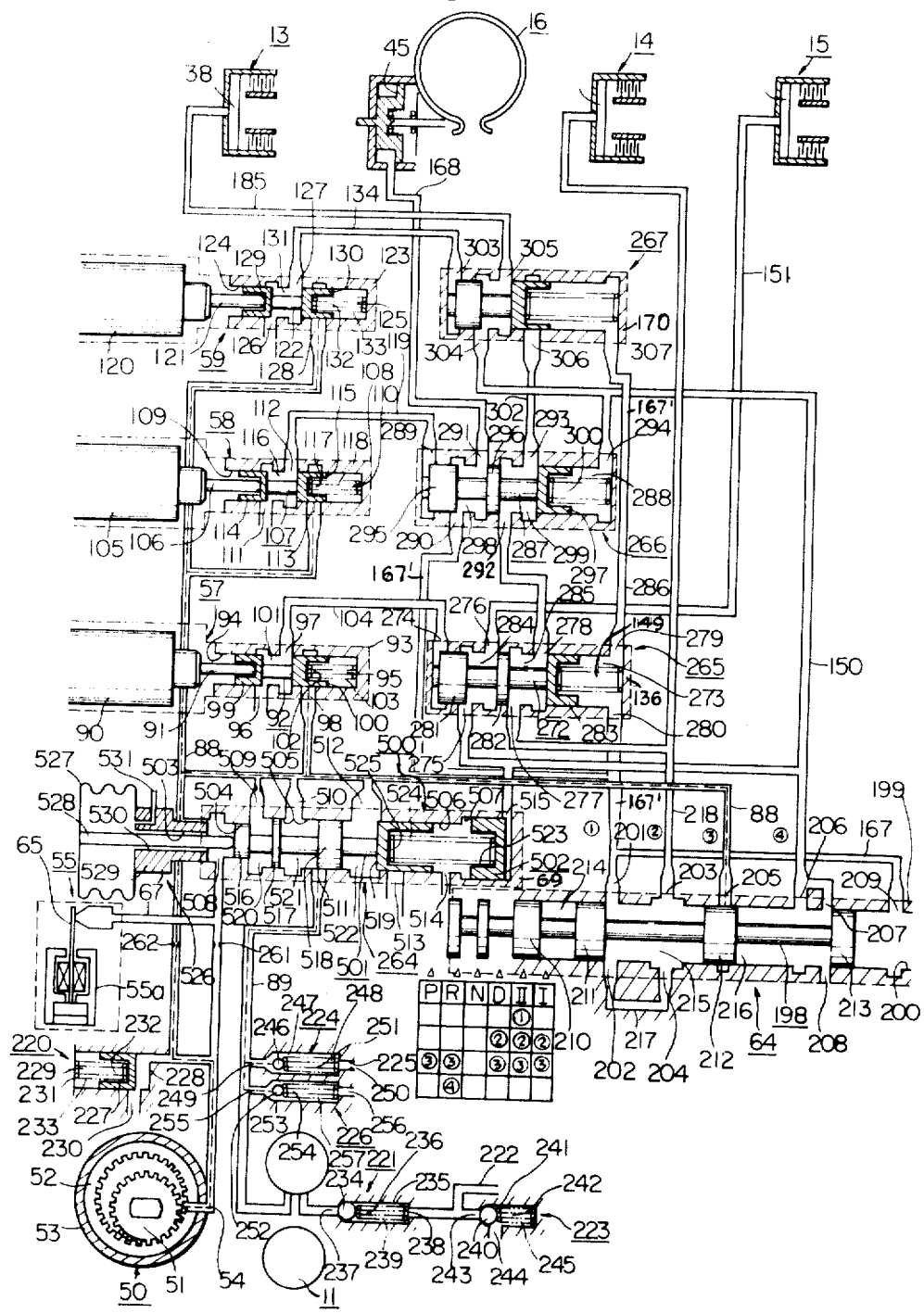

FIGS. 24a and 24b are graphical representations of the relationships between the torque ratio and speed ratio and between the turbine torque and turbine e of the torque converter, respectively; a–f–g–h–i FIGS. 25a, 25b and 25c are graphical representations of the relationships between the line pressure vs. speed ratio, between the line pressure vs. turbine speed, and between the torque vs. output shaft speed, respectively;

FIG. 26 is a sectional view of a regulator valve to be used in the electronic control circuit shown in FIG. 20;

FIGS. 27 and 28 are diagrams similar to FIG. 2 but showing an embodiment using the regulator valve shown in FIG. 26; and FIGS. 29 and 30 are diagrams similar to FIG. 11 but showing an embodiment using the regulator valve of FIG. 26.

In the drawings as identified above, like reference numerals and characters are assigned to like parts and elements.

The present invention will be herein described and shown as applied to an automatic transmission with three forward and one reverse speeds and as having a hydrodynamic torque converter and two planetary gear sets, by way of example only. It should, however, be understood that this invention is also appreciable to transmissions having a centrifugal or an electromagnetic clutch and one or three or more planetary gear sets giving one or more forward and one reverse gear ratio without departing from the spirit and scope of the invention.

Figure 1:
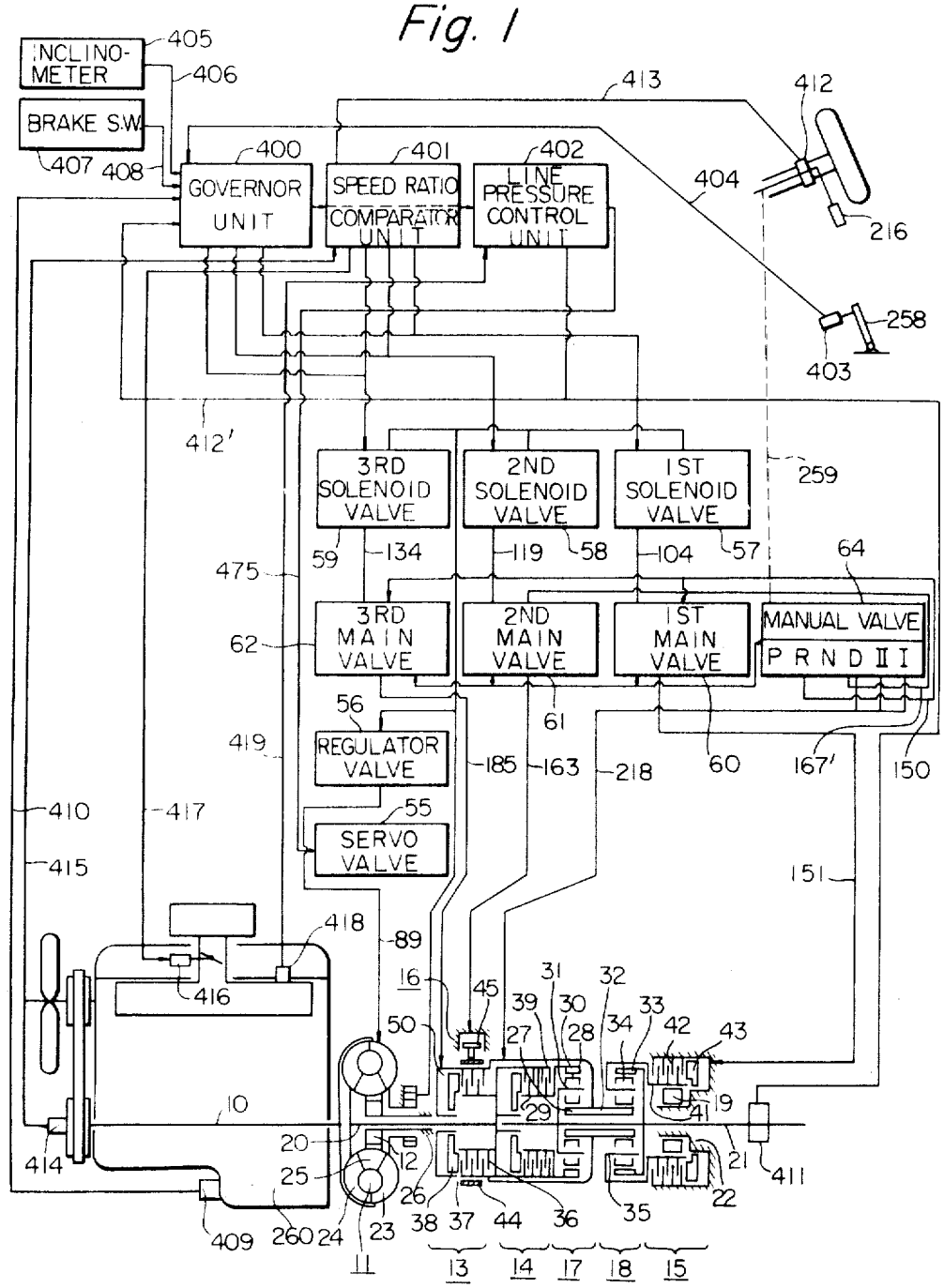

Referring now to FIG. 1, the transmission is shown to comprise a drive shaft 10 which may actually be a crankshaft of the engine, hydrodynamic torque converter 11 with a one-way brake 12, hydraulically operated friction clutches 13 and 14, hydraulically operated friction brakes 15 and 16, first and second planetary gear sets 17 and 18, respectively, one-way brake 19, intermediate or turbine shaft 20, and driven shaft 21 connected by any suitable means (not shown) with the driving wheels of the vehicle. The shafts 10, 20 and 21 are rotatably mounted with respect to the transmission housing 22 and the turbine shaft 20 is in alignment with the drive and driven shafts 10 and 21, respectively.

The hydraulic torque converter 11 comprises, as customary, a vaned impeller element or pump 23, vaned rotor driven element or turbine 24 and vaned reaction element or stator 25. The vaned elements 23 and 24 are accommodated in a fluid-tight casing (not shown) part of which is formed by the housing of the impeller 23. The impeller 23 is driven from the drive shaft 10. The turbine 24 is fixed to the turbine shaft 20, while the stator 25 is rotatably mounted on a stationary sleeve 26 which is fixed to the transmission casing 22. The one-way brake 12 is mounted between the stator 25 and the sleeve 26.

The one-way brake 12 may be of any suitable construction and is so arranged as to allow a free rotation of the stator 25 only in the forward direction of the vehicle, that is, in the direction in which the drive shaft 10 rotates but not in the reverse direction.

The torque converter 11 operates in a manner well known and functions to drive the turbine 24 with larger torque than the torque impressed on the impeller 23. The reaction on the stator 25 takes place in the direction opposite to the rotation of the drive shaft 10, so that the one-way brake 12 engages to prevent the rotation of the stator in this direction. When the speed of the rotor 24 reaches a predetermined value, the direction of reaction on the vanes of the stator 25 is varied, which consequently rotates in the forward direction, and the one-way brake 12 is released to allow the rotation of the stator. Here, the torque converter 11 serves simply as a fluid coupling to drive the turbine 24 at substantially the same speed and without increase in torque with respect to the impeller 23.

The first planetary gear set 17 comprises a sun gear 27 rotatable on the driven shaft 21, ring gear 28 connected with the driven portion 29 of the second clutch 14, a plurality of planet gears 30 and planet gear carrier 31 connected with the driven shaft 21. Each of the planet gears 30 is in mesh with the sun gear 27 and ring gear 28.

The second planetary gear set 18, similarly, comprises a sun gear 32 rotatable on the driven shaft 21 complete with the sun gear 27, ring gear 33 formed on the driven shaft 21, a plurality of planet gears 34 and planet gear carrier 35. The planet gears 34 are in mesh with the sun gear 32 and ring gear 33.

The first clutch 13 has its drive portion 36 connected with the sun gears 27 and 32 through a driven portion 37 connected thereto. This first clutch 13 also comprises an actuator 38 for engaging and disengaging the drive portion 36 with and from the driven portion 37 when a predetermined hydraulic pressure is applied and relieved, respectively.

The second clutch 14 also has its drive portion 39 connected with its driven portion 29 connected with the first ring gear 28. This second clutch 14 also comprises an actuator 40 for engaging and disengaging the drive portion 39 with and from the driven portion 29.

The second brake 15 has its drive portion 41 connected with the carrier 35 of the second planetary gear set 18 and with a driven portion 42 connected with the transmission housing 22. This second brake 15 also comprises an actuator 43 for engaging and disengaging the drive portion 41 with and from the driven portion 42.

The brake 16 has a brake band 44 around the driven portion 37 of the clutch 13 whereby the sun gears 27 and 32 are braked. This brake 16 also comprises an actuator 45 for engaging and disengaging the brake band 44 with and from the driven portion 37 when a predetermined hydraulic pressure is applied and relieved, respectively.

The one-way brake 19 may be of any suitable construction insofar as it functions to allow a free rotation of the drive portion 41 of the second brake 15 in the direction in which the drive shaft 10 rotates but not in the reverse direction.

In operation, the transmission is kept in a neutral position and provides low, intermediate and high speed ratios in the forward and reverse drive. When the transmission is in neutral position, the clutches 13 and 14 and the brakes 15 and 16 are in their disengaged positions.

In FIG. 1, the hydraulic control circuit or system for the transmission has an oil pump 50 to supply a hydraulic pressure to the hydraulic control system as will be described in detail. This pump 50 may be of any suitable construction but usually comprises, as clearly seen in FIG. 2, an inner gear 51 and an outer gear 52 partially meshing with the former. The inner gear 51 is driven from the drive shaft 10. The inner and outer gears 51 and 52, respectively, are mounted in a pump casing 53 fixed relative to the transmission housing 22. The inner gear 51 is driven by the pump 23 of the torque converter 11 in the same direction as the engine rotates so that the outer gears 52 accordingly rotates in this direction. The oil pump 50 is thus caused to pump from an oil reservoir (not shown) to a discharge conduit 54 as seen in FIG. 2.

Referring more specifically to FIG. 2, the hydraulic control system has, in addition to the oil pump 50, a servo valve 55 controlled by an electronic control circuit of hereinafter described construction for controlling the line pressure in response to a change in the torque of the engine by means of a signalling hydraulic pressure. The hydraulic control also has a regulator valve 56 for regulating the line pressure in accordance with the hydraulic pressure signal supplied from the servo valve 55. A first, second and third solenoid valves 57, 58 and 59, respectively, are also provided, which are controlled by the electronic control circuit in response to changes in the engine and vehicle speeds. A first main valve 60 is provided to apply and relieve the fluid pressure to and from the actuator 43 of the second or low-and-reverse brake 15 when the first solenoid valve 57 is energized to permit the first solenoid valve 57 to pass the fluid pressure to the first main valve 60. A second main valve 61 is provided to apply and relieve the fluid pressure to and from the actuator 45 of the brake 16 when the second solenoid valve 58 is energized, to permit the second solenoid valve 58 to pass the fluid pressure flows to the second main valve 61. A third main valve 62 is also provided to apply and relieve the fluid pressure to and from the actuator 38 of the first or front clutch 13 when the third solenoid valve 59 is energized to permit the third solenoid valve 59 to pass the fluid pressure to the main valve 62. Designated by 63 is a check valve. The hydraulic control system further comprises a manual selector valve 64 whereby the transmission is selectively shifted to different positions such as the neutral position N, parking position P, drive position D, second position II, first position I, and reverse position R.

The servo valve 55 has a torque motor 55a for actuating a flapper 65 to open or close an inlet to a nozzle 66 when energized by the electronic control system as will be described. The hydraulic pressure in the nozzle 66 is thus varied so that a regulated pressure is applied to the regulator valve 56 through a conduit 67 as a signalling hydraulic pressure.

The regulator valve 56 has a spool 68 slidably mounted in a casing 69 thereof. The casing 69 has formed therein cylindrical cavities 70, 71 and 72. The cavity 70 is smaller in diameter than the others. The cylindrical cavities communicate with ports 73, 74, 75, 76, 77 and 78. The spool 68 comprises a series of lands 79, 80, 81 and 82 and a series of grooves 83, 84 and 85 formed between the lands. The spool 68 is accommodated within the casing 69 with the land 79 in sliding contact with the wall of the cavity 70, the lands 80 and 81 in sliding contact with the wall of the cavity 71 and the land 82 in sliding contact with the wall of the cavity 72. The land 82 has provided therein a cavity 86 and a spring 87 is mounted in this cavity 86 as shown.

The port 73 communicates by way of the conduit 67 with the nozzle 66 and with the conduit 54 leading from the oil pump 50. The ports 74, 75 and 77 communicate with a conduit 88 which serves as a source of regulated fluid pressure to be supplied to the actuators for the brakes and clutches, as will be described. Thus, the conduit 88 communicates with the conduit 67. The port 76 communicates with the torque converter 11 by way of a conduit 89 while the port 78 is relieved to an oil sump (not shown).

The first solenoid valve 57 comprises solenoid coil 90, plunger 91 mounted in the solenoid coil 90 and projecting therefrom, and spool 92 slidably mounted in a casing 93 of the solenoid valve. The casing 93 has provided therein cylindrical cavities 94 and 95 of the same diameter. The cylindrical cavities 94 and 95 communicate with ports 96, 97 and 98. The spool 92 comprises lands 99 and 100 and a groove 101 formed between the two lands. The spool 92 is accommodated axially slidably within the casing 93 with its land 99 in sliding contact with the wall of the cavity 94 and land 100 in sliding contact with the wall of the cavity 95. The land 100 has provided therein a cavity 102 which, in turn, receives a spring 103 therein, as shown. The port 96 is relieved to an oil sump (not shown). The port 97 is opened to a conduit 104 while the port 98 communicates with the conduit 88.

The second solenoid valve 58 comprises a solenoid coil 105, plunger 106 mounted in the solenoid coil 105, and spool 107 slidable mounted in a casing 108 of the solenoid valve. The casing 108 has provided therein cylindrical cavities 109 and 110 of the same diameter. The cylindrical cavities communicate with ports 111, 112 and 113. The spool 107 comprises lands 114 and 115 and a groove 116 formed between the lands. The spool 107 is slidably accommodated within the casing 108 with its land 114 in sliding contact with the wall of the cavity 109 and land 115 in sliding contact with the wall of the cavity 110. The land 115 has provided therein a cavity 117 which receives a spring 118 therein. The port 111 is relieved to an oil sump (not shown). The port 112 is opened to a conduit 119 and the port 113 communicates with the conduit 88.

The third solenoid valve 59 also comprises a solenoid coil 120, plunger 121 mounted in the solenoid coil 120, and spool 122 slidably accommodated in the casing 123. The casing 123 has formed therein cylindrical cavities 124 and 125 of the same diameter. The cylindrical cavities communicate with ports 126, 127 and 128. The spool 122 comprises lands 129 and 130 and a groove 131 formed between the lands. The spool 122 is accommodated slidably within the casing 123 with its land 129 in sliding contact with the wall of the cavity 124 and land 130 in sliding contact with the wall of the cavity 125. The land 130 has formed therein a cavity 132 which receives a spring 133 therein. The port 126 is relieved to an oil sump (not shown). The port 127 is led to a conduit 134 and the port 128 communicates with the conduit 88.

The first main valve 60 has a spool 135 slidable accommodated in a casing 136 of the valve 60. The casing 136 has formed therein cylindrical cavities 137 and 138 of the same diameter. The cylindrical cavities 137 and 138 communicate with ports 140, 141, 142, 143 and 144. The spool 135 comprises lands 145 and 146 and a groove 147 formed between the lands. The spool 135 is accommodated within the casing 136 with its land 145 in sliding contact with the wall of the cavity 137 and land 146 in sliding contact with the wall of the cavity 138. The land 146 has formed therein a cavity 148 receiving therein a spring 149.

The port 140 communicates with a conduit 150 leading from the regulator valve 64 and the port 141 communicates through the conduit 104 with the port 97 of the first solenoid valve 57. The port 142 is relieved to an oil sump (not shown). The port 143 leads to the actuator 43 of the brake 15 through a conduit 151. The port 144 communicates with the conduit 88.

The second main valve 61 has a spool 152 slidably accommodated in a casing 153 of the valve 61. The casing 153 has formed therein cylindrical cavities 154 and 155 of the same diameter. The cylindrical cavities 154 and 155 communicate with ports 157, 158, 159, 160 and 161. The spool 152 comprises lands 162 and 163 and a groove 164 formed between the lands. The spool 152 is axially slidably accommodated in the casing 153 with its land 162 in sliding contact with the wall of the cavity 154 and land 163 in sliding contact with the wall of the cavity 155. The land 163 has provided therein a cavity 165 receiving therein a spring 166.

The port 157 communicates with a conduit 167 leading from the regulator valve 64 and from the check valve 63. The port 158 communicates through the conduit 119 with the port 112 of the second solenoid valve 58. The port 159 is relieved to an oil sump (not shown). The port 160 is led to the actuator 45 of the brake 16 through a conduit 168.

The third main valve 62 has a spool 169 slidably mounted in the casing 170 of the valve 62. The casing 170 has formed therein cylindrical cavities 171 and 172 of the same diameter. The cylindrical cavities 171 and 172 communicate with ports 174, 175, 176, 177 and 178. The spool 169 comprises lands 179 and 180 and a groove 181 formed between the lands. The spool 169 is axially slidably accommodated in the casing 170 with its land 179 in sliding contact with the wall of the cavity 171 and the land 180 in sliding contact with the wall of the cavity 172. The land 180 has formed therein a cavity 182 receiving therein a spring 183.

The port 174 communicates with the conduit 150 and the port 175 communicates through the conduit 134 with the port 127 of the third solenoid valve 59. The port 176 is relieved to an oil sump (not shown). The port 177 is led to the actuator 38 of the clutch 13 through a conduit 185.

The check valve 63 has a spool 186 slidably accommodated in the casing 187 of the valve 63. The casing 187 has formed therein cylindrical cavities 188 and 189 of the same diameter. The cylindrical cavities 188 and 189 communicate with ports 190, 191 and 192. The spool 186 comprises lands 193 and 194 and a groove 195 formed between the lands. The spool 186 is axially slidably mounted within the casing 187 with its land 193 in sliding contact with the wall of the cavity 188 and land 194 in sliding contact with the wall of the cavity 189. This check valve 63 also has a spring 196 mounted between the land 192 and the adjacent end of the cavity 188.

The port 190 communicates with the conduit 88 and the port 191 with the port 161 of the second main valve 61 through a conduit 197. The port 192 communicates with the conduit 167.

The manual selector valve 64 has a spool 198 slidably accommodated in the casing 199 of the valve 64. The casing 199 has formed therein a cylindrical cavity 200. The cylindrical cavity 200 communicates with ports 201, 202, 203, 204, 205, 206, 207, 208 and 209. The spool 198 has lands 210, 211, 212 and 213 and grooves 214, 215 and 216 separating the lands.

The port 201 communicates with the conduit 167 which, in turn, communicates with the port 157 of the second main valve 61 and with the port 192 of the check valve 63. The port 202 communicates with the port 204 through a conduit 217. The port 203 is led to the actuator 40 of the clutch 14 through the conduit 218, the port 204 with the conduit 217, and the port 205 with the conduit 88. The ports 206 and 207 communicate with the conduit 150. The port 208 is relieved to a sump (not shown). The port 209 communicates with the conduit 167.

The selector valve spool 197 of the manual selector valve 64 is operated under the control of a selector lever 216 (FIG. 1) and is moved to assume various positions. The lever 216 has the positions including parking P, reverse R, neutral N, drive range D, second range II, and first range I, and the spool 195 has corresponding positions.

The hydraulic control system further comprises a relief valve 220 for releasing the excess pressure from the fluid pressure supply conduit into the sump (not shown) when the pressure exceeds a predetermined level, and a relief valve 221 for keeping constant the fluid pressure in the torque converter 11. A conduit 222 is provided for supplying the fluid pressure to the transmission for lubrication thereof. A relief valve 223 releases the lubrication pressure to the transmission through the conduit 222 when the pressure exceeds a predetermined level and a relief valve 224 releases the fluid pressure in the conduit 89 leading from the port 76 of the regulator valve 56 to the torque converter 11. An orifice 225 is provided for restricting the flow rate of the fluid supplied to the transmission. A relief valve 226 releases the fluid pressure in the conduit 89 when the fluid pressure exceeds a predetermined maximum level.

The relief valve 220 has a spool 227 slidably accommodated in a casing 228 of the valve 220. The casing 228 has formed therein a cylindrical cavity 229. The cylindrical cavity 229 communicates with ports 230 and 231. The spool 227 has formed therein a cavity 232 receiving therein a spring 233.

The relief valve 221 has a check ball 234 slidably mounted in a casing 235 of the valve 221. The casing 235 has formed therein a cylindrical cavity 236. The cylindrical cavity 236 communicates with ports 237 and 238. The relief valve 221 also has a spring 239 mounted between the check ball 234 and the opposite end of the cavity 236, as shown.

The relief valve 223 has a check ball 240 slidably mounted in a casing 241 of the valve 223. The casing 241 has formed therein cylindrical cavity 242. The cylindrical cavity 242 communicates with ports 243 and 244. The relief valve 223 also has a spring 245 mounted between the check ball 240 and the opposite end of the cavity 242.

The relief valve 224 has a check ball 246 slidably mounted in a casing 247 of the valve 224. The casing 247 has formed therein cylindrical cavity 248. The cylindrical cavity 248 communicates with ports 249 and 250. The relief valve 224 also has a spring 251 mounted between the check ball 246 and the opposite end of the cavity 248. The orifice 225 is provided in the conduit communicating with the port 250 of the relief valve 224 controlling the flow rate of the fluid supplied to the transmission.

The relief valve 226 also has a check ball 252 slidably mounted in a casing 253 of the valve 226. The casing 253 has formed therein cylindrical cavity 254. The cylindrical cavity 254 communicates with ports 255 and 256. The relief valve 226 also has a spring 257 mounted between the check ball 252 and the opposite end of the cavity.

In operation, the transmission and its hydraulic control system are controlled by means of an accelerator pedal 258 (FIG. 1) and manual selector lever 216. The manual selector lever 216 has six different positions including the parking position P, reverse position R, neutral position N, drive range position D, second range position II, and first range position I. The spool 198 of the manual selector valve is connected with the selector lever 219 by means of a linkage 259 so that the spool 198 has positions corresponding to those of the selector lever 219. The transmission is set for various modes of operation by manipulating the selector lever 216 and manual selector valve spool 198 connected therewith.

The transmission is maintained in its neutral position with the manual selector valve spool 198 held in its neutral position as shown in FIG. 2. In this position of the transmission and its hydraulic control system, the accelerator pedal 258 is assumed to be in its closed throttle position. However, depressing the accelerator toward its open-throttle position, when the manual selector valve spool 198 is in this position, does not effect the transmission to complete a power drive therethrough.

The engine 260 of the vehicle is started with the selector lever 216 and accordingly the selector valve spool 198 shifted to their neutral positions. Before the engine starts to run, however, no fluid pressure is built up in the hydraulic system since the oil pump 50 is driven from the pump 23 of the torque converter 11. When the engine 260 begins operating, the oil pump 50 driven by the torque converter 11 builds up a line pressure in the conduit 54. The fluid pressure thus delivered from the conduit 54 of the oil pump 50 is divided into two parts: one converted into a signalling fluid pressure at the servo valve 55 and then applied through the conduit 67 and an orifice 261 provided in the conduit 67 to the port 73 of the regulator valve 56; and the other passed through an orifice 262 in the conduit 88 and then divided further into three parts: a first one supplied to the first, second and third solenoid valves 57, 58 and 59, a second one supplied through the main valves 60, 61 and 62 to the actuators of the friction elements (this fluid pressure is called line pressure which should be controlled properly as will hereinafter be described in detail), and a third one supplied through the conduit 88 to the port 75 of the regulator valve 56 for controlling the line pressure by the signalling fluid pressure derived from, and in response to the operation of, the servo valve 55 which is controlled by an electronic control system. Thus, if the line pressure is higher than a predetermined level, the regulator valve 56 assumes such a position as to open the port 76, causing the fluid pressure to be released through the conduit 89. The oil discharged through the port 76 of the regulator valve 56 is fed through the conduit 89 and torque converter 11 to the transmission for lubrication thereof. In this manner, the amount of the oil fed through the conduit 88 can be sufficient to further actuate the friction elements while the oil is utilized for the lubrication of the transmission as well. The fluid pressures fed from the oil pump 50 through the solenoid valves 57, 58 and 59 are supplied to the ports 141, 158 and 175 of the main valves 60, 61 and 62, respectively. This fluid pressure is electronically controlled and supplied to the main valves by means of the electronic control system as will hereinafter be described.

When, now, the first solenoid valve 57 is energized, then the line pressure fed through the conduit 88 from the oil pump 50 is supplied as a signalling fluid pressure to the port 141 of the first main valve 60 through the port 98, groove 101 of the spool 92 and port 97, so that the spool 135 of the main valve 60 is forced rightwardly of the drawing. This causes the port 144 of the main valve 60 to open so that the line pressure is passed through the groove 147 and port 143 of the main valve 60 to the actuator 43 of the brake 15 en route the conduit 151.

When the second solenoid valve 58 is energized, the line pressure fed through the conduit 88 from the oil pump 50 is supplied as a signalling fluid pressure to the port 158 of the second main valve 61 through the port 113, groove 116 of the spool 107 of the solenoid valve 58 and port 112 so that the spool 152 of the main valve 61 is moved rightwardly of the drawing. This causes the port 161 of the main valve 61 to open so that the line pressure is passed to the actuator 45 of the brake 16 through the groove 164 and the port 160 of the main valve 61 and conduit 168.

When the third solenoid valve 59 is energized, the line pressure fed through the conduit 88 from the oil pump 50 is passed as a signalling fluid pressure to the port 175 of the third main valve 62 through the land 128, groove 131 of the spool 122 of the solenoid valve 59 and port 127 so that the spool 169 of the main valve 62 is moved rightwardly of the drawing. This causes the port 178 of the main valve 62 to open so that the line pressure is passed to the actuator 38 of the clutch 13 through the groove 181, port 177 of the main valve 62 and conduit 185.

In the neutral position of the transmission and hydraulic system as illustrated in FIG. 2, the fluid pressure delivered from the oil pump 50 is passed through the conduits 67 and 88 is shut off at the port 205 of the selector valve 64. The conduit 167 is thus permitted to communicate through the port 209 of the selector valve 64 with the oil sump (not shown). The conduit 218 also communicates through the port 203, groove 215, port 201 and conduit 167 with the oil sump. The conduit 150 communicates through the ports 206 and 207, groove 216 and port 208 with the oil sump.

The servo valve 55 functions to produce a signalling fluid pressure to the port 73 of the regulator valve 56 through the conduit 67 when the torque motor 64 is energized to actuate the flapper 65 to open or close the nozzle 66 when it is energized by an electronic control system in a manner hereinafter described.

The regulator valve 56 functions to regulate the line pressure in the conduit 88 communicating with the port 75 thereof. Thus, the sum of the signalling fluid pressure applied to the end face of the land 79 through the port 73 of the regulator valve 56 plus the line pressure in the conduit 88 applied through an orifice 74' and the port 74 to the end faces of the lands 80 and 79 becomes balance with the tension of the spring 87 as applied from the opposite side of the land 82. If the line pressure exceeds a predetermined level, then the spool 68 moves rightwardly of the drawing so that the port 76 is opened. Thus, the line pressure fed through the port 75 is relieved through the port 76. If the line pressure decreases below a predetermined level, the spool 68 moves leftwardly of the drawing so that the port 76 is closed. The line pressure fed through the port 75 is thus shut off at the port 76 and is increased accordingly. If the signalling fluid pressure fed from the nozzle 66 of the servo valve 55 through the conduit 67 and port 73 of the regulator valve 56 decreases, then the spool 68 of the regulator valve 56 moves leftwardly of the drawing to cause the port 76 to be closed so that the line pressure is increased.

Even if a failure is involved in the servo motor 55a of the servo valve 55 to cut off the electric current to cause the nozzle 66 to become unduly wide open, the line pressure is thus prevented from lowering excessively. If the line pressure increases in excess of a predetermined pressure for one reason or another, then the spool 68 moves further rightwardly of the drawing to cause the line pressure to be relieved through the port 77, groove 85 and port 78 of the regulator valve 56, thereby maintaining the line pressure at a proper level.

If the line pressure in the conduit 67 communicating with the conduit 54 from the oil pump 50 increases excessively, then the port 230 of the relief valve 220 is opened and the line pressure in the conduit 57 relieved to the oil sump (not shown) through the port 230. In this instance the spool 227 is moved by the line pressure leftwardly of the drawing against the action of the spring 233 which is set to overcome a certain pressure before the port 230 opens. The line pressure is prevented from increasing.

The relief valve 221 serves to keep the fluid pressure in the conduit 89 communicating at all times with the torque converter 11 thereby to supply the oil to the transmission through the conduit 222 for lubrication thereof.

The relief valve 223 on the other hand serves to relieve the fluid pressure to the transmission through the conduit 222 when the fluid pressure exceeds a predetermined level.

The relief valve 224 serves to relieve the fluid pressure in the conduit 89 to the transmission through the orifice 225 for restricting the flow rate of the fluid passed to the transmission.

The relief valve 226 serves to relieve the line pressure in the conduit 89 when the fluid pressure exceeds a predetermined level.

The first solenoid valve 57 operates in such a manner that the spool 92 is forced rightwardly of the drawing by the plunger 91 when the solenoid coil 90 is energized when the vehicle is intended to run at a low speed. As a result, the line pressure applied to he port 98 of the first solenoid valve 57 and the signalling fluid pressure are fed through the groove 101, port 97 and conduit 104 to the port 141 of the first main valve 60 since the port 98 is kept open. When the solenoid coil 90 of the solenoid valve 57 is not energized, the spool 92 is moved leftwardly of the drawing by the action of the spring 103 so that the conduit 104 communicating with the port 97 of the solenoid valve 57 is permitted to communicate with the oil sump through the port 96, relieving the fluid pressure in the conduit 104.

The second solenoid valve 58, on the other hand, operates in such a manner that the spool 107 is forced rightwardly of the drawing by the plunger 106 when the vehicle is intended to run at an intermediate speed. The line pressure applied to the port 113 of the second solenoid valve 58 and the signalling fluid pressure are fed through the groove 116, port 112 and conduit 119 to the port 158 of the second main valve 61 since the port 113 is kept open. When the solenoid coil 105 of the solenoid valve 58 is not energized, the spool 107 is moved leftwardly of the drawing by the action of the spring 118 so that the conduit 119 communicating with the port 112 of the solenoid valve 58 is permitted to communicate with the oil sump. Thus, the fluid pressure in the conduit 119 is relieved.

The third solenoid valve 59 operates in such a manner that the spool 122 is forced rightwardly of the drawing by the plunger 121 when the vehicle is intended to run at a high speed. The line pressure applied to the port 128 of the third solenoid valve 59 and the signalling fluid pressure are fed through the groove 131, port 127 and conduit 134 to the port 175 of the third main valve 62. When the solenoid coil 120 of the solenoid valve 59 is not energized, then the spool 122 is moved leftwardly of the drawing by the action of the spring 133 so that the conduit 134 communicating with the port 127 of the solenoid valve 59 is permitted to communicate with the oil sump through the port 126. The fluid pressure in the conduit 134 is thus released.

When, now, the solenoid coil 90 of the first solenoid valve 57 is energized, then the fluid pressure is passed from the port 97 of the first solenoid valve 57 to the port 141 of the first main valve 57 through the conduit 104. As a result, the spool 135 is moved rightwardly of the drawing under the influence of the fluid pressure applied from the first solenoid valve 90 through the conduit 104 to the end face of the land 145 of the spool 135 against the action of the spring 103. This causes the port 144 to open and communicate with the conduit 151 and accordingly with the actuator 43 of the brake 15. Thus, the first main valve 60 serves to pass the line pressure in the conduit 88 to the actuator 43 through the port 143 and conduit 151.

When, however, the solenoid coil 90 of the first solenoid valve 57 remains deenergized, the fluid pressure is applied neither to the port 11 nor to the end face of the land 145. Thus, the spool 135 of the first main valve 60 is moved leftwardly of the drawing by the action of the spring 149 so that the conduit 151 communicating with the actuator 43 of the brake 15 further communicates with the oil sump through the port 143, groove 147 and port 142 of the first main valve 60. The fluid pressure applied to the actuator 43 of the brake 15 is thereby relieved.

When the solenoid coil 105 of the second solenoid valve 58 is energized, then the fluid pressure is passed from the port 112 of the second solenoid valve 58 to the port 158 of the second main valve 61 through the conduit 119. The spool 152 is moved rightwardly of the drawing under the influence of the fluid pressure applied from the second solenoid valve 58 through the conduit 119 to the end face of the land 162 of the spool 152 against the action of the spring 166. The port 161 is thus opened and communicates with the conduit 168 and accordingly with the actuator 45 of the brake 16 through the groove 164 and port 160. Thus, the second main valve 61 serves to pass the line pressure in the conduit 88 to the actuator 45 through the port 160 and conduit 168.

When, however, the solenoid coil 105 of the second solenoid valve 58 is deenergized, the fluid pressure is applied to the port 159 so that the spool 152 of the second main valve 61 is moved leftwardly of the drawing by the action of the spring 166 so that the conduit 168 communicating with the actuator 45 of the brake 16 further communicates with the oil sump through the port 160, groove 164 and port 159 of the second main valve 61. The fluid pressure applied to he actuator 45 of the brake 16 is thus relieved.

When the solenoid coil 120 of the third solenoid valve 59 is energized, then the fluid pressure is passed from the port 127 of the third solenoid valve 59 to the port 175 of the third main valve 62 through the conduit 134. The spool 169 is moved rightwardly of the drawing under the influence of the fluid pressure applied from the third solenoid valve 59 through the conduit 134 to the end face of the land 179 of the spool 169 against the action of the spring 183. This causes the port 178 to open and communicate with the conduit 185 and accordingly with the actuator 38 of the clutch 13 through the groove 181 and port 177. Thus, the third main valve 62 serves to pass the line pressure in the conduit 88 to the actuator 38 through the port 177 and conduit 185.

When, however, the solenoid coil 120 of the third solenoid valve 59 is deenergized, the fluid pressure is not applied to the port 175 so that the spool 169 of the third main valve 62 is moved leftwardly of the drawing by the action of the spring 183 so that the conduit 185 communicating with the actuator 38 of the clutch 13 further communicates with the oil sump through the port 177, groove 181 and port 176 of the third main valve 62. The fluid pressure applied to the actuator 38 of the clutch 13 is thus relieved.

When the selector valve 64 is shifted to the position R and the fluid pressure is applied to the port 140 of the first main valve 60 from the conduit 88 through the port 205, groove 216 of the spool 198, port 206 and conduit 150, the spool 135 is moved rightwardly of the drawing under the influence of the fluid pressure applied form the conduit 150 to the end face of the spool 135 against the action of the spring 149. The port 144 is thus opened and communicates with he conduit 151 and accordingly the actuator 43 of the brake 15 through the groove 147 and port 143. Thus, the first main valve 60 serves to pass line pressure in the conduit 88 to the actuator 43 through the port 143 and conduit 151.

When the selector valve is shifted to the position R and the fluid pressure supplied from the conduit 88 is passed through the port 205, groove 216 of the spool 198, port 206 and conduit 150 to the port 174 of the third main valve 62, the spool 169 is moved rightwardly of the drawing under the influence of the fluid pressure applied from the conduit 150 to the end face of the spool 169 against the action of the spring 183 applied thereto from the opposite face of the land 180 of the spool 169. The port 178 is thus opened to communicate with the conduit 185 and accordingly the actuator 38 of the clutch 13 through the groove 181 and port 177. Thus, the third main valve 62 serves to pass the line pressure in the conduit 88 to the actuator 38 through the port 177 and conduit 185.

When the selector lever is shifted to the position II and the fluid pressure applied to he port 157 of the second main valve 61 from the conduit 88 through the port 205, groove 215 of the spool 198, port 204, conduit 217, port 202, port 201 and conduit 167 in this sequence, the spool 152 is moved rightwardly of the drawing under the influence of the fluid pressure applied from the conduit 167 connected with the selector valve 64 to the end face of the spool 152 against the action of the spring 166. The port 161 is thus opened and communicates with the conduit 168 and accordingly with the actuator 45 of the brake 16 through the groove 164 and the port 160. Thus, the second main valve passes line pressure in the conduit 88 to the actuator 45.

The manual selector valve 64 operates in a manner to select the passage of the line pressure supplied from the conduit 88 through the port 205 communicating with the selector valve 64 by means of the selector lever 219 with the linkage 259 mechanically connecting the spool 198 of the selector valve 64 with the lever 219. In the neutral position of the selector valve 64 as best seen in FIG. 2, the line pressure in the conduit 88 is shut off at the port 205 of the selector valve 64 by the land 212 of the spool 198 while the conduit 218 communicates with the oil sump through the port 203, groove 215 of the spool 198, port 201, conduit 167 and port 209. The conduit 167 also communicates with the oil sump through the conduit 167' and port 209 of the selector valve 64 and the conduit 150 communicates with the oil sump through the port 208 of the selector valve 64.

Figure 3:
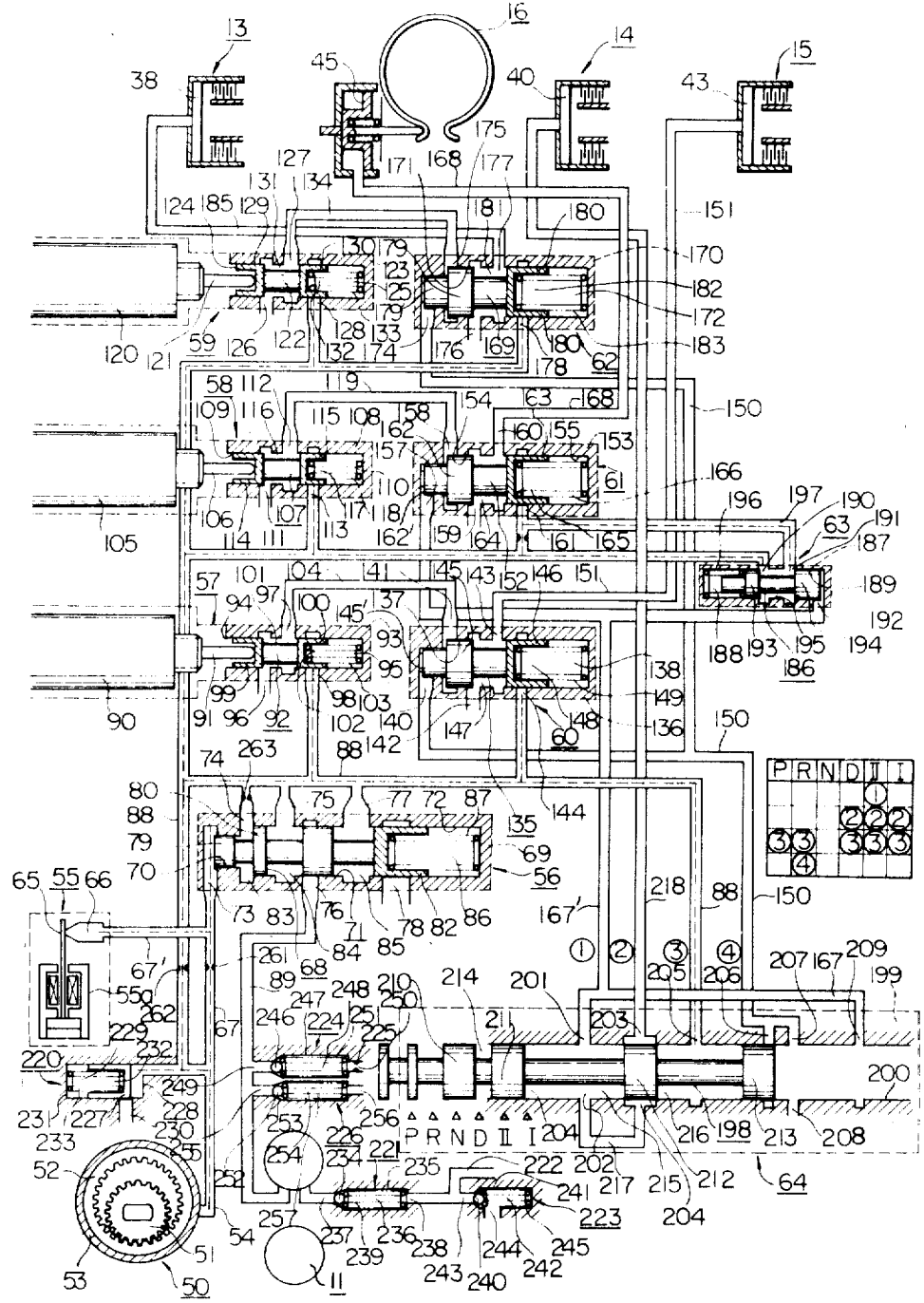

In the parking position of the selector valve 64 as shown in FIG. 3, the line pressure in the conduit 88 is also shut off from the groove 216 of the spool 198. The conduit 218 is also shut off at the port 203 of the selector valve 64 while the conduit 167 is relieved to the oil sump through the conduit 167' and port 209, and the conduit 150 communicating with the port 207 of the selector valve 64 is relieved with the oil sump through the port 208.

Figure 4:
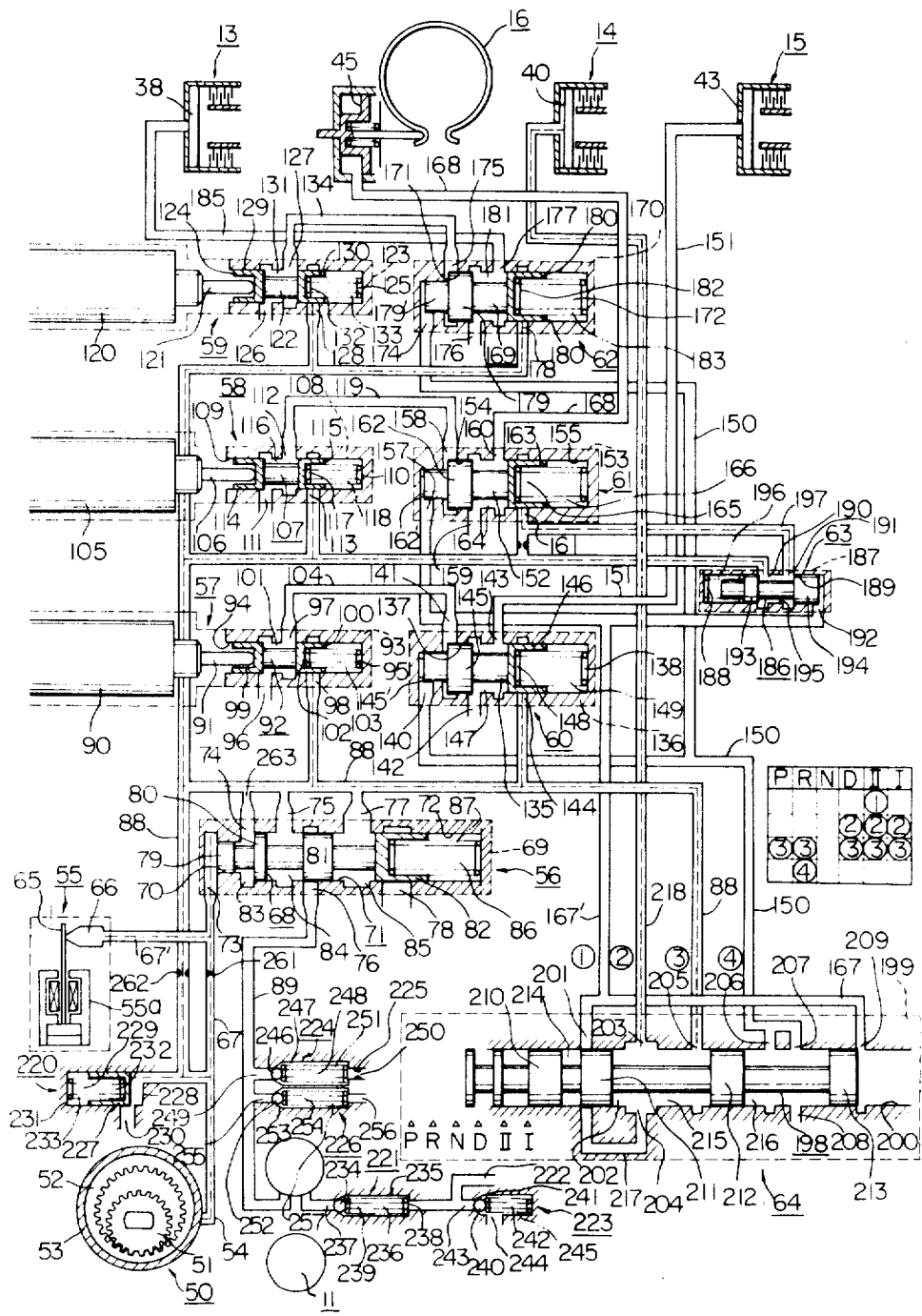
Figure 5:
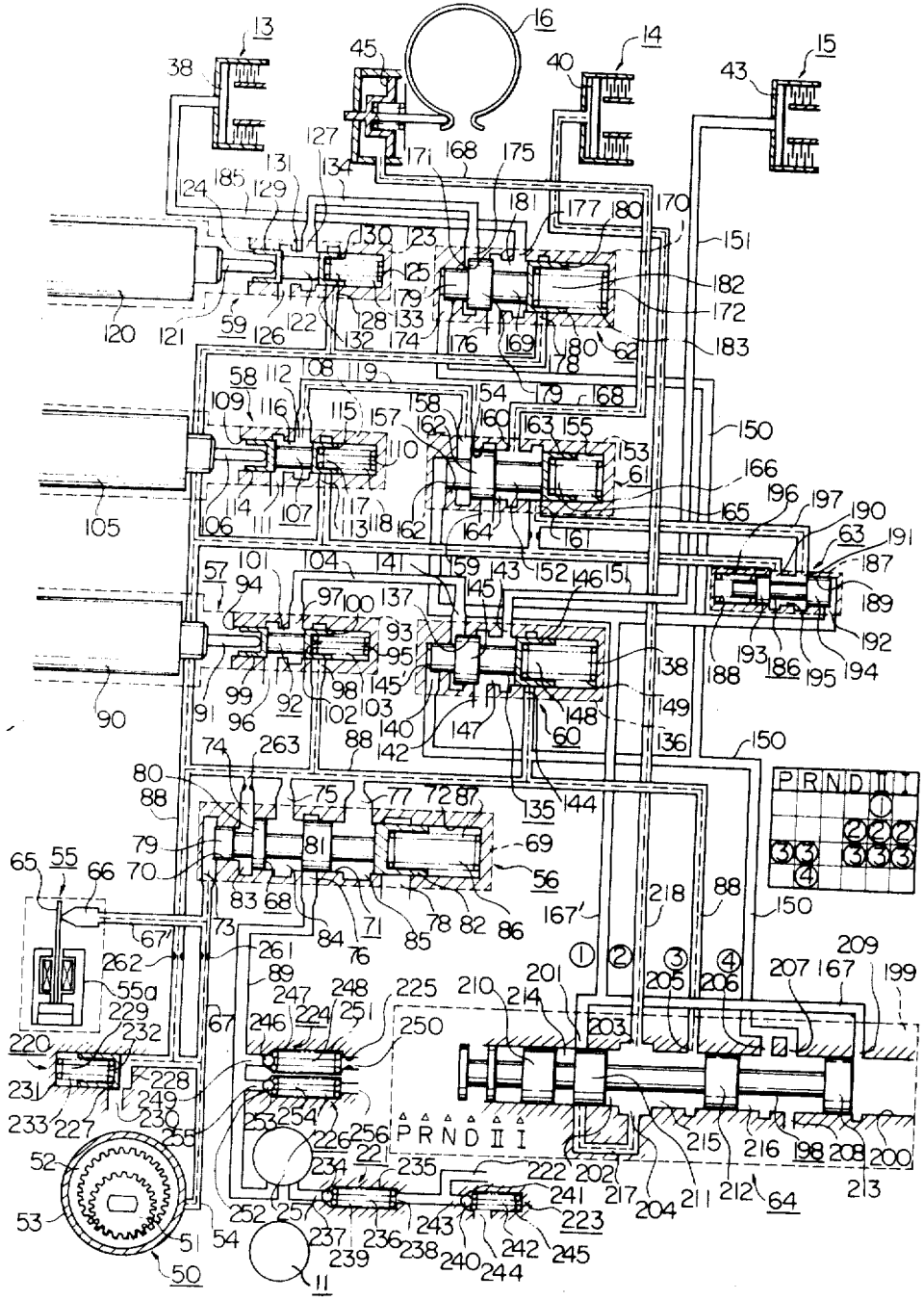
Figure 6:
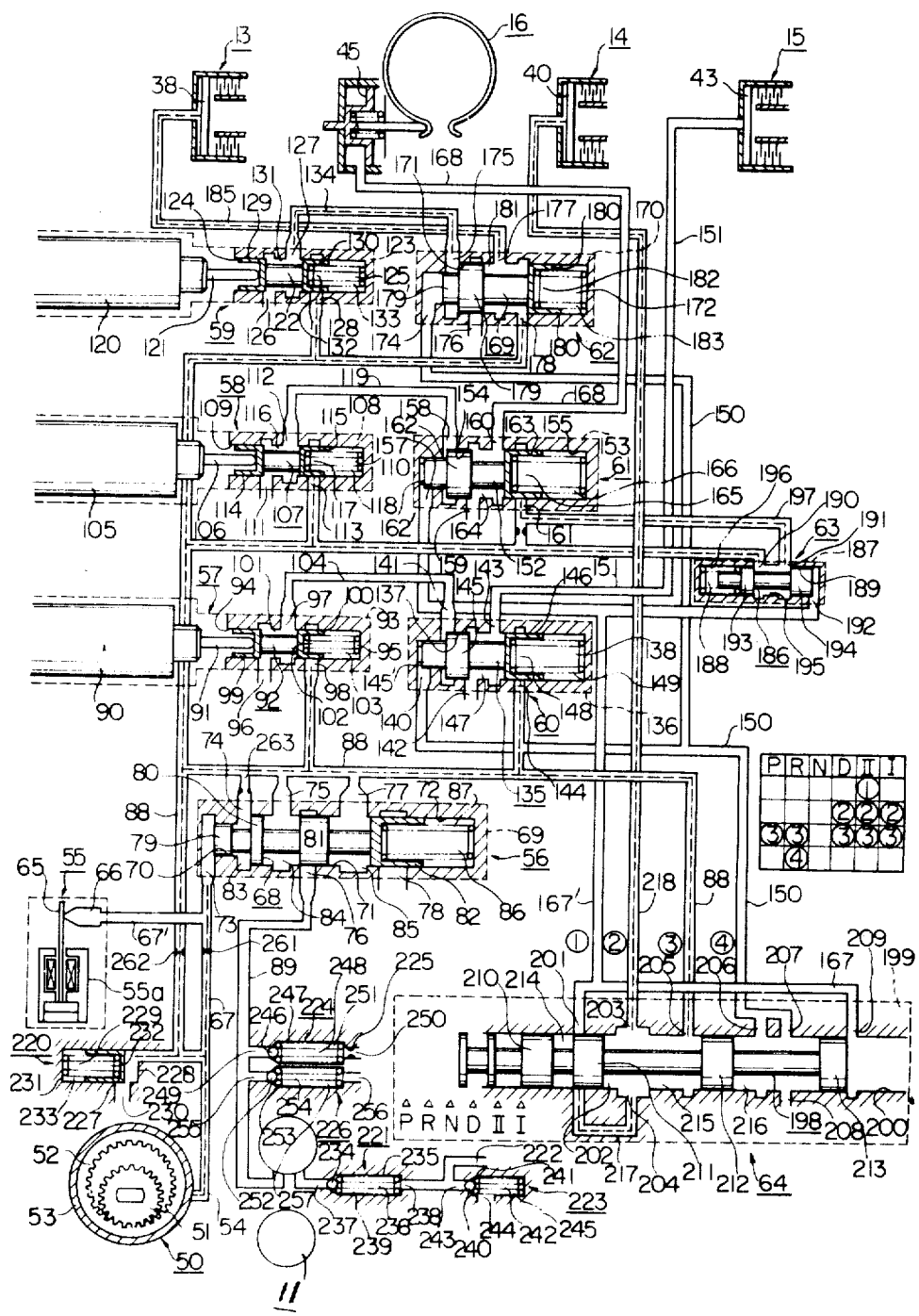

In the drive range position of the selector valve 64 as seen in FIGS. 4 to 6, the spool 198 is moved rightwardly of the drawings beyond the neutral position of the selector valve 64. The line pressure in the conduit 88 is, in this instance, passed to the conduit 218 and to the actuator 40 of the second clutch 14 through the port 205, groove 215 of the spool 198 and port 203 to cause the second clutch 14 to be engaged. When the accelerator pedal 258 is in the closed-throttle position and the engine 260 is rotating at an idling speed, no sufficient power is transmitted through the power train and in particular through the hydraulic torque converter 11. However, the drive may be made effective for the vehicle simply by depressing the accelerator pedal to open the throttle valve of the engine thereby to increase the speed and power output of the engine.

Before the accelerator pedal is depressed, the torque converter tends to "slip," that is, the pump 23 of the torque converter is apt to rotate without any resultant rotation of the rotor 24.

The motion of the accelerator pedal to open the throttle valve provides an additional power for driving the vehicle in this speed ratio, and also exercises various effects on the hydraulic control system such as an increase in the line pressure to be applied to the actuators of the friction elements. While the vehicle runs in a low speed range the engagement of the clutch 14 and action of the one-way brake 19 not controlled by the selector valve results in a gradual increase of the transmitting torque at the torque converter 11 as the engine speed increases correspondingly.

When the vehicle speed increases to the shifting speed from the low to intermediate speed, the second solenoid valve 58 is energized by the electronic control system as illustrated in FIG. 5. As a result, the plunger 106 projects and the line pressure applied to the port 113 of the second solenoid valve 58 and accordingly the signal fluid pressure are fed to the port 158 of the second main valve 61 through the groove 116, port 112 and conduit 119. The port 113 is kept open as a result of the rightward movement of the spool 107. The line pressure in the conduit 88 is consequently passed to the port 190, groove 193, port 191 of the check valve 63, conduit 197, port 161, the groove 164 of the spool 152, port 160, conduit 168 and finally to the actuator 45 of the brake 16. Thus, the spool 152 is moved rightwardly of the drawing by the fluid pressure drawn from the second solenoid valve 58 through the conduit 119 to the end face of the land 162 of the spool 152 against the action of the spring 166. The port 161 is thus opened and communicates with the conduit 168 and accordingly with the actuator 45 of the brake 16 through the groove 164 and port 160.

With the vehicle speed further increases up to the shifting speed from the intermediate to high speeds, the second solenoid valve 61 is deenergized while the third solenoid valve 59 is energized, as illustrated in FIG. 6. With the solenoid coil 120 energized as the vehicle runs at a high speed, the plunger 121 and spool 122 are moved rightwardly of the drawing. Thus, the line pressure applied to the port 128 of the third solenoid valve 59 and the signalling fluid pressure as well as passed through the groove 131, port 127 and conduit 134 to the port 175 of the third main valve 62 because the port 128 is kept opened as the result of the rightward movement of the spool 122. This causes the spool 169 to move rightwardly of the drawing with the fluid pressure applied to the end face of the land 179 of the spool 169 from the third solenoid valve 59 through the conduit 134 against the action of the spring 183. Consequently, the port 178 is opened and communicates with the conduit 185 and actuator 38 of the clutch through the grove 181 and port 177. When, on the other hand, the solenoid coil 105 of the solenoid valve 58 is deenergized as will be discussed in more detail, the spool 107 is moved leftwardly of the drawing by the action of the spring 118 so that the conduit 119 communicating with the port 112 is permitted to further communicate with the oil sump through the port 111 thereof. The fluid pressure in the conduit 119 is thus relieved. Then, the fluid pressure is isolated from the second solenoid valve 58 so that the spool 152 of the second main valve 61 is moved leftwardly of the drawing by the action of the spring 166. The result is that the conduit 168 communicating with the actuator 45 of the brake 16 is permitted to further communicate with the oil sump through the port 160, groove 164 and the port 159 of the second main valve 61, whereby the fluid pressure applied to the actuator 45 of the brake 16 is relieved to the oil sump.

As the vehicle speed decreases down to the shifting speed from the high to intermediate speed, the third solenoid valve 59 is deenergized and the second solenoid valve 58 energized (by the electronic control system as will hereinafter be described) so that the plunger 106 is protruded and the line pressure applied to the port 113 of the second solenoid valve 58 and the signalling fluid pressure is passed through the groove 116, port 112 and conduit 119 to the port 158 of the second main valve 61 because the port 113 is kept open. While the solenoid coil 105 of the second solenoid valve 58 is thus energized and the fluid pressure is drawn from the port 112 of the second solenoid valve 58 to the port 158 of the second main valve 61 through the conduit 119, the line pressure in the conduit 88 is passed through the port 190, groove 193, port 191 of the check valve 63, conduit 197, port 161, port 160 and conduit 168 to the actuator 45 of the brake 16. Thus, the spool 152 is moved rightwardly of the drawing with the fluid pressure applied from the second solenoid valve 58 through the conduit 119 to the end face of the land 162 of the spool 152 against the action of the spring 166. It therefore follows that the port 161 is opened and communicate with the conduit 168 and accordingly with the actuator 45 of the brake 16 through the groove 164 and port 160. When, on the other hand, the third solenoid valve 59 is deenergized as will be described, the spool 122 is moved leftwardly of the drawing by the action of the spring 133 so that the conduit 134 communicating with the port 127 further communicates through he port 126 with the oil sump. The fluid pressure in the conduit 134 is thus relieved. Then, the fluid pressure is isolated from the port 175 so that the spool 169 of the third main valve 62 is moved leftwardly of the drawing by the action of the spring 183. As a result, the conduit 185 communicating with the actuator 38 of the clutch 13 is permitted to further communicate with the oil sump through the port 177 connected therewith, groove 181 and port 176 of the third main valve 62, whereby the fluid pressure to be applied to the actuator 38 of the clutch 13 is relieved.

When the vehicle speed further decreases to the shifting speed from the intermediate to low speed, the second solenoid valve 58 is deenergized and the first solenoid valve 57 energized. The line pressure applied to the port 98 of the first solenoid valve 57 and accordingly the signalling fluid pressure is passed through the groove 101, port 97 and conduit 104 to the port 141 of the first main valve 60 since the port 98 is kept open as the result of the rightward movement of the spool 92. Then, the fluid pressure is drawn from the port 97 of the first solenoid valve 57 to the port 141 of the first main valve 60 through the conduit 104 so that the spool 135 is moved rightwardly of the drawing with the fluid pressure applied from the first solenoid valve 57 through the conduit 104 to the end face of the land 145 of the spool 135 against the action of the spring 149. This causes the port 144 to be opened and communicate with the conduit 151 and actuator 43 of the brake 15 through the groove 147 and port 143. When, on the other hand, the second solenoid valve 58 is deenergized, the spool 107 is moved leftwardly of the drawing by the action of the spring 168 so that the conduit 119 communicating with the port 112 of the solenoid valve 58 further communicates with the oil sump through the port 111. Thus, the fluid pressure in the conduit 119 is relieved. Then, the fluid pressure is isolated from the port 158 so that the spool 152 of the second main valve 61 is moved leftwardly of the drawing by the action of the spring 166. It therefore follows that the conduit 168 communicating with the actuator 45 of the brake 16 is permitted to further communicates with the oil sump through the port 160, groove 164 and port 159, whereby the fluid pressure to be applied to the actuator 45 of the brake 16 is relieved.

Figure 7:
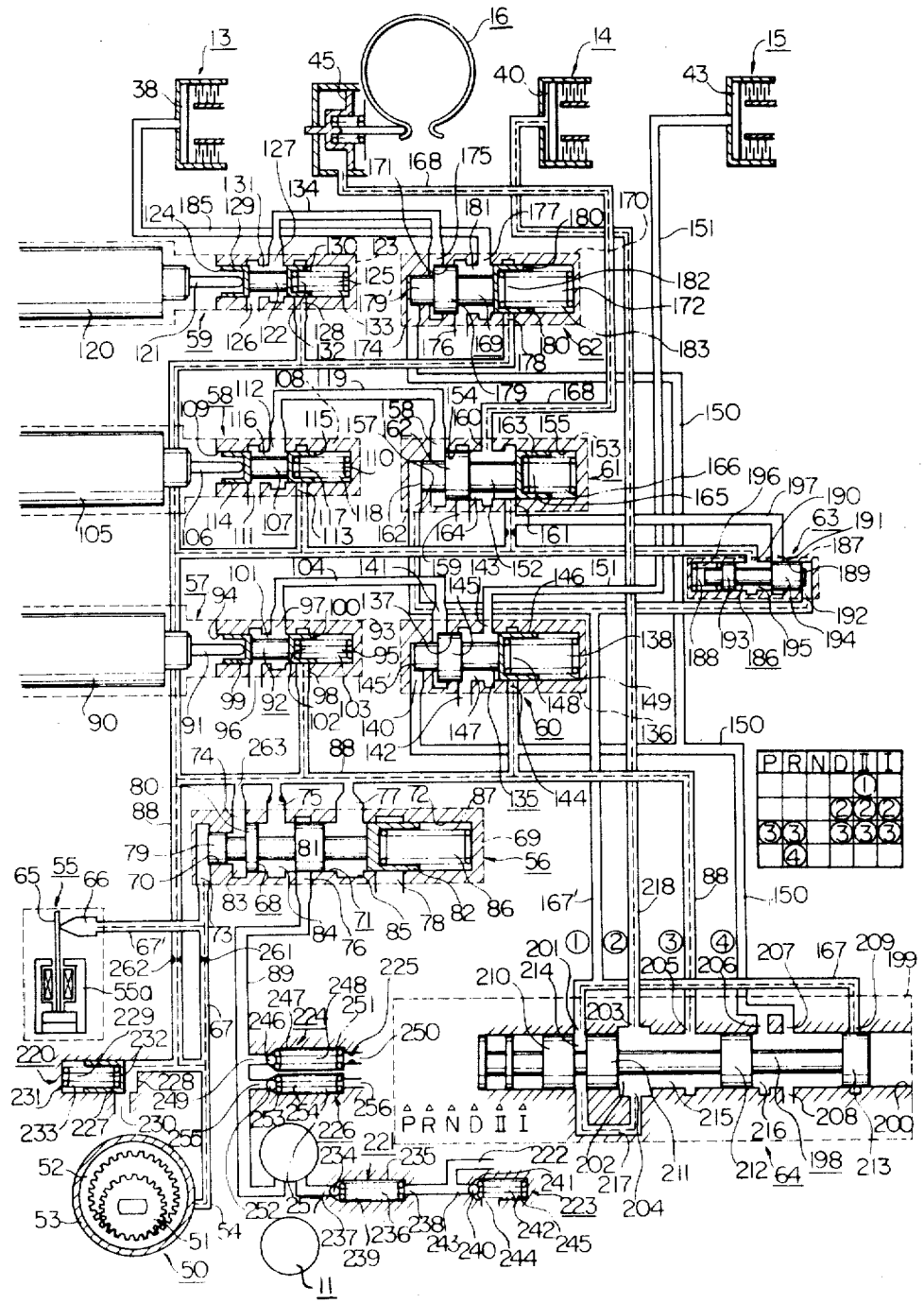

In the II range position of the selector valve 64 as shown in FIG. 7, the spool 198 of the selector valve 64 is further moved rightwardly of the drawing beyond the drive range position of the selector valve 64. The line pressure in the conduit 88 communicates with the conduit 218 and accordingly with the actuator 40 of the second clutch 14 through the port 205, groove 215 of the spool 198 and port 203, causing the second clutch 14 to be engaged. The line pressure in the conduit 88 is also passed through the port 205, groove 215 of the spool 198, port 204, conduit 217 communicating with the port 204, port 202, groove 214 of the spool 198, port 201, and conduit 167. The line pressure in the conduit 167 is shut off at the port 209 of the selector valve 64 by the land 213 of the spool 198, giving rise to the line pressure in the conduit 167. Thus increased line pressure is applied to one end face of the land 162' through the port 157 of the second main valve 61, whereby the spool 152 is moved rightwardly of the drawing. When the spool 152 of the second main valve 61 is moved rightwardly of the drawing, the line pressure in the conduit 88 is drawn to the port 190 of the check valve 63. Since, however, the line pressure in the conduit 167 also communicates with the port 192 of the check valve 63, the line pressure is caused to push one end of the land 193 of the spool 186 against the action of the spring 196. When the spool 186 is thus held in its left-hand position as shown in the drawing, the port 191 is closed by the land 194. Thus, the line pressure in the conduit 88 fed to the port 190 of the check valve 63 is also shut off at the groove 195 of the spool 186. The result is that the line pressure in the conduit 88 is passed through an orifice 263 provided in the conduit 88. The line pressure fed through this orifice 263, and through the port 161, groove 164 of the spool 152, port 160 and conduit 168 is finally applied to the actuator 45 of the brake 16, which therefore is gradually tightened up.

Figure 8:
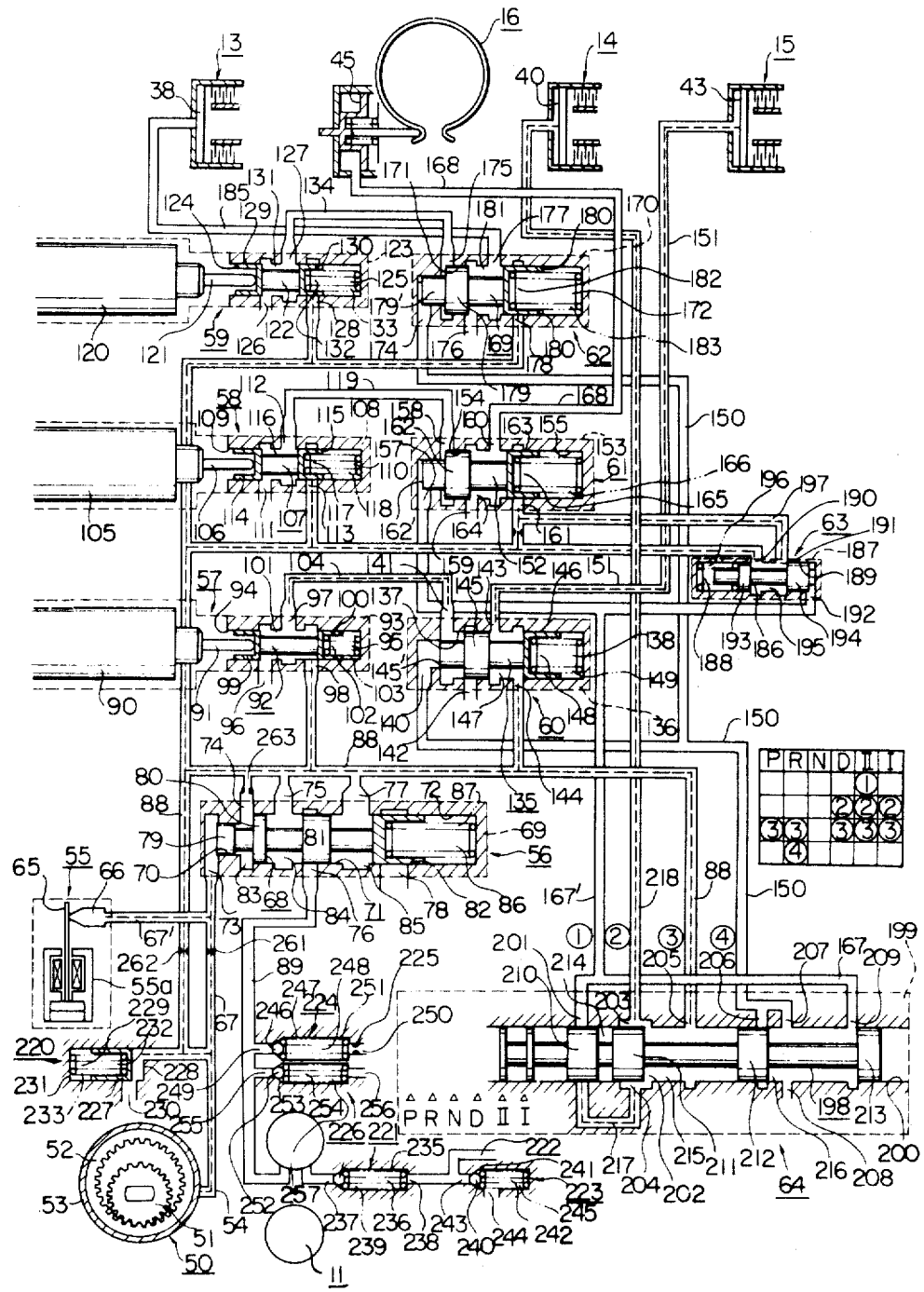
Figure 9:
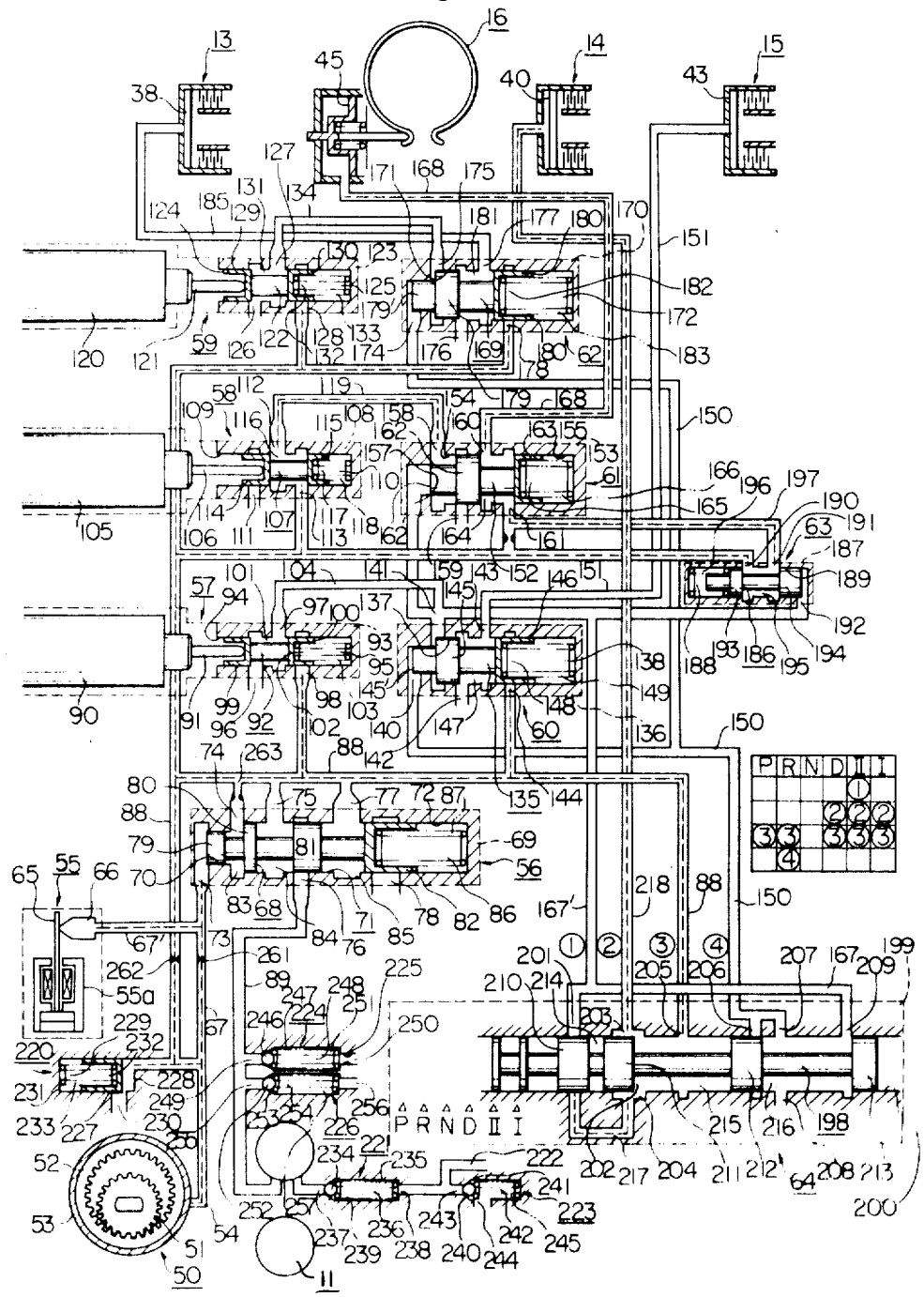

In the I range position of the selector valve 64 as illustrated in FIGS. 8 and 9, the spool 198 of the selector valve 64 is moved further rightwardly of the drawing beyond the IT range position of the selector valve 64. The line pressure in the conduit 88 communicates with the conduit 218 and with the actuator 40 of the second clutch 14 through the port 205, groove 215 of the spool 198 and port 203. The vehicle may start at a low speed of the transmission and then is accelerated within a given speed range.

If the selector valve 64 is accidentally shifted to this I range position while the vehicle is running at a high speed, then the electronic control system operates in such a manner as to energize the second solenoid valve 58 as seen in FIG. 9 to shift the speed ratio to intermediate speed of the transmission. The engine is thus prevented from overrunning. In this instance, the plunger 106 is protruded and the line pressure applied to the port 113 of the second solenoid valve 58 and accordingly the signalling fluid pressure are passed through the groove 116, port 112 and conduit 119 to the port 158 of the second main valve 61. When the solenoid coil 105 of the second solenoid valve 58 is thus energized so that the fluid pressure is supplied to the port 158 of the second main valve 61 from the port 112 through the conduit 119, the line pressure in the conduit 88 is passed through the port 190, groove 193, port 191 of the check valve 63, conduit 197, port 161, port 160, conduit 168 and down to the actuator 45 of the brake 16. As the consequence, the spool 152 is moved rightwardly of the drawing with the fluid pressure applied to the end face of the land 162 of the spool 152 from the second solenoid valve 58 through the conduit 119 against the action of the spring 166, causing the port 161 to open and communicate with the conduit 168 and accordingly with the actuator 45 of the brake 16 through the groove 164 and port 160.

Figure 10:
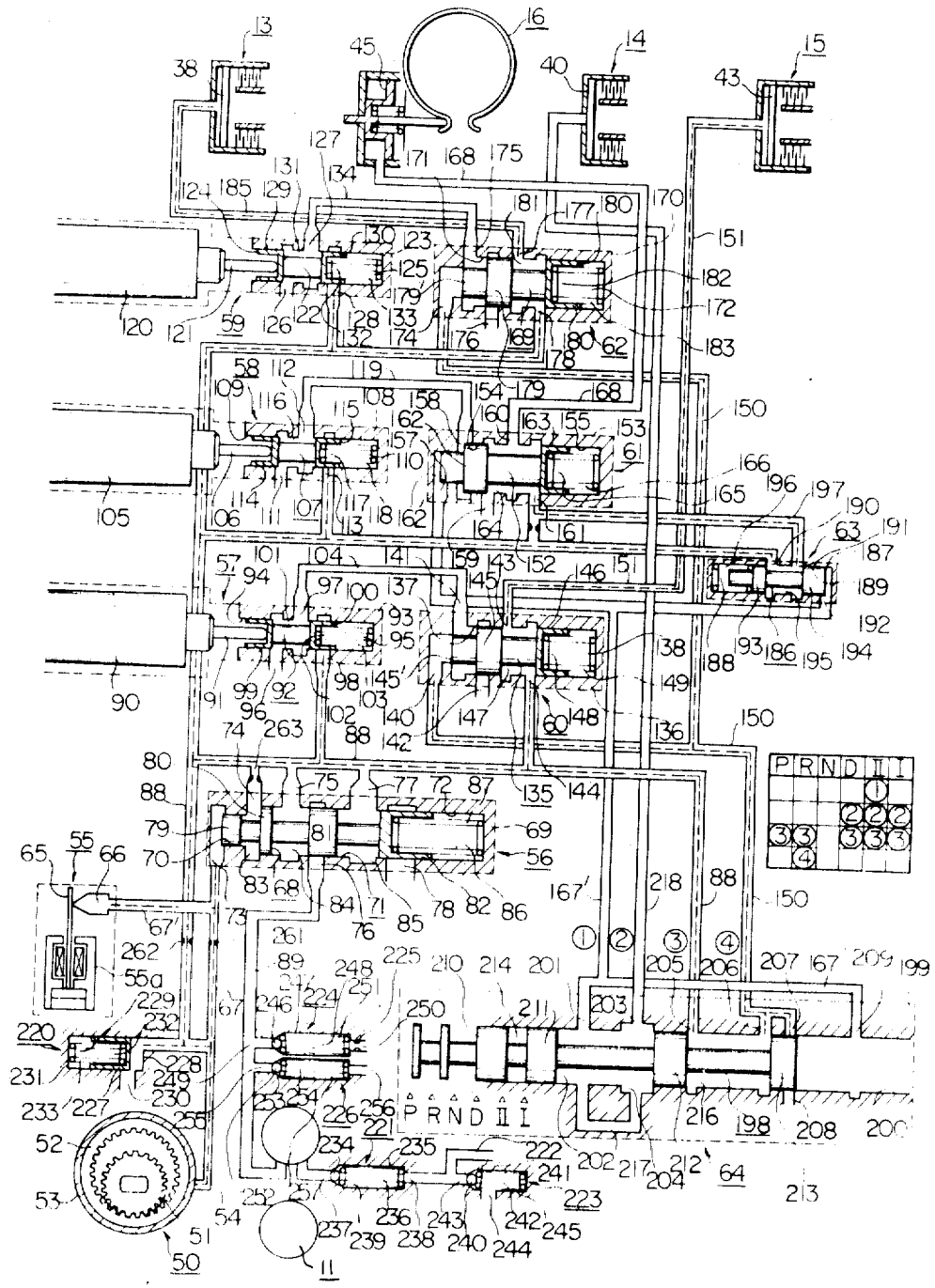

In the reverse position of the selector valve 64 as seen in FIG. 10, the spool 198 of the selector valve 64 is held in its left-hand position beyond the neutral position. The line pressure in the conduit 88 is therefore permitted to communicate with the conduit 150 through the port 205, groove 216 of the spool 198 and port 206. The line pressure in the conduit 88 fed to the conduit 150 passed through the port 140 of the first main valve 60 to push one end of the land 145' of the spool 135, which therefore is moved rightwardly of the drawing against the action of the spring 149. Thus, the line pressure in the conduit 88 is passed to the actuator 43 of the brake 15 through the port 144, groove 147 of the spool 135, port 143, and the conduit 151. The line pressure in the conduit 150 is, on the other hand, passed through the port 174 of the third main valve 62 to push one end of the land 179' of the spool 169, which therefore is moved rightwardly of the drawing against the action of the spring 183. Thus, the line pressure in the conduit 88 is passed through the port 178, groove 181 of the spool 169, port 177 and conduit 185 to the actuator 38 of the clutch 13. In this manner, the low and reverse brake 15 and the first clutch 13 are engaged and the driven shaft 21 rotates in a direction reverse to the direction of rotation of the turbine shaft 20. Thus, the vehicle runs backwardly with the engine accelerated.

Table I shows the positions of the friction elements in correspondence with the respective positions of the selector lever 219. The indication NORMAL as appearing in the Table is intended to mean that the electronic control system operates in a sound state with the emergency switch kept inoperative as will later be discussed. The marking ○ refers to those friction elements which receive the fluid pressure when the manual selector valve 64 is actuated. Indicated by the marking ⓞ is that the line pressure is controlled by the electronic control system. The marking △ indicates that the carrier 35 of the second planetary gear set 18 is kept at rest by the action of the one-way brake.

TABLE I

| Selected position | Speed range | First clutch | Second clutch | Low-reverse brake | Line pressure |
|---|---|---|---|---|---|
| Normal { P | | | | | |
| R | Rev | ○ | | ○ | |
| N | | | | | |
| D | Low (1st) | | ○ | △ | |
|   | Int. (2nd) | | ○ | | (i) |
|   | High (3rd) | (i) | ○ | | |
| II | Int. (2nd) | | ○ | | |
| I | Low (1st) | | ○ | (i) | |
|   | Int. (2nd) | | ○ | | |
| Emergency { P | | | | | |
| R | Rev | ○ | | ○ | |
| N | | | | | |
| D | High (3rd) | ⊖ | | | |
| II | Int. (2nd) | | | | |
| I | Low (1st) | | | △ | |

In the event a failure takes place in the electronic control circuit, the emergency switch is changed over to the emergency position. This is indicated in the lower half of the table. Thus, if the selector lever 219 is in position I, only the first speed is established. This proceeds solely with the aid of the hydraulic circuits without any electronic operation involved. When the selector lever 219 is shifted to position D, then a third speed is established by means of the emergency switch and selector lever. The line pressure required to effect the hydraulic pressure control for this purpose is dictated by the electronic system. This will be discussed in more detail as the description of this invention proceeds.

An alternative embodiment of the hydraulic control system of the present invention is shown in FIGS. 11 to 19. As shown, the modified hydraulic control system includes, similarly to the previous embodiment, an oil pump 50, servo valve 55, first, second and third solenoid valve 57, 58 and 59, manually operated selector valve 64, relief valves 220 and 221, conduit 222, relief valves 223 and 224, orifice 225, and relief valve 226. In addition, the modified hydraulic control system comprises a regulator valve 264 for regulating the line pressure in response to the signalling hydraulic pressure drawn from the servo valve 55, a first main valve 265 to apply the fluid pressure to the actuator 43 for the second or low and reverse brake 15 when the first solenoid valve 57 is energized to cause the first solenoid valve 57 to apply the fluid pressure to the main valve 265, a second main valve 266 to apply and release the fluid pressure to and from the actuator 45 of the brake 16 when the second solenoid valve 58 is energized to cause the second solenoid valve 58 to apply the fluid pressure to the second main valve 266, and a third main valve 267 to apply the fluid pressure to the actuator 38 of the first or front clutch 13 when the third solenoid valve 59 is energized to cause the third solenoid valve 59 thereby to apply the fluid pressure to the third main valve 267.

The regulator valve 264 comprises a first spool 68 slidably accommodated in the casing 69 and a second spool 268 which is also slidably accommodated in the casing 69. The casing 69 has formed therein cylindrical cavities 70, 71, 72 and 269. The cavity 70 has a smaller diameter than the others while the cavity 269 has a larger diameter than the others. The cylindrical cavities communicate with ports 73, 74, 75, 76, 77, 78 and 20. The spool 68 comprises lands 79, 80, 81 and 82, and grooves 83, 84 and 85 formed between the lands, while the spool 268 has formed therein a cavity. The spool 68 is mounted within the casing 69 with its land 79 in sliding contact with the wall of the cavity 70, lands 80 and 81 in sliding contact with the wall of the cavity 71 and the land 82 in sliding contact with the wall of the cavity 72. The spool 268 is also held in sliding contact with the walls of the cavity 269. This regulator valve 264 also comprises a spring 87 mounted between the cavity 86 of the land 82 and the cavity 271 of the spool 268, as shown.

The port 73 communicates with the nozzle 66 through the conduit 54 and with the oil pump 50 through the orifice 261 and conduit 54. The ports 74, 75 and 77 communicates with each other and with the conduit 88 which serves as a source of regulated fluid pressure to be applied to the actuators for the brakes and clutches. The conduit 88 communicates with the conduit 54 through the orifice 261 The port 76 communicates with the torque converter 11 by way of conduit 89. The port 78 is opened to the oil sump (not shown). The port 270 communicates through the conduit 150 with the ports 206 and 207 of the selector valve 64.

The first main valve 265 comprises a spool 272 slidably accommodated in the casing 136. The casing 136 has formed therein cylindrical cavities 137, 138 and 273 of the same diameter. The casing 136 communicates with ports 274, 275, 276, 277, 278, 279 and 280, as shown. The spool 272 has lands 281, 282 and 283, and grooves 284 and 285 formed between the lands. The spool 272 is mounted in the casing 136 with its land 281 in sliding contact with the wall of the cavity 137, land 282 in sliding contact with the wall of the cavity 138, and land 283 in sliding contact with the wall of the cavity 273. The land 283 has provided therein a cavity 284, and a spring 149 is mounted between the cavity 284 and the adjacent end of the cavity 273, as shown.

The port 274 communicates with the port 97 of the first solenoid valve 57 through the conduit 104. The port 275 communicates through the conduit 150 with the ports 206 and 207 of the selector valve 64 and also with the port 270 of the regulator valve 264. The port 276 communicates through the conduit 151 with the actuator 43 of the brake 15. The port 277 communicates through the conduit 218 with the port 203 of the selector valve 64 and with the actuator 40 of the second clutch 14. The port 278 communicates with a conduit 285 and the port 279 communicates with a conduit 286. The port 280 communicates through the conduit 167 with the port 201 of the selector valve 64.

The second main valve 266 comprises a spool 287 slidably accommodated in the casing 153. The casing 153 has formed therein cylindrical cavities 154, 155 and 288 of the same diameter. The cylindrical cavity 153 communicates with ports 289, 290, 291, 292, 293 and 294. The spool 287 comprises lands 295, 296 and 297, and grooves 298 and 299 formed between the lands. The spool 287 is mounted within the casing 153 with its land 295 in sliding contact with the wall of the cavity 154, land 296 with the wall of the cavity 155, and land 297 with the walls of the cavity 288. The land 297 has formed therein a cavity 300 receiving therein a spring 166.

The port 289 communicates through the conduit 119 with the port 112 of the second solenoid valve 58. The port 290 communicates with a conduit 301. The port 291 communicates through the conduit 168 with the actuator 45 of the brake 16. The port 292 communicates through the conduit 285 with the port 278 of the first main valve 265. The port 293 communicates with a conduit 302, and the port 294 communicates through the conduit 150 with the ports 206 and 207 of the selector valve 64.

The third main valve 267 comprises a spool 169 slidably accommodated in the casing 170. The casing 170 has formed therein cylindrical cavities 171 and 172 of the same diameter. The cylindrical cavity 170 communicates with ports 303, 304, 305, 306 and 307. The spool 169 comprises lands 179 and 180 and groove 181 formed between the lands. The spool 169 is mounted within the casing 170 with its land 179 in sliding contact with the wall of the cavity 171 and land 180 with the wall of the cavity 172. The land 180 has formed therein a cavity 182 receiving therein a spring 183.

The port 303 communicates through the conduit 134 with the port 127 of the third solenoid valve 59. The port 304 communicates through the conduit 150 with the ports 206 and 207 of the selector valve 64 and with the port 294 of the second main valve 266. The port 305 communicates through the conduit 185 with the actuator 38 of the clutch 13. The port 306 communicates through the conduit 302 with the port 293 of the second main valve 266, while the port 307 communicates through the conduit 286 with the port 279 of the first main valve 265.

A check valve 308 is provided which comprises a piston 309 slidably mounted in the casing 310. The casing 310 has formed therein a cylindrical cavity 311. The cylindrical cavity 311 is provided with ports 312 and 313 communicating therewith, as shown. A space is formed between the cavity 311 and the piston 309 for releasing the oil from the port 312 to the port 313. The check valve 308 also comprises a spring 314 mounted between the piston 309 and the adjacent end of the cavity 311.

The port 312 communicates through the conduit 301 with the port 290 of the second main valve 266. The port 313 communicates through the conduit 167 with the port 201 of the selector valve 64.

In operation, the transmission and the hydraulic control system are controlled from the accelerator pedal 258 of the vehicle and from the manual selector lever 219 similarly to the previous embodiment as illustrated in FIGS. 2 to 10.

When the engine 260 of the vehicle is started, the fluid pressure supplied through conduit 54 from the oil pump 50 is divided into two parts: one part applied to the nozzle 66 of the servo valve 55 through the conduit 54, converted into a signalling fluid pressure and applied through the conduit 67' to the port 73 of the regulator valve 264; and the other supplied through the orifice 262 in the conduit 88 and further divided into three parts: a first part supplied to the first, second and third solenoid valves 57, 58 and 59; a second part passed through the main valves 265, 266 and 267 to the actuators of the friction elements; and a third part passed through the conduit 88 to the port 75 of the regulator valve 264 for controlling the line pressure by the signalling fluid pressure supplied from the servo valve 55. If the line pressure is higher than a predetermined level, the regulator valve 264 is so controlled as to open the port 76 to release the fluid pressure through the conduit 89. The oil exhausted through the port 76 of the regulator valve 264 is fed through the conduit 89 and through the torque converter 11 to the transmission for lubrication thereof. In addition, when the selector valve 64 is shifted to the position R, then the fluid pressure is applied to the port 270 of the regulator valve 264 through the port 206, groove 216, port 205 and conduit 88 to force the piston 268 to compress the spring 87. With the spring 87 thus compressed, the spool 68 of the regulator valve 265 is moved leftwardly of the drawing to close the port 78 to increase the line pressure.

When the first solenoid valve 57 is energized with the position D selected, the line pressure fed through the conduit 88 from the oil pump 50 is supplied as a signalling fluid pressure to the port 274 of the first main valve 265 through the port 98, groove 101 of the spool 92 of the solenoid valve 57 and port 97 so that the spool 272 of the main valve 265 is moved rightwardly of the drawing to open the port 277 of the first main valve 265 and supply the line pressure to the actuator 43 of the brake 15 through the port 205, groove 215 of the spool 198, port 203, conduit 218, port 277 of the first main valve 265, groove 284 of the spool 272, port 276 and conduit 151.

When the second solenoid valve 58 is energized with the position D selected, the line pressure fed through the conduit 88 is passed as a signalling fluid pressure through the port 113, groove 116 of the spool 107 of the solenoid valve 58 and port 112 to the port 289 of the second main valve 266 so that the spool 287 of the second main valve 266 is moved rightwardly of the drawing to cause the port 292 of the second main valve 266 to open and pass the line pressure to the actuator 45 of the brake 16 through the port 205, groove 215 of the spool 198, port 203, conduit 218, port 277 of the first main valve 265, groove 285 of the spool 272, port 278 thereof, conduit 285, port 292, port 291 of the second main valve 266, and conduit 168.

When the third solenoid valve 59 is energized, the line pressure fed through the conduit 88 is supplied as signalling fluid pressure to the port 303 of the third main valve 267 through the port 128, groove 131 of the spool 169 and port 127 so that the spool 169 of the third main valve 267 is moved rightwardly of the drawing to cause the port 306 of the third main valve 267 to open and pass the line pressure to the actuator 38 of the clutch 13 through the port 205, groove 215 of the spool 198, port 203, conduit 218, port 277 of the first main valve 265, groove 285 of the spool 272, port 278, port 292 of the second main valve 266, groove 299 of the spool 287, port 293 of the second main valve 266, conduit 302, port 306 of the third main valve 267, groove 181 of the spool 169, port 305 of the third main valve 267 and conduit 185.

In the neutral position of the transmission and hydraulic system as illustrated in FIG. 11, the third pressure fed from the oil pump 50 is supplied through the conduits 54 and 88 and is shut off at the port 205 of the selector valve 64. The conduit 167 communicates with the oil sump through the port 209 of the selector valve 64, and the conduit 218 also communicates with the oil sump through the port 203, groove 215, port 201 and conduits 167 and 167' of the selector valve 64. The conduit 150 communicates with the oil sump through the ports 206 and 207, groove 216 and port 208.

The regulator valve 264 functions, in addition to its functions previously explained in connection with the regulator valve 56 in the first embodiment, to increase the line pressure in such a manner that, when the selector valve 64 is shifted to the reverse position, the fluid pressure is applied to the port 270 of the regulator valve 264 to push the second spool 268 and compress the spring 87 so that the spool 68 of the regulator valve 264 is moved leftwardly of the drawing to open the port 78.

The first main valve 265 operates in such a manner that the line pressure in the conduit 88 is drawn to the actuator 43 of the brake 15 through the port 205, groove 215 of the spool 198, port 203, conduit 318, port 277, groove 284 of the spool 272, port 276 and conduit 151 when the solenoid coil 90 of the first solenoid valve 57 is energized to supply the fluid pressure from the port 97 to the port 274 of the first main valve 265. This causes the spool 272 to move rightwardly of the drawing, causing the port 277 to open.

The second main valve 266 operates in such a manner that the line pressure in the conduit 88 is drawn through the port 205, groove 215 of the spool 198, port 203, conduit 218, port 277 of the first main valve 265, groove 285 of the spool 272, port 278 thereof, conduit 285, port 292, port 291 of the second main valve 266, conduit 168 and thus reaches the actuator 45 of the brake 16 when the solenoid coil 105 of the second solenoid valve 58 is energized and the fluid pressure is introduced from the port 112 of the second solenoid valve 58 to the port 158 of the second main valve 266 through the conduit 119 so that the spool 289 of the second main valve 266 is moved rightwardly of the drawing, causing the port 292 of the second main valve 266 to open.

The third main valve 267 operates in such a manner that the line pressure in the conduit 88 is drawn through the port 205, groove 215 of the spool 198, port 203, conduit 218, port 277 of the first main valve 265, groove 285 of the spool 272, port 278 of the first main valve 265, port 292 of the second main valve 266, groove 299 of the spool 287, port 293, conduit 302, port 306 of the third main valve 267, groove 181 of the spool 169, port 305 and conduit 185 and thus reaches the actuator 38 of the clutch 13. In this instance the solenoid coil 120 and the third solenoid valve 59 is energized to so that the fluid pressure is supplied from the port 127 of the third solenoid valve 59 through the conduit 134 to the port 303 of the third main valve 267. The spool 169 of the third main valve 267 is consequently moved rightwardly of the drawing to cause the port 306 of the third main valve 267 to open.

Figure 12:
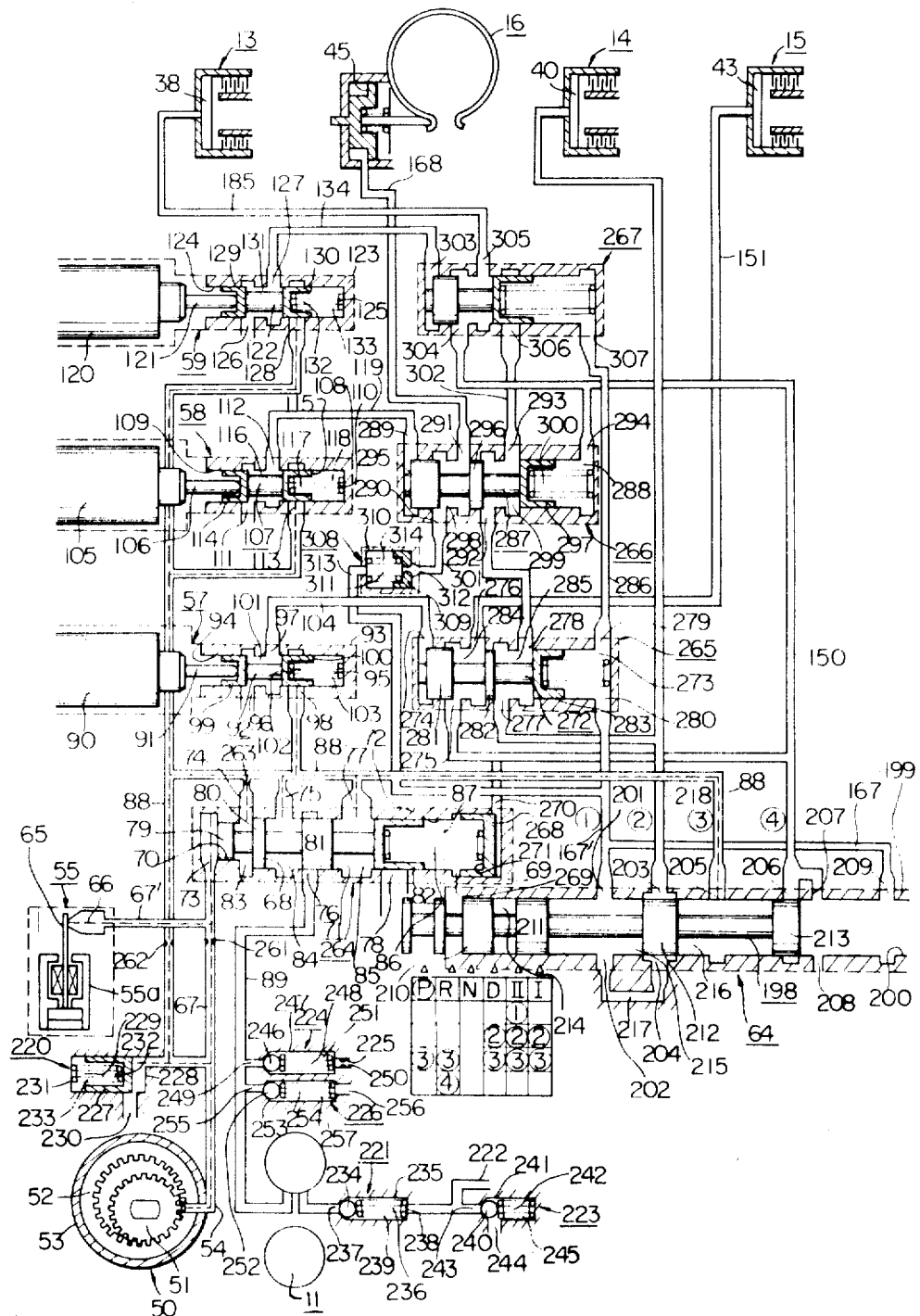

In the parking position of the selector valve 64 as illustrated in FIG. 12, the line pressure in the conduit 88 is also shut off in the groove 216 of the spool 198. The conduit 218 is also closed at the port 203 of the selector valve 64 and is relieved to the oil sump through the conduit 167 communicating with the port 209 of the selector valve 64, the conduit 150 communicating with the port 207 of the selector valve 64 is relieved to the oil sump through the port 208.

Figure 13:
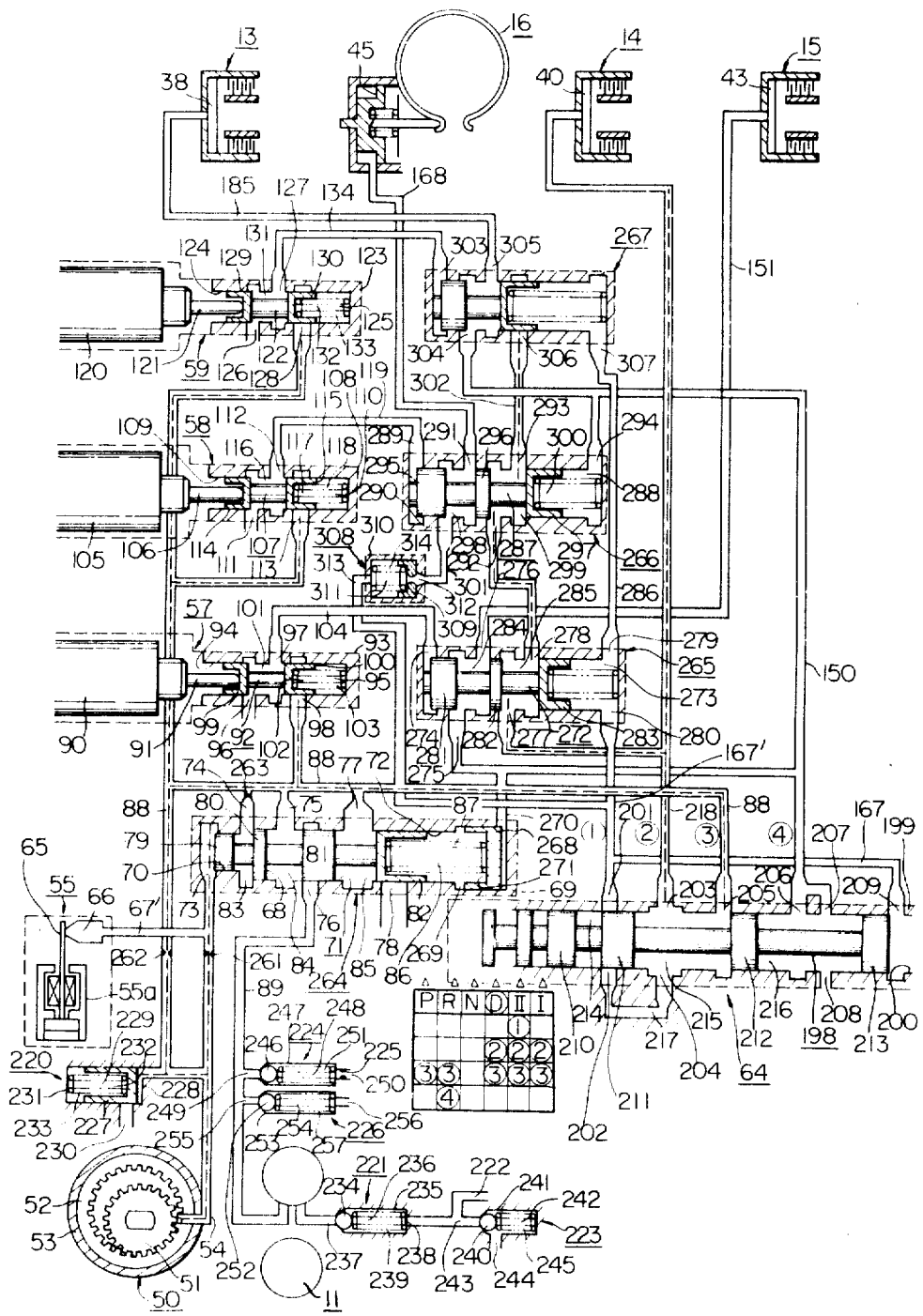
Figure 14:
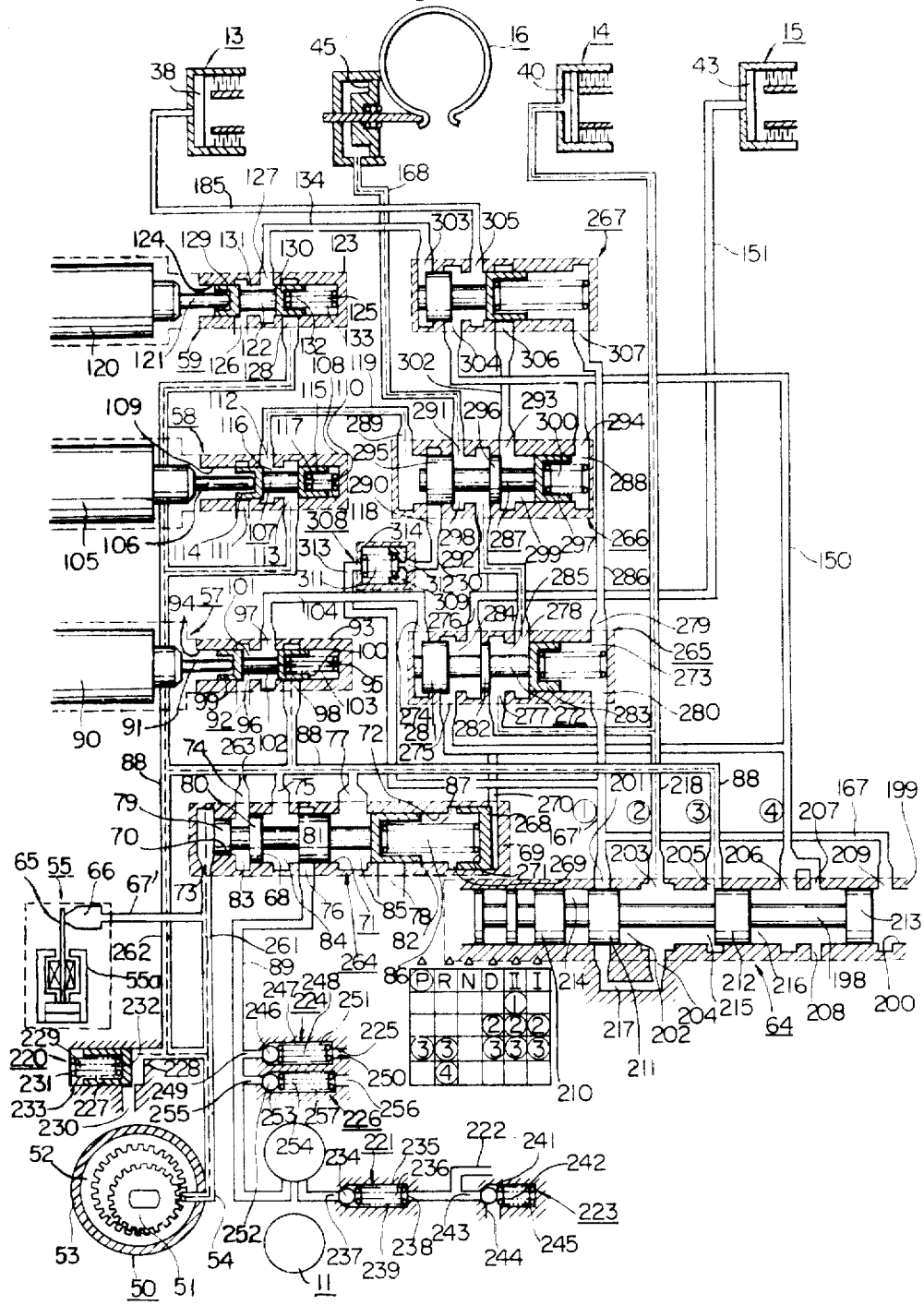
Figure 15:
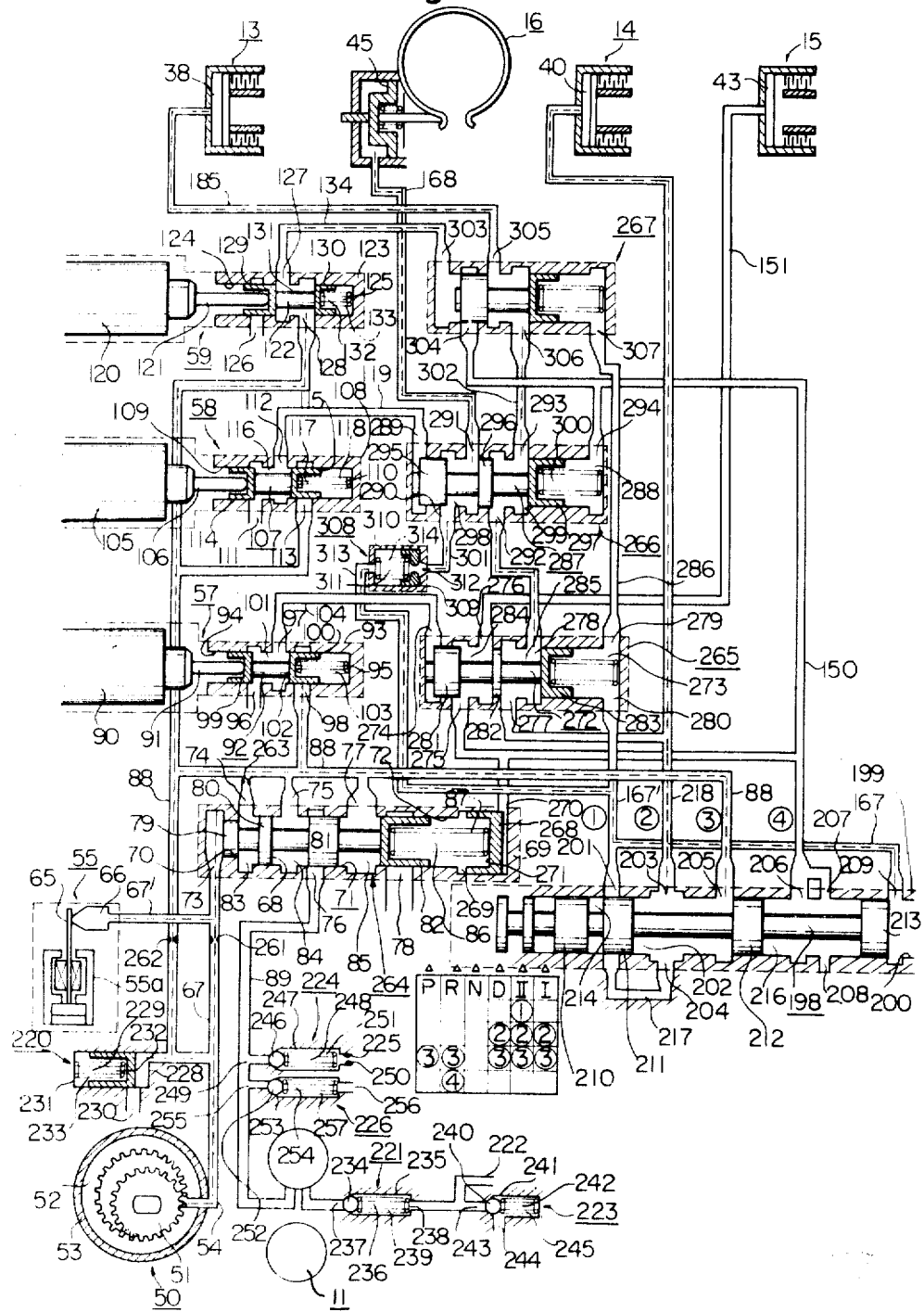

In the drive range position of the selector valve 64 as shown in FIGS. 13 to 15, the spool 198 is moved rightwardly of the drawings beyond the neutral position of the selector valve 64, and the line pressure in the conduit 88 is passed through the port 205, groove 215 of the spool 198 and port 203 to the conduit 218 and accordingly to the actuator 40 of the second clutch 14 to cause the second clutch 14 to be engaged. Similarly to the first embodiment, when the accelerator pedal is depressed to open the throttle valve of the engine, the vehicle runs at a low speed so that one-way brake 19 acts to provide a gradual increase of the transmitting torque at the torque converter 11 as the engine speed increases correspondingly.

When the vehicle speed reaches the shifting speed from the low to intermediate speed, the second solenoid valve 58 is energized as illustrated in FIG. 14 so that the plunger 106 is protruded. The line pressure applied to the port 113 of the second solenoid valve 58 and accordingly the signalling fluid pressure are fed through the groove 116, port 112 and conduit 119 to the port 290 of the second main valve 266. With the solenoid coil 105 of the second solenoid valve 58 thus energized to cause the fluid pressure to be passed to the port 290, the line pressure in the conduit 88 is passed to the actuator 45 of the brake 16 through the port 205, groove 215 of the spool 198, port 203, conduit 218, port 277 of the first main valve 265, groove 285 of the spool 272, port 278 thereof, conduit 282', the port 292, port 291 of the second main valve 266, conduit 168 since the spool 287 of the second main valve 266 is moved rightwardly of the drawing against the action of the spring 166.

With the vehicle speed further increased to the shifting speed from the intermediate to high speed, the second solenoid valve 58 is deenergized while the third solenoid valve 59 is energized as illustrated in FIG. 15 so that the plunger 121 is protruded and the line pressure is supplied as a signalling fluid pressure to the port 303 of the third main valve 267 through the port 128, groove 131 of the spool 122 of the solenoid valve 59 and port 127. The third main valve 267 is accordingly moved rightwardly of the drawing to cause the port 306 of the third main valve 267 to pass the line pressure from the conduit 88 to the actuator 38 of the clutch 13 through the port 205, groove 121 of the spool 198, port 203, conduit 218, port 277 of the first main valve 265, groove 285 of the spool 272, port 278, port 292 of the second main valve 266, groove 299 of the spool 287, port 293, conduit 302 and port 306 of the third main valve 267, groove 181 of the spool 169, port 305 and conduit 185.

In addition, when the spool 287 of the second main valve 266 is thus moved leftwardly of the drawing by the action of the spring 166, the accumulated fluid pressure in the actuator 45 of the brake 16 is released to the oil sump through the conduit 168, port 291, groove 298 of the spool 287, port 290, conduit 301, port 312, the space between the piston 309 and the cavity 311 of the check valve 264, port 313, conduit 167 communicating with the port 313 and port 209 of the selector valve 64, and port 209.

With the vehicle speed decreased to the shifting speed from the high to intermediate speed, the third solenoid valve 59 is deenergized while the second solenoid valve 58 is energized, the line pressure fed to the port 289 of the second main valve 266 is passed as a signalling fluid pressure through the port 113, groove 116 of the spool 107 of the solenoid valve 58 and port 112. As a result, the spool 287 of the main valve 266 is moved rightwardly of the drawing to cause the port 292 of the second main valve 266 to pass the line pressure through the port 205, groove 215 of the spool 198, port 203, conduit 218, port 277 of the first main valve 265, groove 285 of the spool 272, port 278 and conduit 168 and thus reaches the actuator 45 of the brake 16. Since, on the other hand, the third solenoid valve 59 is deenergized to cause the plunger 121 to retract, the port 128 is closed by the land 130 of the spool 122 so that the line pressure in the conduit 88 is shut off. Thus, the signalling fluid pressure fed to the port 303 of the third main valve 267 is shut off and released to the oil sump through the conduit 134, port 127, groove 131, and port 126 so that the spool 169 is retracted by the action of the spring 183. Thus, the line pressure is shut off from the actuator 38 of the clutch 13 and is relieved through the port 304, conduit 150, port 207, groove 216, and port 208 of the manual selector valve 64.

As the vehicle speed further decreases to the shifting speed from the intermediate to low speed, the second solenoid valve 58 is deenergized while the first solenoid valve 57 is energized and the line pressure is passed as a signalling fluid pressure to the port 274 of the first main valve 265 through the port 98, groove 101 of the spool 92 of the solenoid valve 57 and port 97 so that the spool 272 of the main valve 265 is moved rightwardly of the drawing to cause the port 277 of the first main valve 265 to open and allow the line pressure from the conduit 88 to the actuator 43 of the brake 15 through the port 205, groove 215 of the spool 198, port 203, conduit 218, port 277, groove 284 of the spool 272, port 276 and conduit 151. Since, on the other hand, the second solenoid valve 58 is deenergized and the plunger 106 retracted the port 113 is closed by the land 115 of the spool 107 so that the line pressure in the conduit 88 is prohibited from passing through the second solenoid valve 58. Thus, the signalling fluid pressure fed to the port 289 of the second main valve 266 is shut off and is relieved to the oil sump through the conduit 119, port 112, groove 116 and port 111. The spool 287 is thus moved backwardly by the action of the spring 166. Thus, the line pressure is prohibited to pass through the port 292, groove 298 of the spool 287 and port 291 to the actuator 45 of the brake 16 and is relieved through the port 290, conduit 301, port 312, port 313, conduit 167 and port 209 of the manual selector valve 64.

Figure 16:
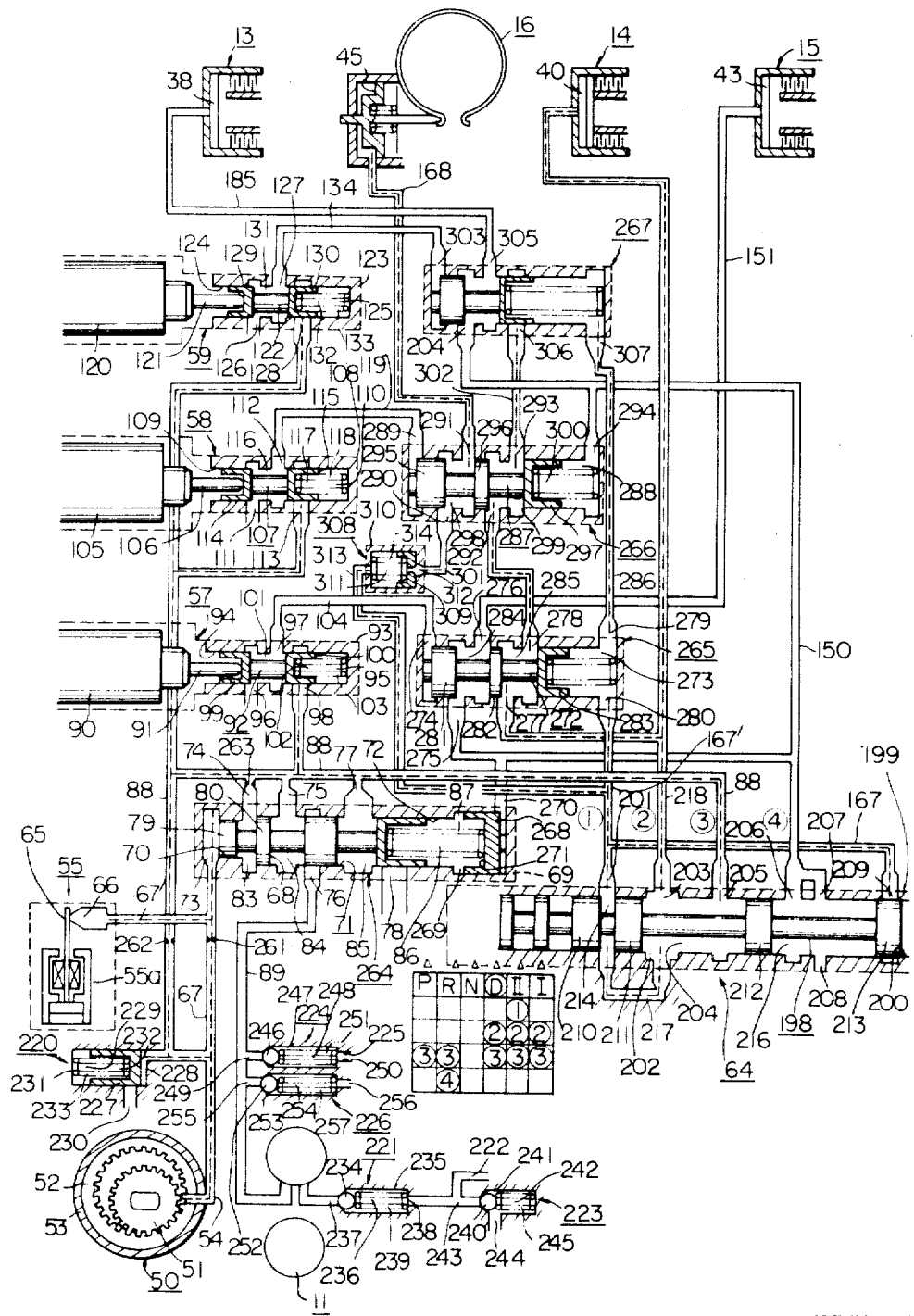

In the II range position of the selector valve 64 as seen in FIG. 16, the spool 198 of the selector valve 64 is moved further rightwardly of the drawing beyond its drive range position, and the line pressure in the conduit 88 is passed through the port 205, groove 215 of the spool 198 and port 203 and reaches the conduit 218 and accordingly the actuator 40 of the second clutch 14 which therefore is engaged. The line pressure in the conduit 88 is also passed through the port 205, groove 215 of the spool 198, port 204, conduit 271 communicating with the port 204, port 202 communicating with the other end of the conduit 217, groove 214 of the spool 198, port 201, and conduit 167. The line pressure in the conduit 167 is shut off at the port 209 of the selector valve 64 by the land 213 of the spool 198 to give rise to the line pressure in the conduit 167. The thus increased line pressure in the conduit 167 is passed through the port 313, cavity 311, a small hole in the piston 309, port 312, conduit 301 communicating with the port 312, port 290, groove 298 of the spool 287, port 291, conduit 168 communicating with the port 291 and reaches the actuator 45 of the brake 16. The line pressure in the conduit 167 thus supplied to the actuator 45 is throttled as it passes through the small hole of the piston 309 and is gradually applied to the actuator 45 of the brake 16 which therefore is tightened slowly. The line pressure in the conduit 167 is also supplied to the cavity 273 of the first main valve 265 through the port 280, moving the spool 272 leftwardly of the drawing to prevent an accidental movement of the spool 272. This line pressure is also applied to the cavity 172 of the third main valve 267 from the port 279 of the first main valve 265 through the conduit 286 and port 307, moving the spool 169 leftwardly of the drawing to prevent an accidental movement of the spool 169.

Figure 17:
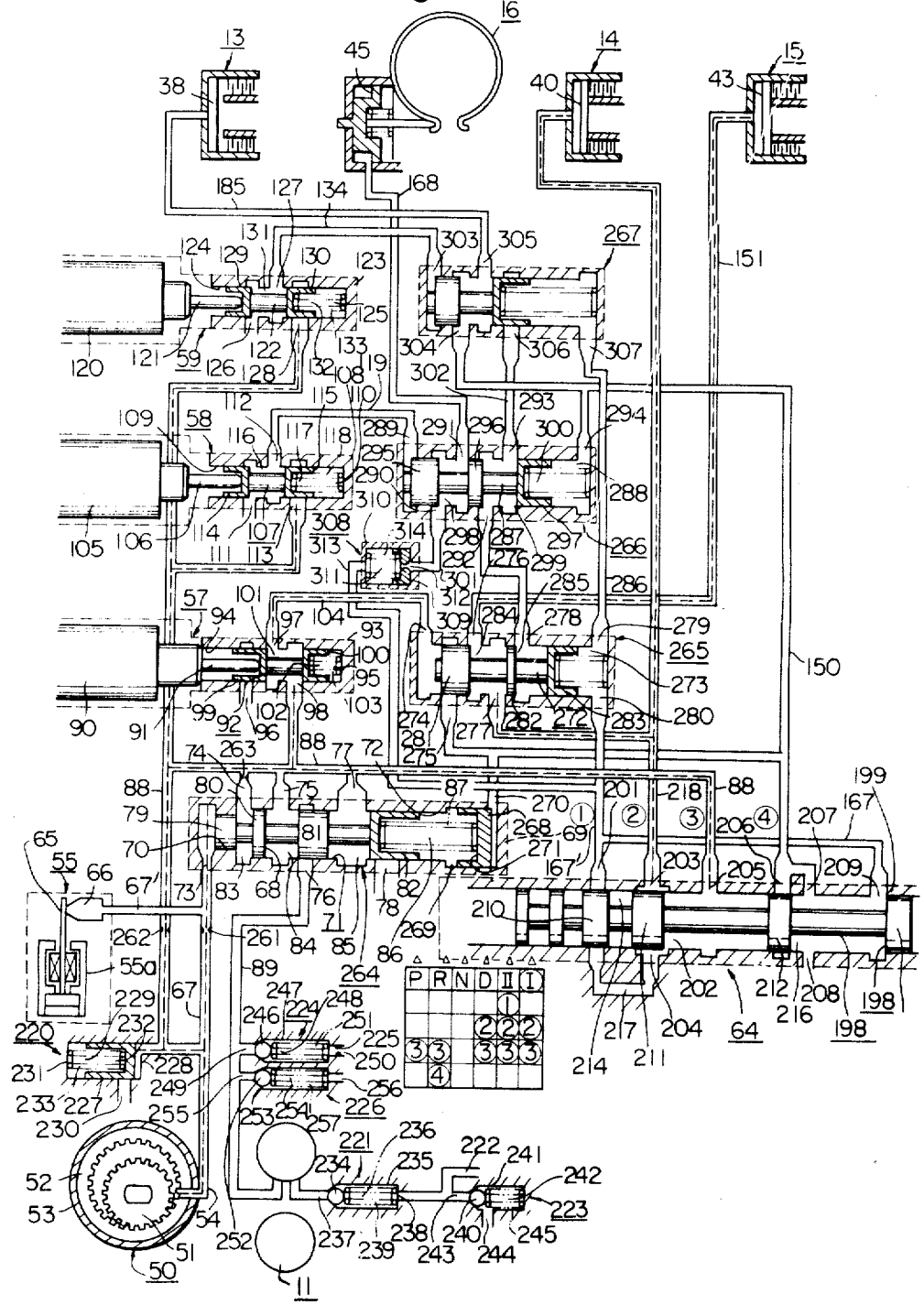
Figure 18:
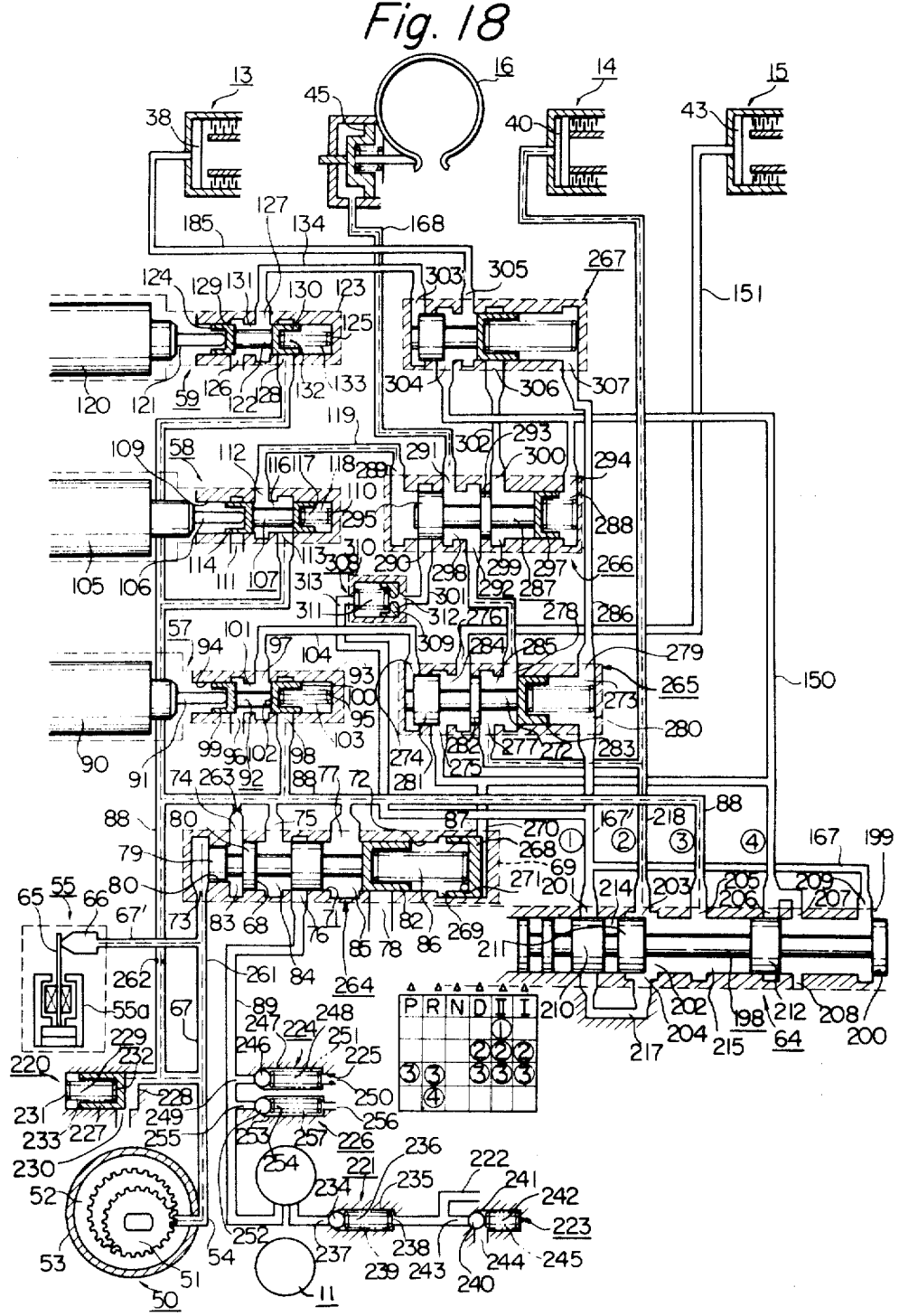

In the I range position of the selector valve 64 as seen in FIGS. 17 and 18, the spool 198 of the selector valve 64 is moved further rightwardly of the drawing beyond its II range position, and the line pressure is passed through the port 205, groove 215 of the spool 198 and port 203 and reaches the conduit 218 to cause the actuator 40 of the second clutch 14 to be engaged. The vehicle is thus permitted to start in the speed range of the transmission and is then accelerated at a speed within the speed range.

In this I range position of the selector valve 64, the first solenoid valve 57 is energized by the electronic control system and the line pressure fed through the conduit 88 is supplied as a signalling fluid pressure to the port 274 of the first main valve 265 through the port 98, groove 101 of the spool 92 of the solenoid valve 57 and port 97. The valve 265 is, as the consequence, moved rightwardly of the drawing to cause the port 277 of the first main valve 265 to open and allow the line pressure from the conduit 88 to the actuator 43 of the brake 15 through the port 203, conduit 218, port 277 of the first main valve 265, groove 284 of the spool 272, port 276, and conduit 151.

If the selector valve 64 is shifted accidentally to this I range position while the vehicle is running at a high speed, the electronic control system operates to energize the second solenoid valve 58 and deenergizes the first solenoid valve 57 as illustrated in FIG. 18 to shift the speed to the intermediate speed of the transmission so as to prevent the engine from overrunning. This is carried out in such a manner that the plunger 106 of the second solenoid valve 58 is protruded and the line pressure fed through the conduit 88 is supplied as a signalling fluid pressure to the port 289 of the second main valve 266 through the port 113, groove 116 of the spool 107 of the solenoid valve 58 and port 112 so that the spool 287 of second main valve 266 is moved rightwardly of the drawing. The port 292 of the first main valve 266 is opened and allows the line pressure from the conduit 88 to the actuator 45 of the brake 16 through the port 205, groove 215 of the spool 198, port 203, conduit 218, port 277 of the first main valve 265, groove 285, port 278, conduit 282', port 292, port 291 of the second main valve 266, and conduit 168.

Figure 19:
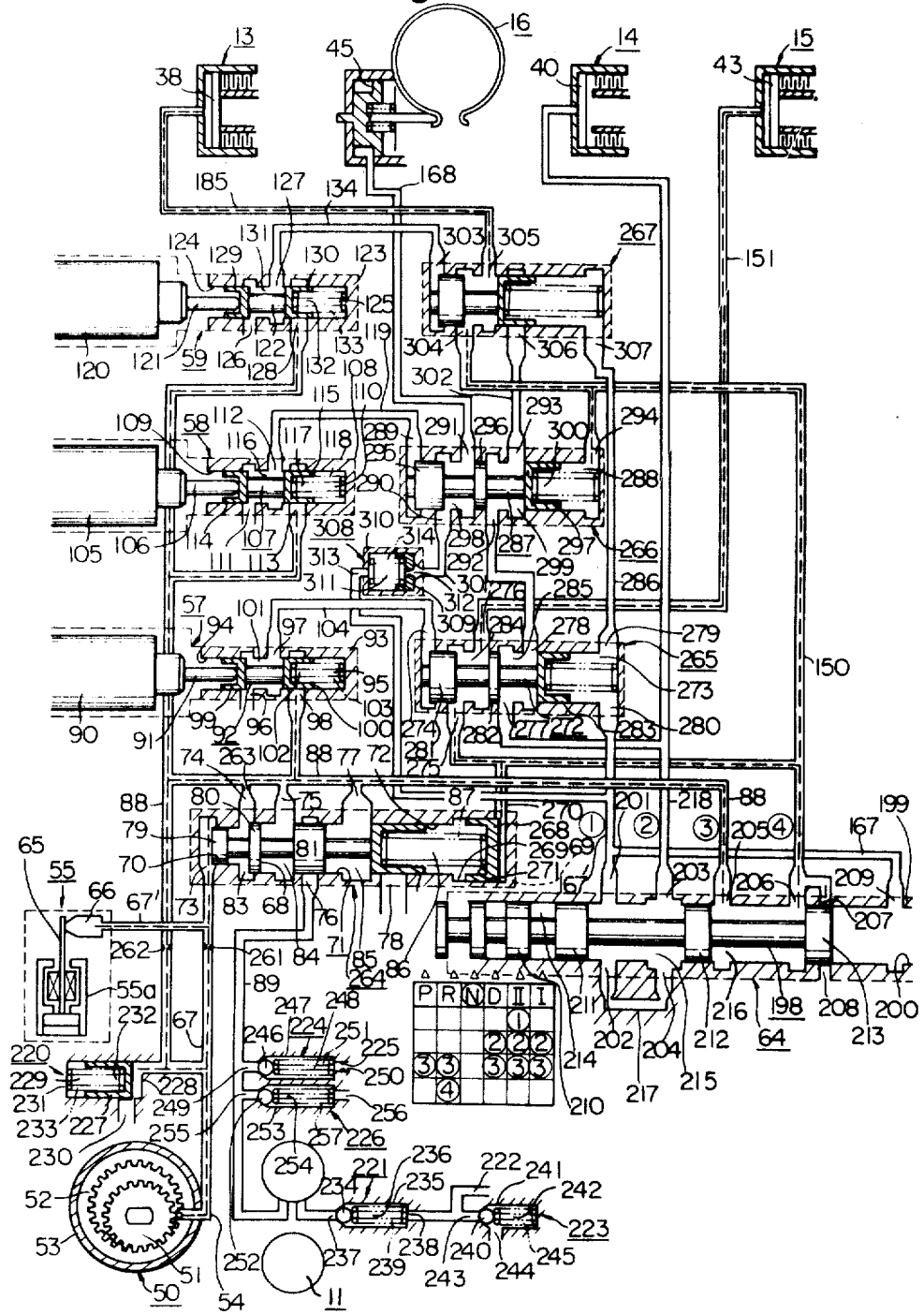

In the reverse position of the selector valve 64 as seen in FIG. 19, the spool 198 of the selector valve 64 is moved leftwardly beyond the neutral position, the line pressure in the conduit 88 is passed through the port 205, groove 216 of the spool 198 and port 206 and reaches the conduit 150. When the line pressure in the conduit 88 is fed to the conduit 150, the line pressure in the conduit 150 is passed through the port 270 of the regulator valve 264 to push the piston 268 to compress the spring 87. The spring 87 thus being compressed, the spool 68 of the regulator valve 265 is moved leftwardly of the drawing to cause the port 78 to be closed, increasing the line pressure regulated at the regulator valve 264.

The line pressure in the conduit 150 communicating with the port 206 of the selector valve 64 is also applied through the port 275, groove 284 of the spool 272, port 276, conduit 151 to the actuator 43 of the brake 15 to cause the brake 15 to be engaged. This line pressure in the conduit 150 is also supplied through the port 304, groove 181 of the spool 169, port 305, the conduit 185 to the actuator 38 of the clutch 13 to cause the clutch 13 to be engaged. This line pressure is also fed to the port 294 of the second main valve 266, moving the spool 287 leftwardly of the drawing to prevent an accidental movement of the spool 287 of the second main valve 266.

The hydraulic system for the transmission according to this invention is controlled by an electric control system which is, as schematically illustrated in FIG. 1, constituted by various elements adapted to constantly convert the working conditions of different operating units of the vehicle into corresponding electric signals. The electric signals thus obtained are supplied to the valves regulating the flows of fluid in the hydraulic circuits already described.

As shown in FIG. 1, the electronic system constructed for such purpose essentially comprises a governor unit 400, speed ratio comparator unit 401 and line pressure control unit 402. The governor unit 400 is electronically connected to a potentiometer 403 through a line 404, inclinometer 405 through a line 406, brake switch 407 through a line 408, and engine thermometer 409 through a line 410. The potentiometer 403 is interlocked with the accelerator pedal 258 to detect the position thereof which is roughly correspondent with the position of the throttle valve (not shown) of the engine 260. The inclinometer 405 detects the gradient of an ascent or descent on which the vehicle is running. The engine thermometer 409 detects the temperature at which the engine 260 is operating. Thus, the governor unit 400 receives information including the position of the throttle valve, the gradient of the road on which the vehicle is travelling, and the temperature of the engine. These pieces of information are supplied to the governor unit 400 for conversion into corresponding electric signals. The signals thus obtained is then introduced into the speed ratio comparator unit 401. This speed ratio comparator unit 401 is connected not only with the governor unit 400 but with a manual selector switch 412 through a line 413, a tachometric generator 414 through a line 415 and a throttle valve control means 416 through a line 417. The manual selector switch 412 detects the speed selected by the manipulation of the manual selector lever 216. The tachometric generator 414 is mounted on the drive shaft 10 of the engine to detect the engine speed. All the information delivered from the manual selector switch 412, tachometric generator 414, throttle valve 416 and governor unit 400 as well is introduced into the speed ratio comparator unit 401 and is thereat converted into electric signals. These signals delivered from the speed ratio comparator unit 401 are then passed to the line pressure control unit 402 as well as to the first, second and third solenoid valve 57, 58 and 59, respectively.

The line pressure control unit 402 is connected not only with the speed ratio comparator unit 401 but with a vacuum gauge 418 through a line 419, and a tachometric generator 411 through a line 412. The tachometric generator 411 is mounted on the driven shaft 21 of the transmission and detects the vehicle speed. The vacuum gauge 418 detects the level of the vacuum at the intake manifold (not shown) of the engine. The information supplied to the line pressure control unit 402 is converted into electric signals, which in turn are supplied to the servo valve 55 of the hydraulic control system.

Referring now to FIG. 20, the manual selector switch 412 is connected with a power source 420 through a line 421 and has switch elements 422 to 428 connected in parallel to each other and with lines 429 and 435, respectively. The switch elements 422 and 423 are for providing the I range position of the selector valve 64, while the switch elements 424 to 428 are for providing the II range, D range, N, R and P positions of the valve. The lines 433 and 435 are connected with the starter switch (not shown) of the engine so that the engine starts only with the selector lever 216 in the N or P position. The line 434 on the other hand is connected with the reverse lamp (not shown) so that the lamp glows when the selector lever 216 is shifted to the R position.

The lines 429 to 433 are connected with an emergency switch 436. More precisely, the emergency switch 436 has switch elements 437 to 441, of which the switch elements 437 to 439 are connected operatively with the lines 429 to 431 and the switch elements 440 and 441 are connected with the line 432. The switch elements 437 has its emergency contact connected with a line 442 while the switch elements 438 and 440 have their emergency contacts connected with a line 443. The switch element 439 has its emergency contact connected with a line 444. The switch element 441 has its emergency contact connected with a line 445 which, in turn, is connected with the third solenoid valve 59, as shown. The line 442 is connected with the governor unit 400.

This governor unit 400 is connected with the potentiometer 403 through the line 404, brake switch 407 through the line 408, tachometric generator 411 through the line 412 and engine thermometer 409 through the line 410. The governor unit 400 includes a switch 446 having three different contacts 447 to 449. The contacts 447 and 449 are connected with lines 450 to 452, respectively, of which the line 451 is connected with the line 444. The lines 450 to 452 are connected operatively with the speed ratio comparator unit 401.

The speed ratio comparator unit 401 is connected with the governor unit 400 through the line 412' and tachometric generator 411 through the line 412. The speed ratio comparator unit 401 is also connected with another tachometric generator 414 through the line 415. The unit 401 has three switches 453 to 455. The switch 453 has two contacts 456 and 457, the switch 454 four contacts 458 to 461, and the switch 455 three contacts 462 to 464. The contacts 456 and 457 are connected with lines 465 and 466, the contacts 458 to 461 with lines 466 to 470, and the contacts 462 to 464 with lines 471 to 473. The contacts 458 to 461 are so arranged that when the line 451 is connected with the line 467 it is also connected with the line 468 and that when the line 451 is connected with the line 469 it is also connected with the line 468. The contacts 462 to 464 are, on the other hand, so arranged that when the line 452 is connected either to the line 471 or to the line 473, it is also connected with the line 472. The line 468 is connected with the second solenoid valve 58.

The line pressure control 402, which is disclosed in the same applicant's copending application Ser. No. 872,308 is connected with the two tachometric generators 411 and 414 through the lines 412 and 415, respectively, vacuum gauge 418 through the line 419, governor unit 400 through a line 474 and servo valve 55 through a line 475.

Figure 23A:
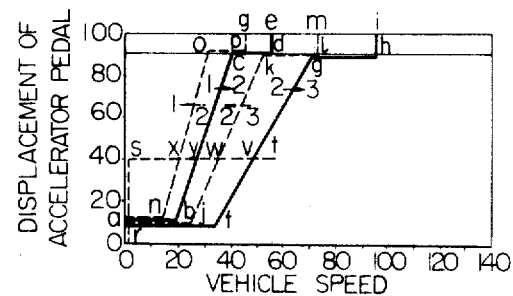
FIGS. 23a and 23b are graphical representations of shifting pattern of the transmission according to this invention.
Figure 23B:
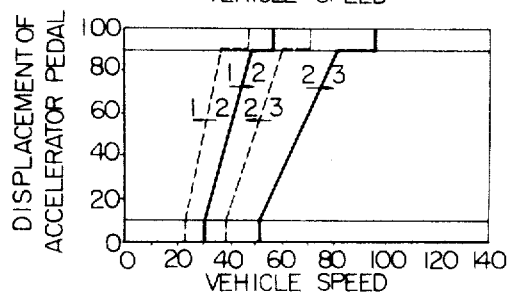

The electronic governor 400 provides a shift pattern in the transmission as seen in FIGS. 23a and 23b. In FIG. 23a, the curve a–b–c–d–indicates the shifting point for shifting up from the low to the intermediate speed, and the curve l–f–g–h–i the shifting point for shifting up from the intermediate to the high speed while the curve of broken line a–j–k–l–m indicates the shifting point for shifting down from the high to the intermediate speed, and the curve a–n–o–p–q the shifting point for shifting down from the intermediate to the low speed. The broken line s–t represents a state in which the vehicle is started and is then accelerated with the position of the accelerator pedal kept constant. The intersecting points correspond with the shifting point. For example, the point r indicates that the accelerator pedal is kept free while the vehicle is standing but that the transmission is set at a high speed ratio. In this condition, the creep of the vehicle can be avoided because less torque is transmitted to the driven shaft from the engine because of its low speed reduction ratio. If the accelerator pedal kept depressed in such state, the transmission is shifted from the high to the low speed ratio at the point a in FIG. 23a. If the vehicle is started from the point s in FIG. 23a and is then accelerated at a speed increasing as indicated by the broken line s–t with the accelerator pedal kept depressed to 40 percent of its full movement and the transmission is shifted at point y from the low to intermediate speed ratio and is then shifted at point v from the intermediate to high speed ratio. While in the deceleration of the vehicle from the high speed ratio, the transmission is shifted down at point w from the high to intermediate speed ratio and is then shifted at point x from the intermediate to low speed ratio.

FIG. 23b shows the shifting pattern provided with a view to deviating the shifting point to the higher vehicle speed with respect to the corresponding speed as is the case in which the vehicle is running on an ascent, or in which the engine braking is required while the vehicle is running on a descent, or in which the engine is operating at a low temperature.

When now the manual selector lever 216 is shifted to position D, then the manual selector valve 64 works to apply a fluid pressure to the actuator 40 of the second clutch 14 en route the conduit 218 (FIGS. 4 to 6). Then, as seen in FIG. 20, the selector switch 412 works to supply voltage to the line 432, which voltage is thereafter applied to the line 443 through the emergency switch 436. The governor 400 acts in such a manner that, when the vehicle is at halt or running at a low speed, the switch 446 is shifted to the contact 447 to energize the line 450 to actuate the switch 453 of the speed ratio comparator unit 401. The speed ratio comparator unit 401 receives a signal of the engine speed ($n_e$) from the tachometric generator 414 through the line 415 and a signal of the driven shaft speed ($n_o$) from the tachometric generator 411 through the line 412', as seen in FIGS. 1 and 20. The speed ratio comparator unit 401 then operates calculation to compare the engine speed $n_e$ with the product $n_t$ of the driven shaft speed $n_o$ and the gear ratio $R_1$. If, in this instance, the value $n_e$ is equal to or larger than the value $n_t$, then the switch 453 is shifted to the contact 456, thus connecting the line 450 to line 465. The line 465 is connected with a relay switch 484, which, when energized, assumes a position to connect the line 488 to the power source 420, thus supplying the throttle control unit 416 with reset signals. The construction of the throttle control unit 416 is disclosed in the applicant's copending application Ser. No. 872,313 filed Oct. 29, 1969 and operates in a manner to determine the position of the throttle valve of the engine thereby to make the engine speed coincident with the product of the driven shaft speed and selected gear ratio. This product is hereinafter referred to as "synchronized speed." When the engine speed is in agreement with the thus defined synchronized speed, the throttle control unit 416 receives a rest signal through the line 488 so that the position of the throttle valve of the engine is brought into correspondence with the position of the accelerator pedal 258. If, on the contrary, the value $n_e$ is smaller than the value $n_t$, namely, if the engine speed is lower than the synchronized speed, the switch 453 is shifted to the contact 457, thereby connecting the line 450 to line 466. The line 466 being connected with the throttle control unit 416, as illustrated, the throttle control unit acts in a manner to open the throttle valve to provide an open area larger than is correspondent with the position of the accelerator pedal. The speed is consequently increased.

If the engine speed is higher than the synchronized speed in the first or second speed range of the vehicle, the throttle control unit 416 receives a signal through the line 489 so as to act to reduce the open area at the throttle valve with respect to the position of the accelerator pedal. The engine speed is thus reduced until it becomes equal to the synchronized speed. This is apparently not necessitated when in the first speed range operation of the vehicle. It may be mentioned that, where a torque converter is used in the transmission and if the revolution speed of the pump of the torque converter is reduced excessively, a sufficient amount of torque will not be produced. To avoid this, a low-speed limit relay 476 is provided between the lines 467 and 489. The low-speed limit relay 476 acts in such a manner that, in the event the engine speed is decreased under 2,500 r.p.m., the line 489 is disconnected from the line 467 to reset the throttle valve.

The line 465 is also connected with the relay 478, which, however, remains inoperative as long as the relays 480 and 482 associated therewith are not actuated.

If, furthermore, the engine speed is lower than the synchronized speed, the switch 453 is shifted to the contact 457 and the line 450 connected with the line 466. This takes place when in the shifting down from the second to first speed range. In this instance, the throttle control unit 416 is energized through the line 466 to open the throttle valve, giving rise to the engine speed. A timer 479 is provided in the governor 400, which timer produces signals with limited duration. The signals thus produced in the timer 479 are introduced into the line pressure control unit 402 to initiate it into action. When the line pressure control unit 402 is activated, it produces signals which are supplied to the servo valve 55 (FIG. 1) through the line 475, whereby the line pressure in the hydraulic circuit is regulated. As the engine speed rises and reaches the synchronized speed, then the switch 453 is shifted to the contact 456, thus disconnecting the line 466 from the line 450 which therefore is connected with the line 465. The result is that the throttle control unit 416 is reset and behaves in correspondence with the accelerator pedal.

While the engine speed is thus equal to the above defined synchronized speed, the torque is transmitted through the second clutch 14 and the one-way brake 19 (serving as a reaction element) acts to lower the speed in the first speed range. In this instance, however, the one-way brake 19, which permits the driven shaft 21 to rotate only in a direction to provide the forward advance of the vehicle and not in the reverse direction, does not provide engine braking.

It should be herein understood that, in the control system as proposed by this invention, the line pressure in the hydraulic control circuit is regulated in proportion to the output torque of the engine. The output torque of the engine, in turn, is, in this invention, approximated as a value proportional to the torque on the turbine shaft of the torque converter at any given time. The turbine shaft torque is herein obtained as the product of the output torque of the engine and torque ratio of the torque converter. This torque ratio, in turn, is obtained as the turbine shaft torque vs. pump speed of the torque converter.

As the vehicle speed rises to the intermediate speed, the switch 446 in the governor 400 is shifted to the contact 448. This is achieved in the speed selector circuit in the governor, as is discussed in the applicant's copending application Ser. No. 872,124, under the control of the signals supplied from the tachometric generator 411 and potentiometer 403. Immediately after the speed is shifted up, the engine speed is temporarily higher than the synchronized speed and, as the result, the switch 454 is connected with the contacts 458 and 459 so that the line 451 is connected with the lines 467 and 468. The voltage flow to the line 467 is applied to the throttle control unit 416 through the line 489 to close the throttle valve and to reduce the engine speed. (Where, however, a torque converter is used as in the embodiment previously shown, the engine is prevented from operating at a speed lower than 2,5000 r.p.m. by the low speed limit relay 476.) At the same time as the throttle control unit 416 is thus actuated, the timer 479 supply a signal with limited duration to the line pressure control unit 402 to lower the line pressure in the hydraulic circuit. The voltage flown to the line 468, on the other hand, is applied to the second solenoid valve 58 so that the brake 16 is tightened. As the engine speed is decreased to the synchronized speed, the switch 454 is changed over to the contacts 459 and 460 so that the line 451 is connected with the lines 468 and 469. The voltage flowing through the line 468 is invariably applied to the second brake 16, whereas the voltage flow to the line 469 is applied to the relay switch 486 which, therefore, supplies reset signals to the throttle control unit 416. The throttle valve of the engine thus operates in correspondence with the accelerator pedal 258. In this instance, the torque from the turbine shaft of the torque converter 11 is transmitted through the second clutch 14 and the second brake 16 serves as a reaction element to transfer the torque to the driven shaft 21 at a gear ratio of the intermediate speed.

When the speed is shifted down from the high to intermediate speed, the engine operates at a speed lower than the synchronized speed initially so that the switch 454 is shifted to the contact 461. The line 451 thus being connected with the line 470, the throttle valve is actuated in a manner to open the throttle valve, increasing the engine speed until it reaches the synchronized speed. The timer 479 simultaneously acts to deliver a signal to the line pressure control unit 402 so as to regulate the line pressure properly.

When the speed is shifted up from the intermediate to high speed, the switch 446 of the governor 400 is shifted to the contact 449 and the switch 455 of the speed ratio comparator unit 401 to the contacts 462 and 463. Thus, the line 443 is connected with the lines 471 and 472 through the line 452. This causes the throttle control unit 416 to close the throttle valve of the engine and to decrease the engine speed. (It may also be mentioned that, where a torque converter is used in the transmission, the throttle control unit is reset as soon as the engine speed lowers below 2,500 r.p.m.) At the same time as the throttle valve of the engine is closed, the third solenoid valve 59 is energized to bring the clutch 13 into engagement. As the engine speed is reduced to the synchronized speed, the switch 455 is shifted to the contact 464 so that the line 452 is connected with the lines 472 and 473. As the consequence, the clutch 13 remains engaged while the relay switch 487 is actuated to supply reset signals to the throttle control unit 416. The throttle valve of the engine thus operates correspondingly with the accelerator pedal 258. Here, the revolution of the turbine shaft of the torque converter 11 is transmitted to the driven shaft 21 entirely as it is, namely without any change.

If, now, the manual selector lever 216 is shifted to position 1, the manual selector valve 64 acts to pass the fluid pressure to the conduit 218 to couple the second clutch 14, as seen in FIG. 8. With this, the switches 422 and 423 are connected with the lines 429 and 430, which in turn are connected with the lines 442 and 443, through the switches 437 and 438, respectively. The voltage flow to the line 442 is passed to the governor 400 while the voltage flow to the line 481 is passed to the relay 480 which is consequently actuated. The governor 400 thus energized functions to isolate the shifting point from the low to intermediate speed from the position of the accelerator pedal. The governor 400 also functions to maintain the engine speed at a maximum at a gear ratio of the first speed range of the vehicle speed (which speed is hereinafter referred to as the first shift point). If the vehicle speed exceeds the thus defined first shift point, the speed of the vehicle is shifted to the intermediate even though the selector lever 216 is set at the position 1. Thus, the engine is prevented from operating at an unexpectedly high speed. The voltage flowing through the line 430, on the other hand, is passed to the governor 400 through the switch element 438 and line 443. Suppose the vehicle is at halt or running at a speed lower than the above-defined first shift speed, the speed shift point of the governor 400 thus deviated is converted into a signal for low speed, which signal is transferred to the switch 453 through the line 450. Here, the engine speed is compared with the driven shaft speed and, if the engine speed is equal to or higher than the driven shaft speed, then the switch 453 is shifted to the contact 456 with the result that the line 450 is connected with the line 465. The line 465 thus being energized, the relay 478 is actuated. Since, in this instance, the relay 480 is also actuated, the first solenoid valve 57 is energized to apply the low-and-reverse brake 15 so that the driven shaft 21 rotates at a gear ratio of the first speed range with respect to the turbine shaft of the torque converter. The line 465 is also connected with the line 485 so that as the line 465 is energized, the relay 484 is actuated to cause the throttle control unit 416 to control the throttle valve of the engine in a manner to assume a position corresponding to the position of the accelerator.

If, the selector lever 216 is shifted to the position I for the purpose of applying the engine braking while the vehicle is running at a high speed, then the selector switch 412 is closed to energize the governor 400. If, however, the vehicle speed is in excess of the first shift point, the switch 446 of the governor 400 is shifted to the contact 448 to establish the second speed. As the vehicle speed is reduced below the first shift point, the switch 446 is shifted back to the contact 447, disconnecting the line 443 from the line 451. The line 443 is thus connected with the line 450 but, in spite of this switch over, the engine still operates at a speed lower than the above-defined synchronized speed.

When the speed is shifted to the low speed range under this condition, the engine braking is applied violently os that the driving wheels tend to slip. To avoid this problem, the switch 453 of the speed ratio comparator unit 401 is changed over to the contact 466, connecting the line 450 with the line 466. The throttle control unit 416 energized through the line 489 in a manner to open the throttle valve of the engine and to increase the engine speed. Simultaneously as the throttle valve is opened, the timer 479 delivers a signal to actuate the line pressure control unit 402 to lower the line pressure in the hydraulic circuit. As the engine speed rises to the synchronized speed, the switch 453 is shifted to the contact 456 to establish the low speed range so that an adequate engine braking can be accomplished.

When the vehicle is about to climb an uphill with the selector lever 216 set to the D range position, the inclinometer 405 (which is mounted on the vehicle body) detects the gradient of the hill. At the moment the gradient thus detected exceeds a predetermined value, a signal is produced from the inclinometer 405, which signal is fed to the governor 400 through the line 406. The governor 400, as it receives the signal, acts to shift the speed shift point to a higher level so as to provide a shifting pattern shown in FIG. 23b. The purpose of raising the speed shift point in this manner is to enable the engine to operate at a higher speed than usual to overcome the running resistance of the vehicle which increases as the vehicle runs on an uphill. Failure to do so would invite an occurrence of a hunting between the upward and downward shiftings as is encountered when the vehicle runs on an ascent.

When, on the contrary, the vehicle is about to run on a downhill, the inclinometer 405 produces a signal to lower the speed shift point to make available engine braking. This is also ascertained from FIG. 32b.

The engine thermometer 409 is used to detect the temperature at which the engine is operating at any given time. If the engine is operated at a low temperature at which the engine tends to malfunction, the speed shift point is reduced in the governor 400.

When the brake pedal (not shown) is depressed to decelerate the vehicle, it is at all times desirable that the transmission be shifted down. To achieve this purpose, a signal is produced from the brake switch 407 as soon as the brake pedal is depressed. The signal produced by this brake switch 407 is applied to the governor 400 through the line 408, as best seen in FIGS. 1 and 20. The governor 400, as it receives the signal, acts to shift the speed shift point toward a lower level to provide a shifting pattern shown in FIG. 23b. The signal from the brake switch 407 is also fed to the relay 482 so that, when the transmission is shifted down to the low speed, the signal is passed through the relay 478 to the first solenoid valve 57. The solenoid valve then acts to apply the low-and-reverse brake 15, thereby effecting the engine braking.

If, furthermore, the selector lever 216 is shifted to the position II, the intermediate speed is established by the operation of the hydraulic system alone, as previously discussed. To provide a time lag in the response of the hydraulic system to such motion of the selector lever, there are provided various orifices. Before the hydraulic system response to the motion of the selector lever, the switch element 424 of the selector switch 412 is connected with the switch element 439 of the emergency switch 436, and the switch element 439 in turn is connected with the line 444. The switch 446 is now shifted to the contact 448 so that the line 443 is connected with the line 451. Then, if the engine speed is higher than the synchronized speed, the switch 454 is shifted to the contact 458 thereby to actuate the throttle control unit 416 to close the throttle valve of the engine and to decelerate the engine. If, in contrast, the engine speed is lower than the synchronized speed, then the switch 454 is shifted to the contact 461 to open the throttle valve and to speed up the engine. Thus, the engine speed is maintained at the synchronized speed so that the shocks and tremors otherwise resulting from the speed shifting can be prevented.

When the selector lever 216 is set to the position P or N, the switch element 425 or 428 is shifted to the line 433 or 435, respectively, thereby building up a circuit for the starter switch (not shown). Such formation of the circuit for the starter switch is intended to prevent the engine from operating unwantedly when the selector lever 216 is held in a position other than the position N or P.

When the selector lever 216 is shifted to the position R, the switch 427 of the selector switch 412 is now shifted to the line 434 to cause the reverse lamp (not shown) to glow, indicating that the vehicle is running backwardly.

In the event a failure takes place in the electronic control system for one reason or another, the switches 437 to 440 are opened and the lines 442 to 444 disconnected from the lines 429, 431 and 432, respectively. In this instance, the switch element 441 of the emergency switch 436 is shifted to the line 445 so that the line 432 is connected with the line 445 through the line 432'. Thus, if the selector lever 216 is set to the position I, the second clutch 14 is coupled only by the action of the hydraulic control system, wherein the vehicle runs at the low speed with the aid of the one-way brake acting as a reaction element. If, on the other hand, the selector lever 216 is shifted to the position II, the second clutch 14 and second brake 16 are initiated into action by means of the hydraulic control system alone. If, furthermore, the position D is selected at the selector lever 216, then the switch element 441 of the emergency switch 436 is shifted to the line 445 to actuate the third solenoid valve 59. Thus, the clutch 13 is coupled to establish the high speed. If the vehicle is intended to run backwardly, the driven shaft 21 can be rotated in the reverse direction and at a reduced speed by the action of the hydraulic control system alone with the selector lever 216 shifted to the position R.

Figure 21:
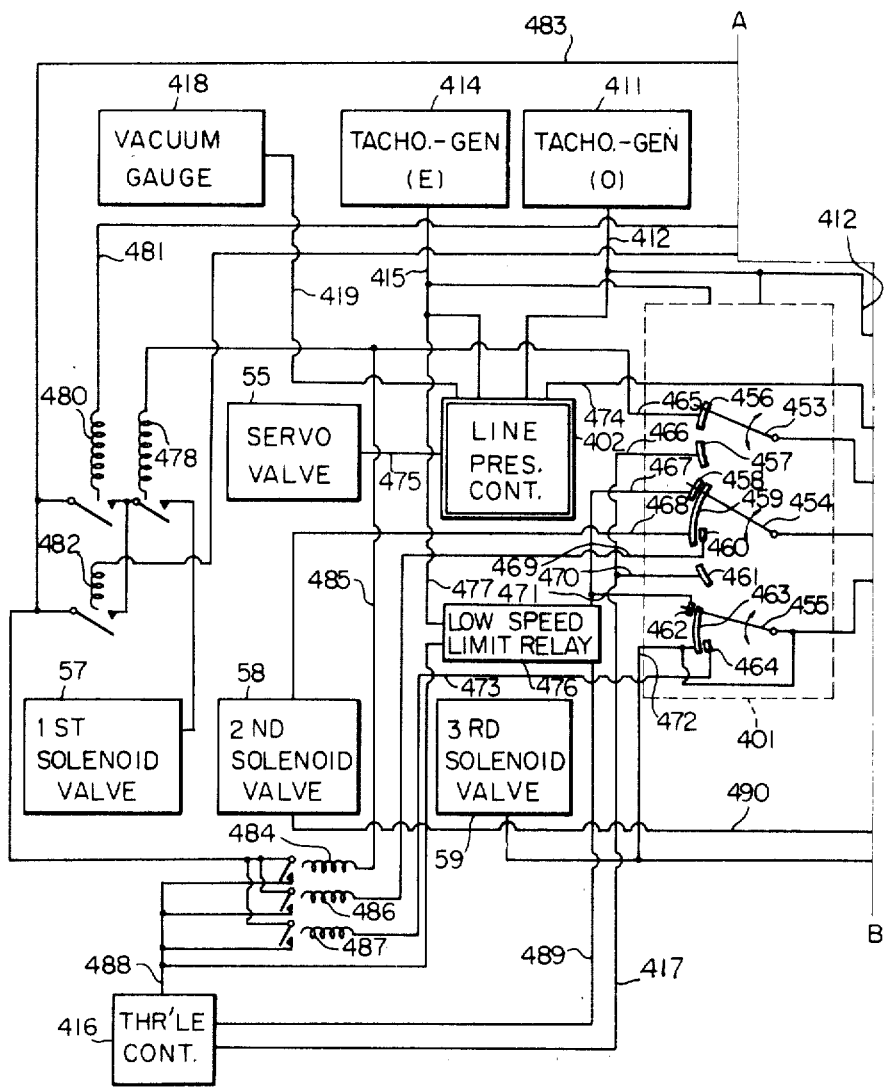
Figure 21:
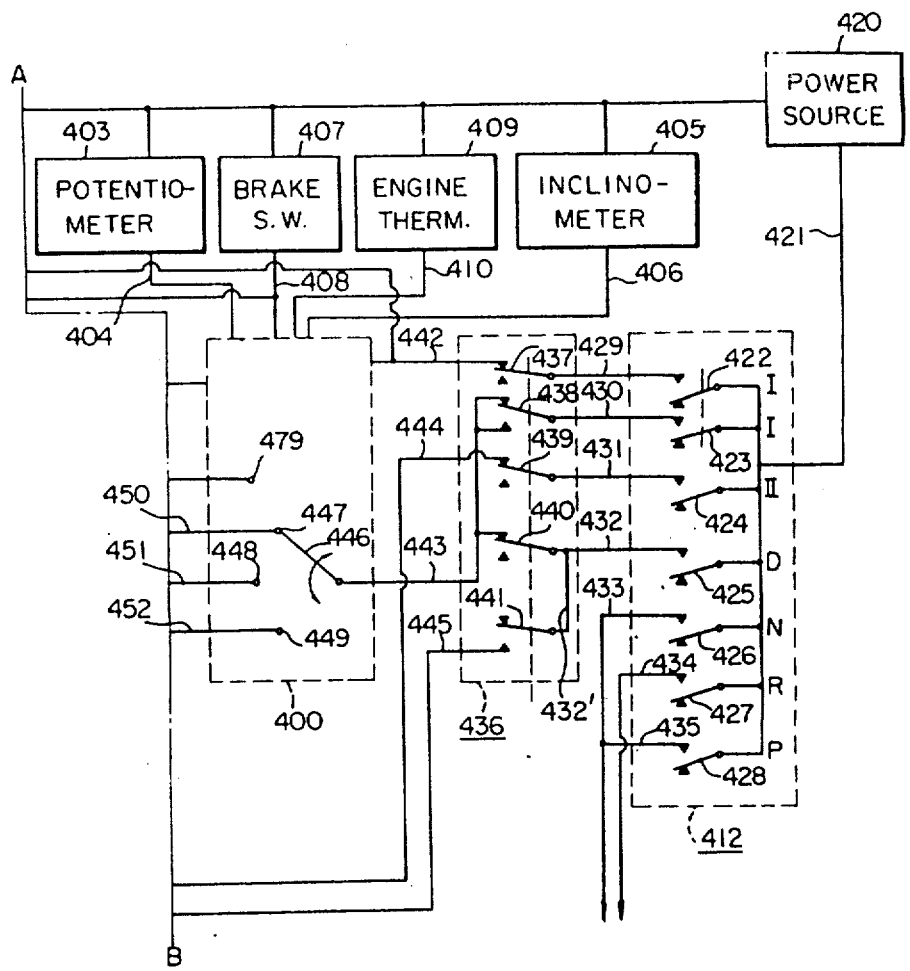
Figure 22:
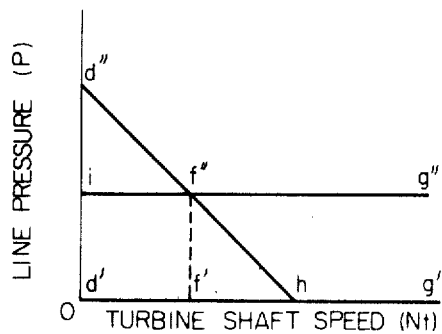
FIG. 22 is a graphical representation of a typical relationship between a line pressure in the hydraulic pressure circuit and the turbine shaft speed.

By preference, the line 431 which leads from the manual selector switch 412 may be connected with the second solenoid valve 58 through a line 490, as shown in FIG. 21. In this instance the line 444 may be dispensed with. With this circuit arrangement, when the manual selector lever 216 is shifted to the II position to cause the switch element 424 to be connected with the line 431 and if the switch element 439 of the emergency switch 436 is connected with the line 490, then the second solenoid valve 58 becomes energized. Thus, it is possible to shift the transmission to the intermediate speed ratio in a manual fashion, namely, entirely independently of the operation of the electronic control system.

This regulator valve 500 comprises, as shown in FIG. 26, a first and second spools 501 and 502, respectively, slidably accommodated in the casing 69. The casing 69 has formed therein cylindrical cavities 503 to 507. The cavities 503 and 504 have smaller diameters than the others while the cavity 507 has a larger diameter than the others. These cylindrical cavities communicate with ports 508 to 515. The spool 501 has formed thereon lands 516 to 519 and grooves 520 to 522 formed between the lands, while the spool 502 has formed therein a cavity 523. The spool 501 is mounted within the casing portion 69 with its land 516 in sliding contact with the wall of the cavity 504, lands 517 and 518 with the wall of the cavity 505 and the land 519 with the wall of the cavity 506. This regulator valve 500 has a spring 524 provided in the cavity 523 of the spool 502 and a cavity 525 formed axially of the land 519. The regulator valve 500 also has a bellow assembly 526 including a bellow proper 527, rod 528 connected at one end with the bellow proper 527 and at the other in contact with the end face of the land 516 of the spool 501, a body 529 mounted at one end of the valve 500 having a cylindrical cavity 530 through which the rod 528 is held in sliding contact therewith, and a conduit 531 whereby the intake manifold (not shown) communicates with the chamber of the bellow proper 527.

FIGS. 26 to 29 shows the hydraulic control system similar to that shown in FIG. 2 but using the regulator valve 500. As shown, the port 508 communicates by way of the conduit 67 with the nozzle 66 of the servo valve 55 and through the conduit 67' with the conduit 54 from oil pump 50. The ports 509, 510 and 512 communicate with each other and also with the conduit 88 serving as a source of regulated fluid pressure to be applied to the actuators for the brakes and clutches. The conduit 88 communicates with the conduit 67. The port 511 communicates with the torque converter 11 by way of the conduit 89. The ports 513 and 514 are opened to the oil sump (not indicated). The port 515 communicates through the conduit 150 with the ports 206 and 207 of the selector valve 64.

In this hydraulic control system using the regulator valve 500, the check valve 63 used in the hydraulic control circuit shown in FIG. 2 may be dispensed with.

In operation, if the throttle valve in the engine is closed, the engine torque is decreased so that the intake manifold vacuum increases to cause the bellow proper 527 to be contracted. Thus, the rod 528 connected to one end of the bellow proper 527 pushes the spool 501 rightwardly of the drawing, as best seen in FIG. 28, against the action of the spring 524. As a result of the rightward movement of the spool 501, the port 511 is opened to relieve the fluid pressure through the conduit 89. Thus, the decreased line pressure acts to reduce the engaging force of the clutches and brakes in the hydraulic control system.

As shown specifically in FIGS. 28 and 29, the regulator valve 500 may also be used in the hydraulic control system shown in FIG. 11. In this instance, however, the check valve 308 as used in the hydraulic control system shown in FIG. 11 may be dispensed with.

In operation, if the throttle valve in the engine is closed, the engine torque is decreased so that the intake manifold vacuum increases to cause the bellow proper 527 to be contracted. Thus, the rod 528 connected to one end of the bellow proper 527 pushes the spool 501 rightwardly of the drawings against the tension of the spring 524. As a result of the rightward movement of the spool 501, the port 511 is opened to relieve the fluid pressure through the conduit 89. The result is that the decreased line pressure acts to reduce the engaging force of the clutches and brakes in the hydraulic control system.

In the electronic control system with the hydraulic control system shown in FIGS. 28 and 29, when the selector lever 216 and accordingly the selector switch 412 are shifted to the II range position and the emergency switch 436 to the emergency position, a circuit line 493 is connected between the nonemergency contact of the emergency switch 436 and the second solenoid valve 58. This makes it possible to manually shift the transmission of the intermediate speed ratio independently of the operation of the electronic control system.

Thus, it will now be appreciated from the foregoing description that the present invention provides the following advantages:

1. The transmission is controlled by the hydraulic control system combined with the electronic control system with increased accuracy dictated by detailed factors suitable for controlling the operation of the vehicle.

2. The transmission is controlled in close relation to the characteristics of the torque converter with the line pressure electronically controlled in response to changes in the engine speed and the driven shaft speed.

3. Even when the engine is operated at a low temperature, an irregular operation of the engine can be avoided by deviating the shifting point to the higher vehicle speed.

4. When the vehicle is on an ascent, the hunting which results from the up or down shifting of the transmission can be prevented by deviating the shifting point to the higher vehicle speed side so that the engine power can be exploited with increased efficiency, and when the vehicle is on a descent, the engine braking action is efficiently effected by deviating the shifting point of the transmission to the higher vehicle speed side.

5. When the driver depresses the brake pedal, the engine braking action is efficiently effected by deviating the shifting point of the transmission to the higher vehicle speed side so that at a low speed ratio of the transmission the engine braking action is readily effected by engaging the low and reverse brake.

6. The electronic control system combined with the hydraulic control system may serve to prevent an accident resulting the flow of higher current because the signalling fluid pressure is provided by a pilot valve consisting of the solenoid valve and servo valve so that the electric signal derived from the electronic control system is converted into the fluid pressure, which is used to actuate the main valve in the hydraulic control system.

7. The line pressure in the hydraulic control system is controlled during the shifting of the transmission and is kept at a level which is high enough to prevent slippage in the frictional elements, thus preventing the elements from burning and the elements from wearing.

8. The shifting time is detected so as to control the throttle valve control through by comparison between the speed reduction ratio and the speed ratio in its speed range by the electronic control system in response to changes the engine speed and driven shaft speed.

9. The shocks caused by the shifting of the transmission during shifting thereof is prevented by shortening the shifting time so that the frictional elements are permitted to slip only a short while; The life of the frictional elements are significantly prolonged since the throttle valve is controlled during shifting, in such a manner that the engine speed is synchronized with the driven shaft speed in its speed range.

10. The creep occurring while the vehicle is at rest is prevented by deviating the transmission to the high speed range side without sacrifice of the starting torque because, at the starting of the vehicle, the transmission is shifted to the low speed range with the accelerator pedal depressed by the driver.

11. Even when a failure is involved in the electronic control system, the transmission can be manually operated by shifting the selector switch interlocked with the selector lever to shift the emergency switch to the emergency position.

12. A failure in the transmission is recovered by an interlocking mechanisms provided in both of the electronic and hydraulic control systems.

13. Even when the selector lever is shifted to the I range position while the vehicle is running at a high speed, the transmission is shifted to the intermediate speed range. This shifting point is independent from the position of the accelerator pedal and is shifted at the maximum engine speed thereby to prevent the engine from overrunning and to provide effective engine braking action when the vehicle speed is in the low speed range.

We claim:

1. An automatic transmission for an automotive vehicle comprising at least one planetary gear set including actuable friction elements selectively hydraulically for obtaining different speed ratios; hydraulic means supplying hydraulic pressure to said friction elements for actuation of said friction elements; sensing means for sensing vehicle speed, engine speed, position of a speed selecting lever, position of an acceleration control member, and engine torque; and electrical means responsive to said sensing means and controlling the operation of said hydraulic means for firstly causing a change of gear reduction ratio to take place at a level of vehicle speed which is higher the greater the displacement of the acceleration control member is and for secondly causing variation in the level of the hydraulic pressure in dependence on the engine torque and in dependence on the vehicle and engine speeds.

2. An automatic transmission of the planetary gear set type according to claim 1, wherein said sensing means includes vacuum level sensing means for sensing vacuum level in an intake manifold of an engine of the vehicle as a function of the engine torque.

3. An automatic transmission of the planetary gear set type according to claim 1, further comprising inclination-sensing means for sensing the longitudinal inclination of said vehicle, wherein said electrical means is responsive to said inclination-sensing means for raising the level of vehicle speed at which the change of gear reduction ratio is caused to take place both when the vehicle is ascending and when the vehicle is descending.

4. An automatic transmission of the planetary gear set type according to claim 1, further comprising temperature-sensing means for sensing engine temperature, whereon said electrical means is responsive to said temperature means for raising the level of vehicle speed at which the change of gear ratio is caused to take place when engine temperature is low.

5. An automatic transmission of the planetary gear set type according to claim 1, further comprising brake-sensing means for sensing brake operation of said vehicle, wherein said electrical means is responsive to said brake-sensing means for raising the level of vehicle speed at which shifting down is caused to take place when the brake operation is effected.

6. An automatic transmission of the planetary gear set type according to claim 1, comprising a torque converter, wherein said sensing means comprises first voltage-generating means for generating voltage proportional to the rotational speed of the output shaft of said engine, second voltage-generating means for generating voltage proportional to the rotational speed of the driven shaft of said vehicle, third voltage-generating means for generating voltage proportional to an angular position of the throttle valve of the carburetor of said engine, wherein said electrical means comprises an electrical circuit including an emergency switch, a starter switch, a manual lever operated selector switch selectively connectable to said emergency switch and to said starter switch, and electronic calculating means connected for reception of the voltage from first and second voltage-generating means and electric signals from said selector switch through said emergency switch for comparing the relative values of said received voltages and electrical signals and upon detecting a predetermined gear shift point, for developing a selective signal to initiate a gear shift for supplying a signal to a throttle valve controller independently of the position of said accelerator pedal, synchronizing the speed of said engine output shaft with the speed of said driven shaft, for developing a timer signal to cause a momentary pressure fall in said hydraulic pressure while said gear shift takes place, and for developing a signal for causing a selected engagement and disengagement of at least one of said friction members to effect said gear shift; and wherein said hydraulic means comprises a regulator valve, a hydroelectronic converting means connected for reception of said timer signal and for the speed of a turbine shaft of said torque converter for supplying a hydraulic signal to said regulator valve; electromechanical valve means responsive to said hydraulic pressure for causing actuation of at least one of said friction members, and solenoid valve means connected for reception of said timer signal for controlling the level of said hydraulic pressure while said gear shift takes place.

7. An automatic transmission of the planetary gear set type according to claim 6, wherein said electrical means comprises a low speed limit relay connected to said electronic calculating means and said throttle valve controller for resetting the position of said throttle valve when the engine speed is lower than a predetermined level.

8. An automatic transmission of the planetary gear set type according to claim 7, wherein at least one manually controllable low forward speed power train, at least two electronically controllable forward speed power trains and at least one manually controllable reverse power train are provided.

9. An automatic transmission of the planetary gear set type according to claim 8, wherein said emergency switch, when in emergency position, provides electrically a high forward speed power train while low and intermediate forward speed and reverse power trains are hydraulically provided.

10. An automatic transmission of the planetary gear set type according to claim 8, wherein said electronic calculating means develops a signal for changing the input/output ratio into a high forward speed power train when said vehicle is decelerated to a complete halt and the throttle valve is closed and a signal for changing said input/output ratio into a low forward speed power train when said throttle valve is opened by depressing said accelerator pedal, thereby avoiding vehicle creep during said halt but providing a high torque power train for easily starting said vehicle from said halt.

11. An automatic transmission of the planetary gear set type according to claim 8, wherein said friction elements comprises a second clutch having its drive portion connected to a turbine shaft of said torque converter and a driven portion, and a first brake, and wherein said planetary gear set comprises a first planetary gear set including a first ring gear connected with said driven portion of said second clutch, a first sun gear and a plurality of first planet gears all of which are rotatably connected with a first carrier connected with said driven shaft and are also meshed with both said ring and sun gears, a second planetary gear set including a second sun gear integrally and axially connected with the sun gear of the first planetary gear set, a second ring gear connected with said driven shaft and a plurality of second planet gears all of which are connected with a second carrier and meshed with said second ring and sun gears, whereby a power train for a low speed ratio is provided for forward drive through the drive portion of said second clutch when the driven portion thereof is engaged with the drive portion thereof, the first ring gear of the first planetary gear set engaging with the drive portion of said second clutch connected with said turbine shaft, said first planet gears engaging with said first ring gear, said driven shaft being connected with said first planet gears through the first carrier connected therewith and said first brake providing a reaction element.

* * * * *